(12) United States Patent
Masuda

(10) Patent No.: US 6,796,669 B2
(45) Date of Patent: Sep. 28, 2004

(54) ILLUMINATING DEVICE, DISPLAY DEVICE HAVING THE SAME, AND LIGHT GUIDE PLATE

(75) Inventor: Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 90 days.

(21) Appl. No.: 10/128,577

(22) Filed: Apr. 24, 2002

(65) Prior Publication Data

US 2002/0172031 A1 Nov. 21, 2002

(30) Foreign Application Priority Data

Apr. 24, 2001 (JP) .......................................... 2001-125756
Dec. 27, 2001 (JP) .......................................... 2001-397618
Mar. 20, 2002 (JP) .......................................... 2002-078746

(51) Int. Cl.$^7$ ................................................ F21V 7/04
(52) U.S. Cl. ........................... 362/31; 362/27; 362/559; 362/560; 362/26
(58) Field of Search ........................ 362/31, 551, 559, 362/560, 327, 29, 26, 27, 558

(56) References Cited

U.S. PATENT DOCUMENTS

| 5,764,322 A | 6/1998 | Mamiya et al. |
| 6,048,071 A | 4/2000 | Sawayama |
| 6,239,851 B1 | 5/2001 | Hatazawa et al. |
| 6,335,999 B1 * | 1/2002 | Winston et al. ............. 385/146 |

FOREIGN PATENT DOCUMENTS

| JP | 08-094844 | 4/1996 |
| JP | 9-5739 A | 1/1997 |
| JP | 10-206641 A | 8/1998 |
| JP | 10-268307 | 10/1998 |
| JP | 11-23850 A | 1/1999 |
| JP | 11-24587 A | 1/1999 |
| WO | 97/14075 A1 | 4/1997 |

* cited by examiner

*Primary Examiner*—Stephen Husar
*Assistant Examiner*—Bertrand Zeade
(74) *Attorney, Agent, or Firm*—Nixon & Vanderhye P.C.

(57) ABSTRACT

The illuminating device includes a light source and a light guide plate. The light guide plate has a first side surface receiving light emitted from the light source, a second side surface facing the first side surface, a third side surface, a fourth side surface, an emitting surface and an opposing surface. The third and fourth side surfaces are located between the first and second side surfaces so as to face each other, and the emitting surface and the opposing surface face each other. The light guide plate is formed from a first light guide layer and a second light guide layer. The first light guide layer has a plurality of reflecting films therein for reflecting light entering the light guide plate through the first side surface toward the emitting surface. The second light guide layer has no reflecting film.

28 Claims, 42 Drawing Sheets

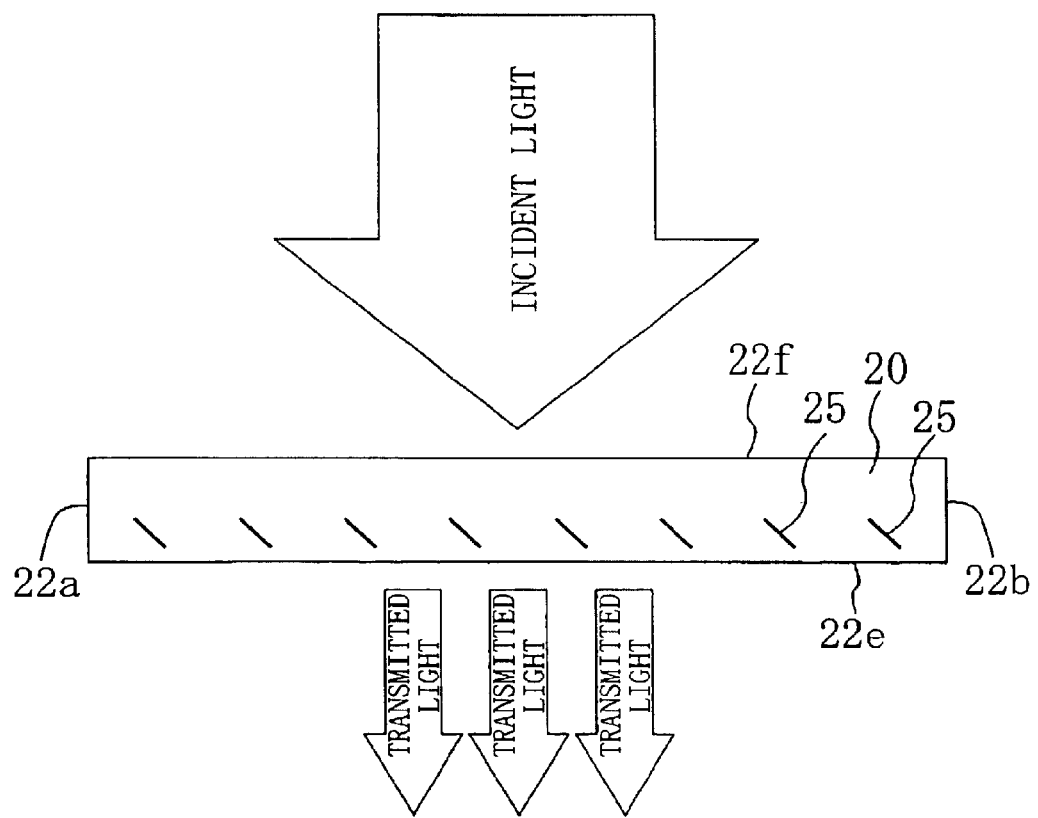

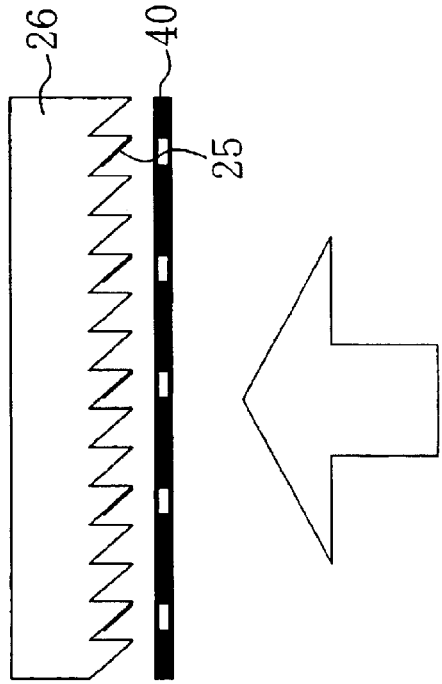
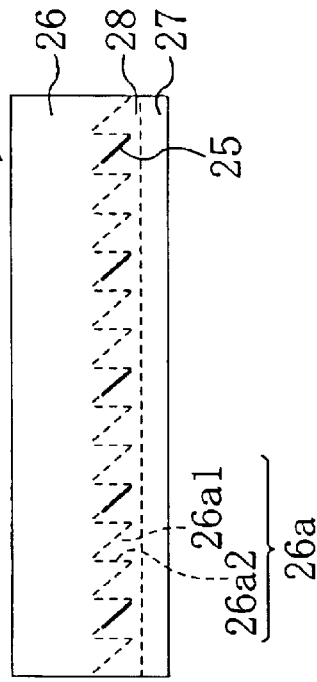
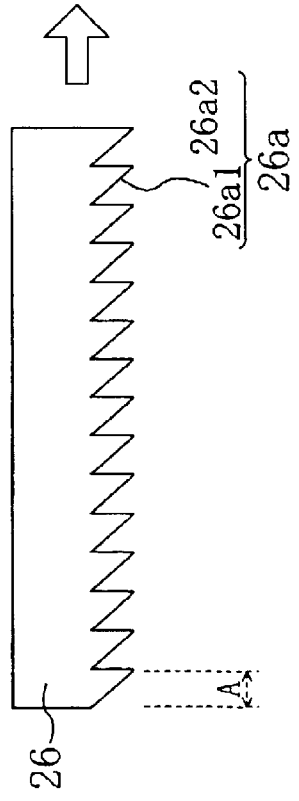
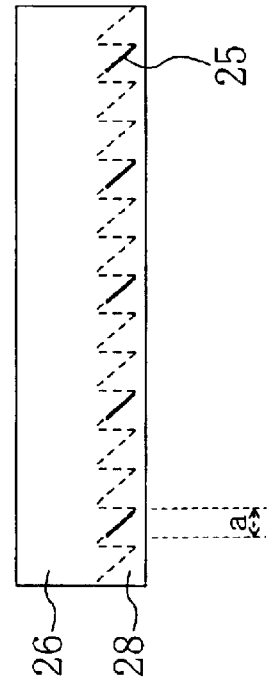

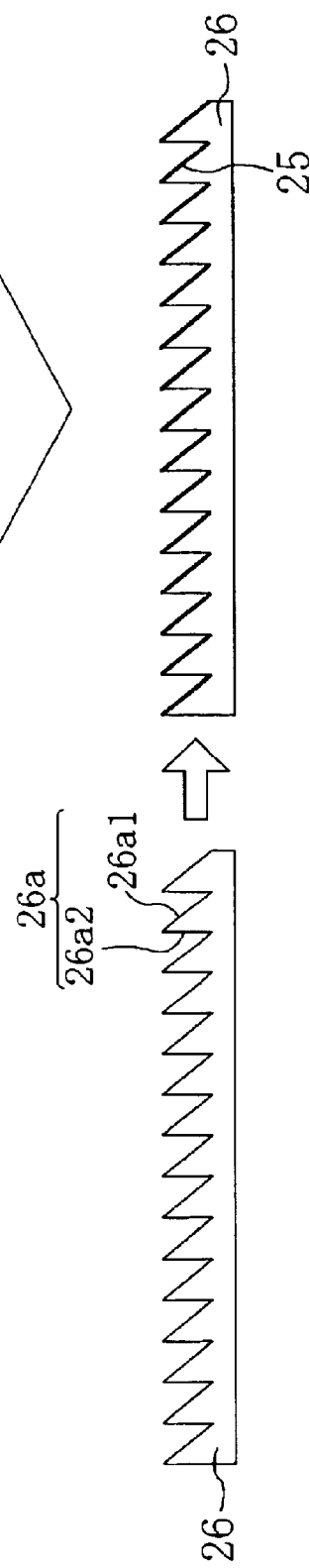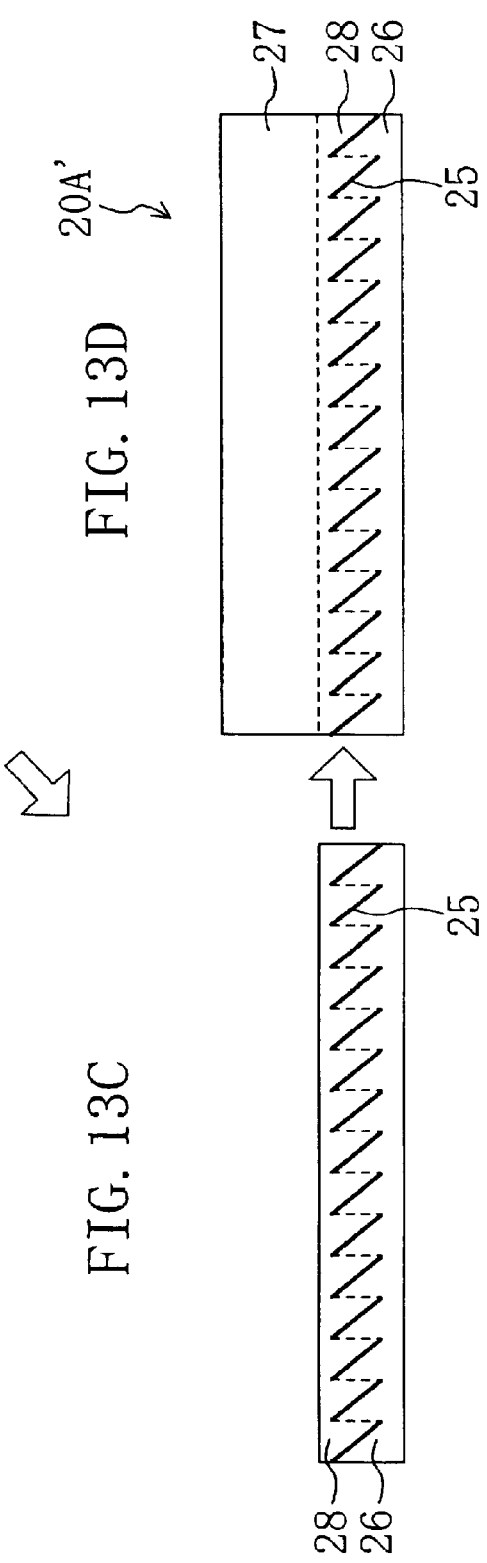

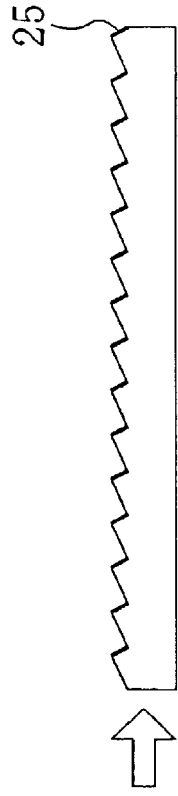
FIG. 14A
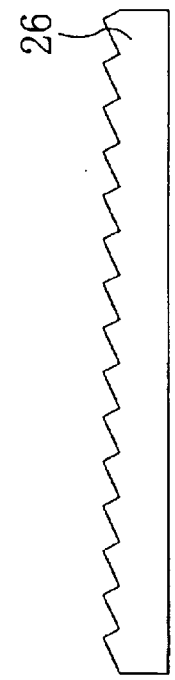
FIG. 14B
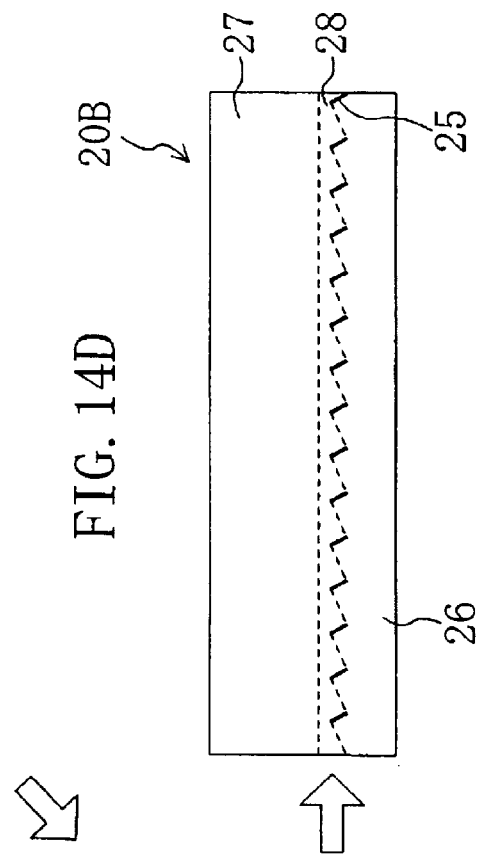
FIG. 14C
FIG. 14D

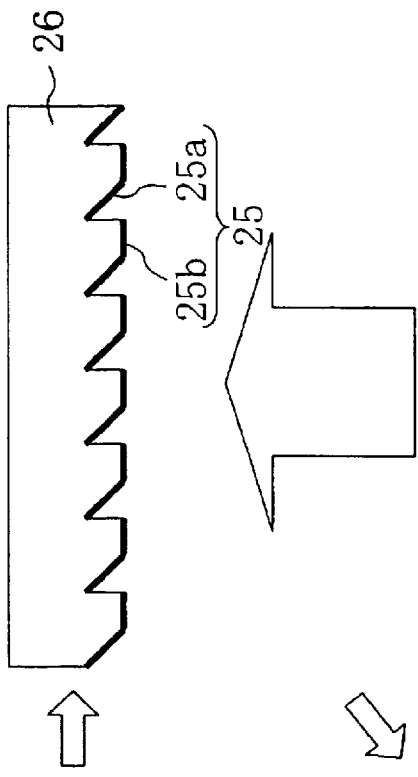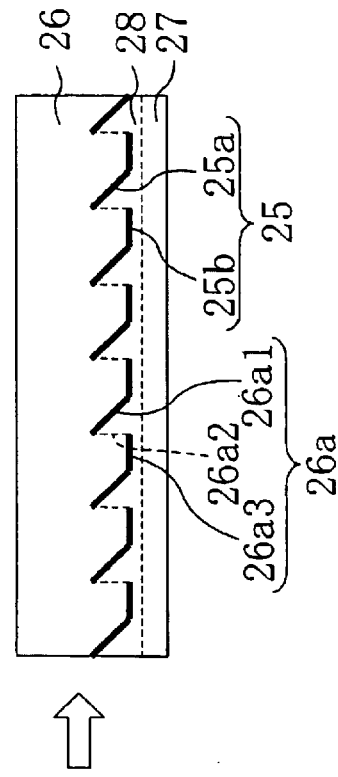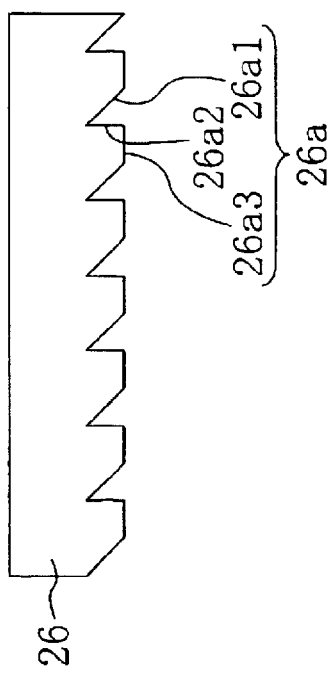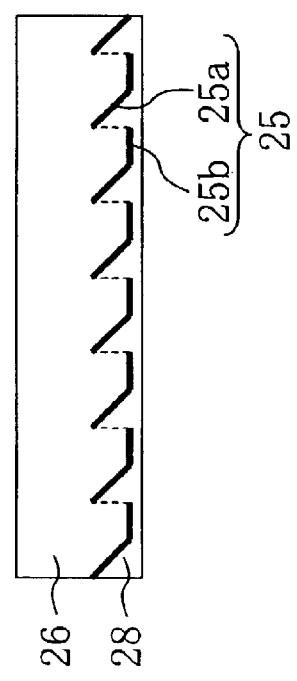

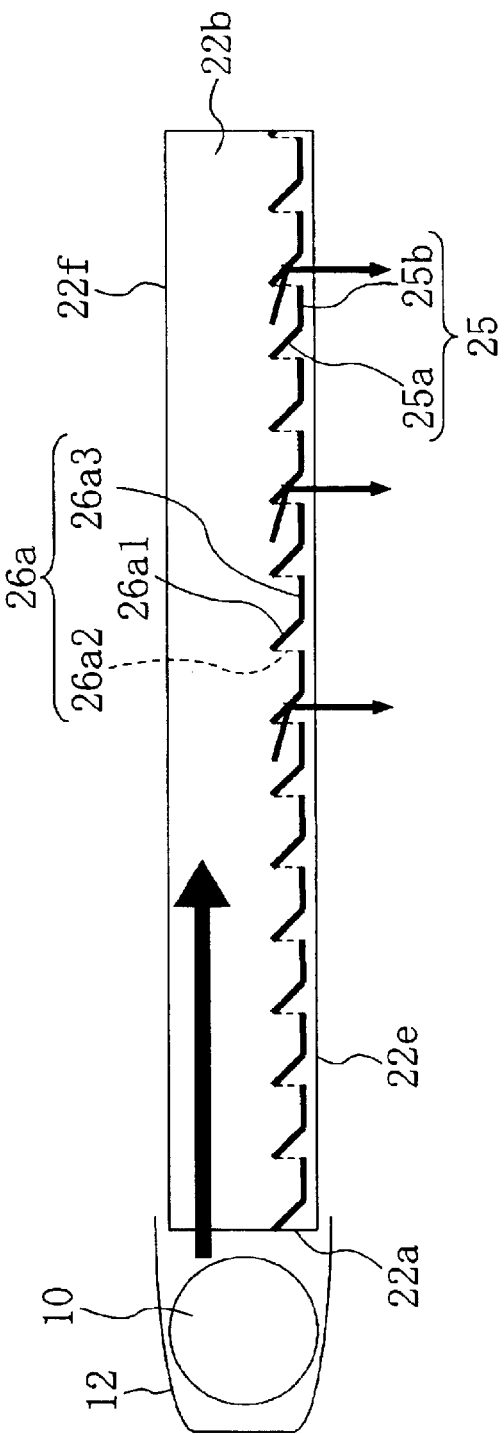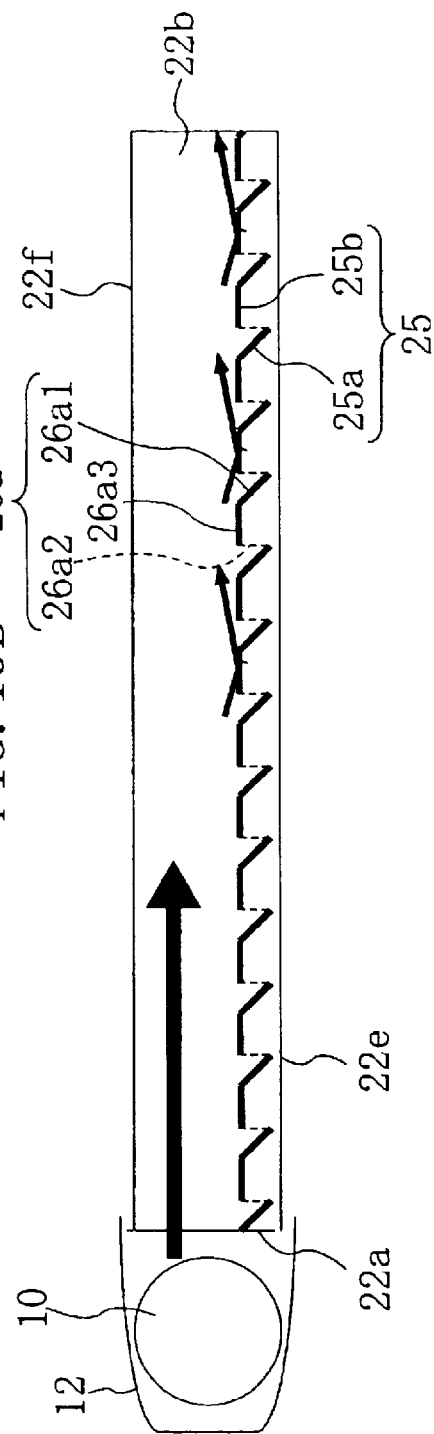

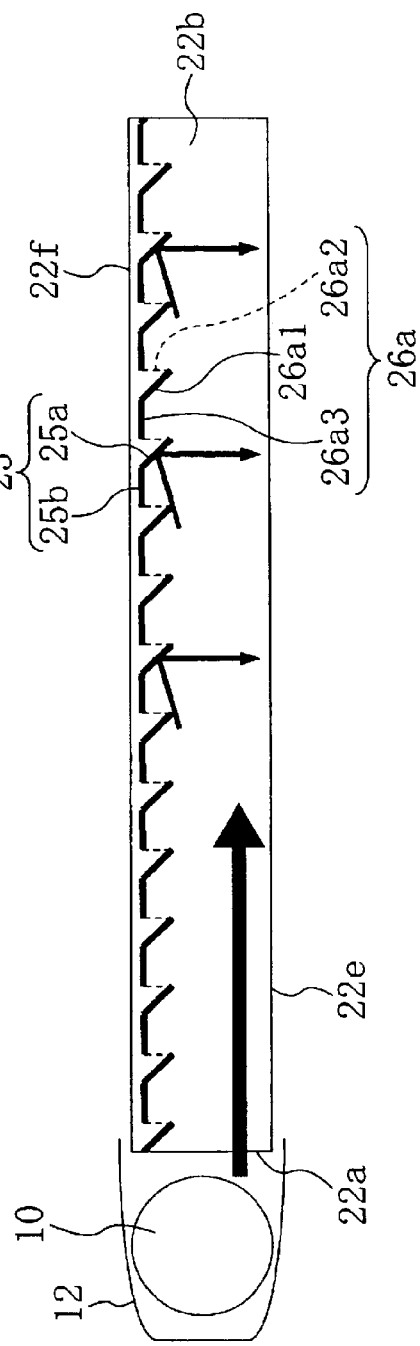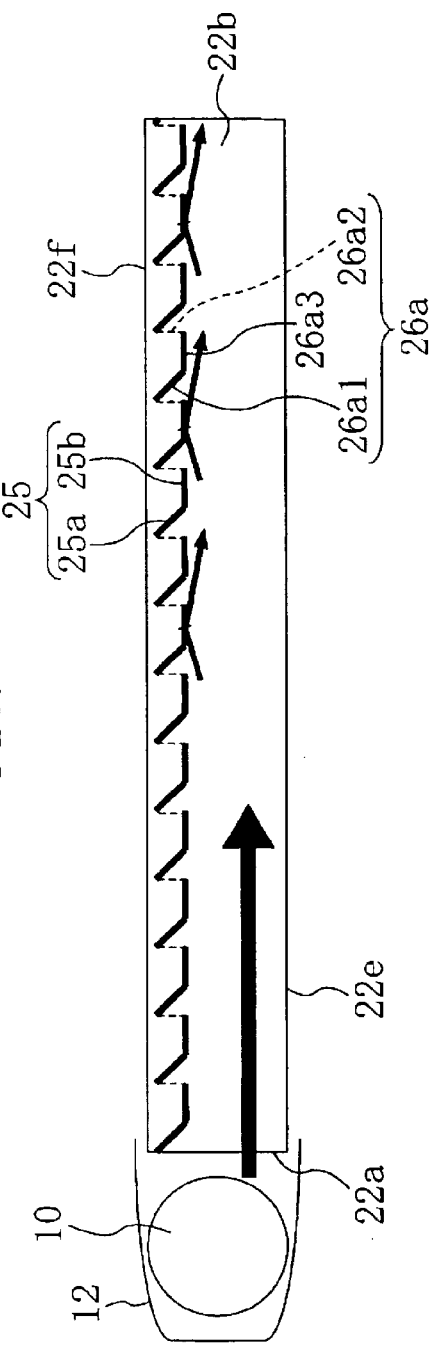

ILLUMINATING DEVICE, DISPLAY DEVICE HAVING THE SAME, AND LIGHT GUIDE PLATE

BACKGROUND OF THE INVENTION

1. Field of the Invention

The present invention generally relates to a light guide plate, an illuminating device and a display device having the same. More particularly, the present invention relates to a light guide plate preferably used as a frontlight of a reflection-type liquid crystal display device (LCD), an illuminating device and a display device having the same.

2. Description of the Background Art

Liquid crystal display devices (LCDs) are thin, low power consumption display devices. Because of such characteristics, the LCDs are recently used in a variety of applications including office automation (OA) equipments such as word processors and personal computers, portable information equipments such as electronic organizers, and camera-incorporated VTRs (video tape recorders) having a liquid crystal monitor.

These LCDs are roughly divided into two types: reflection type and transmission-type. An LCD is not a self-light-emitting display device such as CRT (cathode ray tube) and EL (electroluminescence). For display, a transmission-type LCD uses light of an illuminating device provided behind a liquid crystal display (LCD) panel (so-called backlight), whereas a reflection-type LCD uses ambient light.

Some known reflection-type LCDs have an illuminating device for improving display quality when ambient light having a sufficient intensity is not available. This illuminating device is called "frontlight", while the illuminating device of the transmission-type LCDs is called "backlight".

Various illuminating devices are conventionally proposed as such a backlight and frontlight. For example, Japanese Laid-Open Publication No. 8-94844 discloses an illuminating device 400 used as a backlight and frontlight, as schematically shown in FIG. 38. Hereinafter, the structure of a reflection-type LCD 450 having the illuminating device 400 as a frontlight will be described with reference to FIG. 38.

The reflection-type LCD 450 has a reflection-type LCD panel 430 and an illuminating device (frontlight) 400 provided on the viewer side of the reflection-type LCD panel 430. The illuminating device 400 has a light source 410 and a light guide plate 420. A reflecting member 412 surrounds the light source 410.

The light guide plate 420 has a first side surface (incident side surface) 422a located at the light source 410, a second side surface (opposing side surface) 422b facing the first side surface 422a, third and fourth side surfaces (not shown), an emitting surface 422c for emitting the incident light from the light source 410, and an opposing surface 422d facing the emitting surface 422c. The third and fourth side surfaces are located between the first side surface 422a and the second side surface 422b so as to face each other. The reflection-type LCD panel 430 is mounted so as to face the emitting surface 422c of the light guide plate 420. The opposing surface 422d has propagating surfaces 422d1 and reflecting surfaces 422d2, and has a saw-tooth cross-section.

Light emitted from the light source 410 into the light guide plate 420 through the first side surface 422a is propagated toward the second side surface 422b while being repeatedly totally reflected by the propagating surfaces 422d1 and the emitting surface 422c. The light propagated through the light guide plate 420 is partially reflected by the reflecting surfaces 422d2 and emitted from the emitting surface 422c toward the reflection-type LCD panel 430. The light reflected by the reflection-type LCD panel 430 is directed back into the light guide plate 420 through the emitting surface 422c. After passing through the light guide plate 420, the reflected light is emitted from the opposing surface 422d toward the viewer for use in display.

Japanese Laid-Open Publication No. 10-268307 discloses an illuminating device 500 used as a frontlight, as schematically shown in FIG. 39A. Hereinafter, the structure of a reflection-type LCD 550 having the illuminating device 500 as a frontlight will be described with reference to FIG. 39A.

The reflection-type LCD 550 has a reflection-type LCD panel 530 and an illuminating device (frontlight) 500 provided on the viewer side of the reflection-type LCD panel 530. The illuminating device 500 has a light source 510 and a light guide plate 520. A reflecting member 512 surrounds the light source 510. A condenser 513 is provided between the light source 510 and the light guide plate 520.

The light guide plate 520 has an incident side surface 520a located at the light source 510, an emitting surface 520b facing the reflection-type LCD panel 530, an opposing surface 520c located on the viewer side and facing the emitting surface 520b, and first and second side surfaces (not shown). The first and second side surfaces face each other with the incident side surface, emitting surface and opposing surface interposed therebetween. The light guide plate 520 has a wedge-like shape so that the distance between the emitting surface 520b and the opposing surface 520c is reduced as the distance from the incident side surface 520a is increased. The light guide plate 520 has a triangular cross section along the direction perpendicular to the emitting surface 520b and the opposing surface 520c. The incident side surface 520a is tilted with respect to the normal to the emitting surface 520b, and forms an obtuse angle with the emitting surface 520b.

Light emitted from the light source 510 into the light guide plate 520 through the incident side surface 520a is propagated within the light guide plate 520. Of the light propagated within the light guide plate 520, the light that does not satisfy the conditions for total reflection at the emitting surface 520a is emitted from the emitting surface 520b toward the reflection-type LCD panel 530. The light reflected by the reflection-type LCD panel 530 is directed back into the light guide plate 520 through the emitting surface 520b. After passing through the light guide plate 520, the reflected light is emitted from the opposing surface 520c toward the viewer for use in display.

Japanese Laid-Open Publication No. 10-268307 discloses a reflection-type LCD 550' having an illuminating device 500' used as a frontlight, as schematically shown in FIG. 39B. The reflection-type LCD 550' is different from the reflection-type LCD 550 in that the reflection-type LCD 550' has a light traveling direction controller 524. In the reflection-type LCD 550', the light traveling direction controller 524 is provided so as to face the emitting surface 520b of the light guide plate 520. Therefore, as the light emitted from the emitting surface 520b passes through the light traveling direction controller 524, the traveling direction thereof is changed toward the direction normal to the emitting surface 520b.

However, the inventor found that the illuminating devices disclosed in the above publications have the following problems:

In the illuminating device 400 disclosed in the aforementioned Japanese Laid-Open Publication No. 8-94844, the propagating surfaces 422d1 and the reflecting surfaces 422d2 form concaves and convexes at the opposing surface 422d of the light guide plate 420. Therefore, any damage to such concaves and convexes or adhesion of foreign matters thereto would adversely affect the illumination light, degrading display quality of the LCD. When the illuminating device 400 is used as a frontlight, the opposing surface 422d is located on the viewer side. Therefore, such problems are especially likely to occur, and the reflection-type LCD 450 having the illuminating device 400 as a frontlight as shown in FIG. 38 would be subjected to significant degradation in display quality.

In order to prevent such damages to the concaves and convexes and adhesion of foreign matters thereto, a display device 600 mounted in a portable terminal (RZ-J90) made by SANYO Electric Co., Ltd. has a protection plate 630 on the front (viewer side) of a light guide plate 620, as schematically shown in FIG. 40A.

As schematically shown in FIG. 40B, a display device 700 mounted in a portable terminal (MI-310) made by Sharp Corporation has a touch panel 730 on the front (viewer side) of a light guide plate 720. In the display device 700, the touch panel 730 functions as the above protection plate. Typically, the touch panel 730 is a lamination of a lower electrode substrate 731 and an upper electrode film 736 with an adhesive portion 733 interposed therebetween. The lower electrode substrate 731 has a lower electrode 732 of a transparent conductive film and a spacer 738 thereon. The upper electrode film 736 has an upper electrode 734 of a transparent conductive film thereon. When information is input to the touch panel 730, the upper electrode film 736 is pressed and the upper electrode 734 is electrically connected to the lower electrode 732 according to deformation of the pressed upper electrode film 736.

However, when a protection plate or touch panel is provided on the front of the light guide plate as in the above examples, surface reflection of the protection plate or touch panel degrades display quality of the display device. Moreover, the overall thickness of the display device is increased.

On the other hand, in the illuminating device 500 disclosed in the aforementioned Japanese Laid-Open Publication No. 10-268307, the light guide plate 520 does not have any concaves and convexes at its surface. Therefore, the illumination light will not be adversely affected by damages thereto and the like.

In this illuminating device 500, however, the light emitted from the emitting surface 520b does not travel in the direction perpendicular to the emitting surface 520b. Accordingly, the reflection-type LCD panel 530 cannot be effectively illuminated. By increasing the angle between the emitting surface 520b and the opposing surface 520c, the traveling direction of the emitted light can be made closer to the direction normal to the emitting surface 520b. However, this increases the thickness of the light guide plate 520 and thus increases the overall thickness of the display device.

The illuminating device 500' disclosed in the aforementioned Japanese Laid-Open Publication No. 10-268307 has the light traveling direction controller 524 capable of making the traveling direction of the light emitted from the emitting surface 520b closer to the direction normal to the emitting surface 520b. However, the light traveling direction controller 524 also changes the traveling direction of the light emitted from the reflection-type LCD 530 when the emitted light passes therethrough. As a result, the reflection-type LCD 550' having the illuminating device 500' cannot effectively display an image.

SUMMARY OF THE INVENTION

The present invention is made in view of the above problems, and it is an object of the present invention to provide a reliable light guide plate, an illuminating device and a display device having the same.

According to one aspect of the present invention, an illuminating device includes a light source and a light guide plate. The light guide plate has a first side surface receiving light emitted from the light source, a second side surface facing the first side surface, a third side surface, a fourth side surface, an emitting surface and an opposing surface, the third and fourth side surfaces are located between the first and second side surfaces so as to face each other, and the emitting surface and the opposing surface face each other with the first, second, third and fourth side surfaces interposed therebetween. The light guide plate is formed from a first light guide layer and a second light guide layer each having a prescribed thickness in a direction normal to the emitting surface. The first light guide layer has a plurality of reflecting films therein for reflecting light entering the light guide plate through the first side surface toward the emitting surface. The second light guide layer has no reflecting film. The above object is thus achieved.

Preferably, an angle $\alpha$ between a tangent line of the reflecting film and the emitting surface and a critical angle $\theta$ of the light guide plate satisfy the following relation:

$$45°-\theta/2<\alpha<45°+\theta/2.$$

Preferably, an angle $\alpha$ between a tangent line of the reflecting film and the emitting surface and a critical angle $\theta$ of the light guide plate satisfy the following relation:

$$\theta<\alpha<45°+\theta/2.$$

Preferably, a light transmittance of the light guide plate is at least 85%.

Preferably, a sum $\Sigma\Delta s$ of respective areas $\Delta s$ of the reflecting films projected on the emitting surface, a reflectance r of the reflecting film, and an area S of the emitting surface of the light guide plate satisfy the following relation:

$$0<(\Sigma\Delta s/S)\cdot r\leq 0.08.$$

The reflecting films may have a line shape when viewed from the direction normal to the emitting surface.

The reflecting films may have an island shape when viewed from the direction normal to the emitting surface.

The reflecting films may be transparent dielectric films or dielectric multi-layer films.

Preferably, provided that a principal ray of the light entering the light guide plate through the first side surface is incident on the dielectric films or the dielectric multi-layer films at an incident angle $\beta$, a refraction angle $\gamma$ of the principal ray in the dielectric film or the dielectric multi-layer film, a thickness d of the dielectric film or the dielectric multi-layer film, a refractive index n of the dielectric film or the dielectric multi-layer film, and a refractive index $n_0$ of the first light guide layer satisfy the following relation:

$$380/(4n\cdot\cos\gamma)\leq d\leq 780/(4n\cdot\cos\gamma), \text{ and}$$

$$n_0\cdot\sin\beta=n\cdot\sin\gamma.$$

The light guide plate may be a lamination of a first light guide element and a second light guide element with an adhesive layer interposed therebetween. In this lamination, the first light guide element, the adhesive layer and the second light guide element are laminated in the direction normal to the emitting surface. A surface of the first light guide element which faces the adhesive layer may have a plurality of tilted regions that are tilted with respect to the emitting surface. The reflecting films may be formed on the tilted regions of the surface.

Preferably, the surface of the first light guide element which faces the adhesive layer further has a plurality of vertical regions that extend approximately perpendicularly to the emitting surface, and the tilted regions and the vertical regions are alternately arranged in a prescribed direction.

Preferably, a width A of the tilted region of the surface in the prescribed direction and a width a of the reflecting film in the prescribed direction satisfy the following relation:

$$0 < a \leq A.$$

The reflecting films may be formed over a whole surface of the tilted regions of the surface.

The surface of the first light guide element which faces the adhesive layer may further have a plurality of vertical regions that extend approximately perpendicularly to the emitting surface and a plurality of parallel regions that extend approximately in parallel with the emitting surface. Typically, the tilted regions, the vertical regions and the parallel regions are arranged in prescribed order along a prescribed direction in a cyclic manner. When the surface of the first light guide element which faces the adhesive layer is located near the emitting surface of the light guide plate, the parallel regions are preferably located closer to the emitting surface than are the tilted regions. When the surface of the first light guide element which faces the adhesive layer is located near the opposing surface of the light guide plate, the parallel regions are preferably located closer to the opposing surface than are the tilted regions.

Preferably, the first light guide element and the adhesive layer have approximately the same refractive index.

The light guide plate may be a lamination of a first light guide element and a second light guide element. In this lamination, the first light guide element and the second light guide element are laminated in the direction normal to the emitting surface. A surface of the first light guide element which faces the second light guide element may have a plurality of tilted regions that are tilted with respect to the emitting surface. The reflecting films may be formed on the tilted regions of the surface.

The second light guide element may be located on a viewer side of the first light guide element and function also as a transparent input device.

According to another aspect of the present invention, a display device includes an illuminating device having the above structure and a reflection-type display panel facing the light guide plate of the illuminating device on a side opposite to a viewer. The above object is thus achieved.

According to still another aspect of the present invention, a light guide plate has a first side surface receiving light emitted from a light source, a second side surface facing the first side surface, a third side surface, a fourth side surface, an emitting surface and an opposing surface. The third and fourth side surfaces are located between the first and second side surfaces so as to face each other, and the emitting surface and the opposing surface face each other with the first, second, third and fourth side surfaces interposed therebetween. The light guide plate is formed from a first light guide layer and a second light guide layer each having a prescribed thickness in a direction normal to the emitting surface. The first light guide layer has a plurality of reflecting films therein for reflecting light entering the light guide plate through the first side surface toward the emitting surface. The second light guide layer has no reflecting film. The above object is thus achieved.

According to the present invention, a reliable illuminating device is provided, and a display device capable of providing high quality display is provided by using the illuminating device.

The illuminating device of the present invention can be preferably used as a backlight or frontlight of an LCD. In the illuminating device of the present invention, illumination light having desired characteristics is obtained by appropriately setting arrangement of the reflecting films within the light guide plate. In particular, the illuminating device of the present invention is preferably used as a frontlight of a reflection-type display device.

BRIEF DESCRIPTION OF THE DRAWINGS

FIG. 5 schematically illustrates a method for measuring the light transmittance of the light guide plate 20 of the illuminating device 100 according to an embodiment of the present invention;

FIGS. 10A, 10B, 10C and 10D schematically show the structure of a light guide plate 20A preferably used in the illuminating device 100 according to an embodiment of the present invention, and a manufacturing method thereof;

FIGS. 13A, 13B, 13C and 13D schematically show the structure of a light guide plate 20A' preferably used in the illuminating device 100 according to an embodiment of the present invention, and a manufacturing method thereof, FIGS. 14A, 14B, 14C and 14D schematically show the structure of another light guide plate 20B preferably used in the illuminating device 100 according to an embodiment of the present invention, and a manufacturing method thereof, FIGS. 15A, 15B, 15C and 15D schematically show the structure of still another light guide plate 20C preferably used in the illuminating device 100 according to an embodiment of the present invention, and a manufacturing method thereof, FIGS. 16A, 16B, 16C and 16D schematically show the structure of yet another light guide plate 20D preferably used in the illuminating device 100 according to an embodiment of the present invention, and a manufacturing method thereof.

FIGS. 19A and 19B schematically show how the light is propagated when a surface 26a of the first light guide element 26 is located near an emitting surface 22e, wherein FIG. 19A shows the case where parallel regions 26a3 are located closer to the emitting surface 22e than are tilted regions 26a1, and FIG. 19B shows the case where the tilted regions 26a1 are located closer to the emitting surface 22e than are the parallel regions 26a3;

FIGS. 20A and 20B schematically show how the light is propagated when the surface 26a of the first light guide element 26 is located near an opposing surface 22f, wherein FIG. 20A shows the case where the parallel regions 26a3 are located closer to the opposing surface 22f than are the tilted regions 26a1, and FIG. 20B shows the case where the tilted regions 26a1 are located closer to the opposing surface 22f than are the parallel regions 26a3;

DETAILED DESCRIPTION OF THE PREFERRED EMBODIMENTS

Hereinafter, embodiments of the present invention will be described in conjunction with the accompanying drawings.

Figure 1:
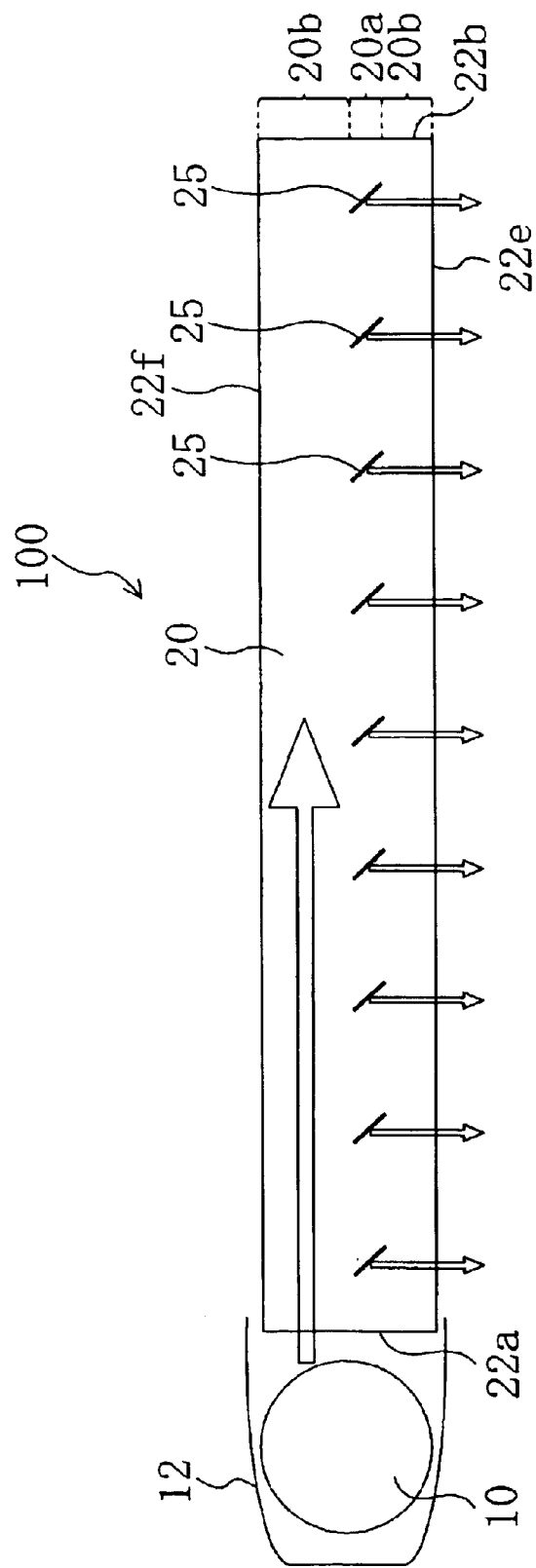
FIG. 1 is a schematic cross-sectional view of an illuminating device 100 according to an embodiment of the present invention.

First, the structure and functions of an illuminating device 100 according to an embodiment of the present invention will be described with reference to FIGS. 1 and 2. FIG. 1 is a schematic cross-sectional view of the illuminating device 100 and FIG. 2 is a schematic top view of the illuminating device 100.

The illuminating device 100 has a light source 10 and a light guide plate 20. Typically, a reflecting member 12 for allowing the light emitted from the light source 10 to be efficiently incident on the light guide plate 20 is provided so as to surround the light source 10.

Figure 2:
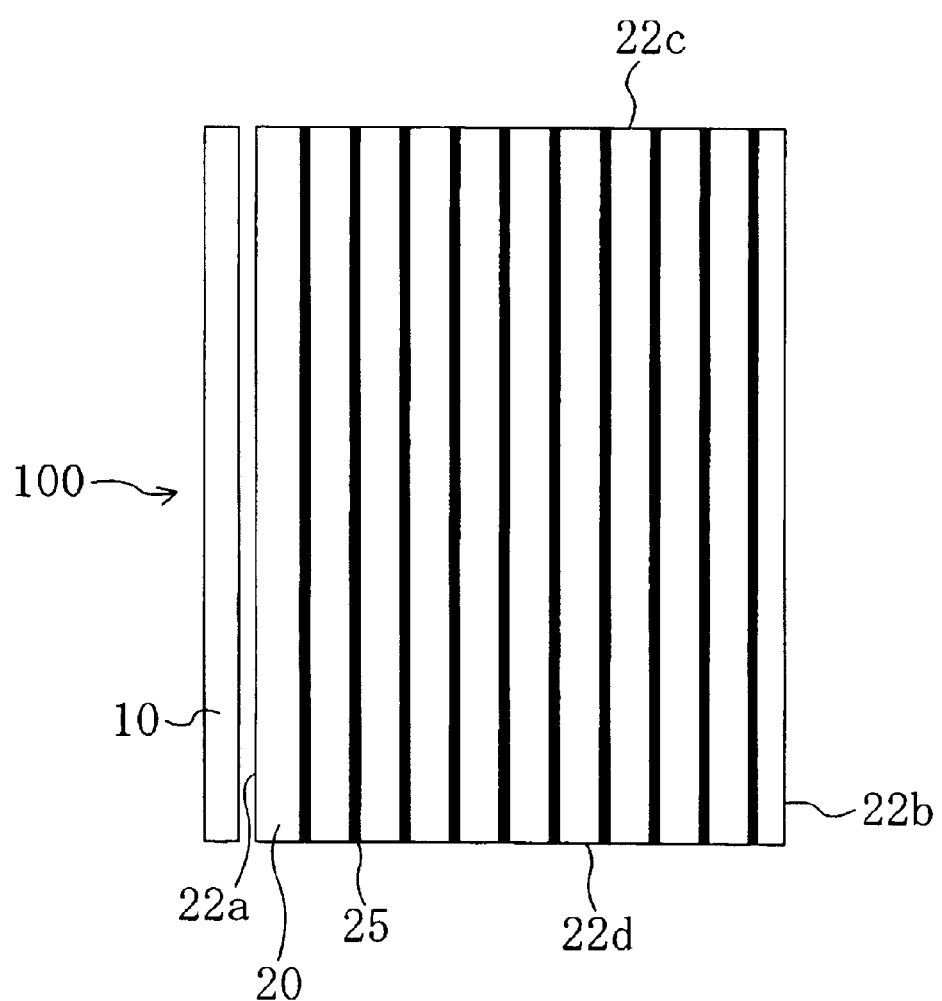
FIG. 2 is a schematic top view of the illuminating device 100 according to an embodiment of the present invention.

As shown in FIGS. 1 and 2, the light guide plate 20 has a first side surface 22a receiving light emitted from the light source 10, a second side surface 22b facing the first side surface 22a, a third side surface 22c, a fourth side surface 22d, an emitting surface 22e and an opposing surface 22f. The third side surface 22c and the fourth side surface 22d are located between the first side surface 22a and the second side surface 22b so as to face each other. The emitting surface 22e and the opposing surface 22d face each other with the first to fourth side surfaces interposed therebetween. Typically, the first side surface 22a and the second side surface 22b extend in parallel with each other, and the third side surface 22c and the fourth side surface 22d extend in parallel with each other. Typically, the first side surface 22a and the second side surface 22b extend perpendicularly to the third side surface 22c and the fourth side surface 22d.

The light guide plate 20 has a plurality of reflecting films 25 therein. Light emitted from the light source 10 enters the light guide plate 20 through the first side surface 22a and is propagated toward the second side surface 22b. The light propagated toward the second side surface 22b is partially reflected by the reflecting films 25 toward the emitting surface 22e. The light thus reflected is emitted from the emitting surface 22e.

A region of the light guide plate 20 having a function to reflect the light entering the light guide plate 20 toward the emitting surface 22e is herein defined as a first light guide layer 20a, and the remaining region is defined as a second light guide layer 20b. Each of the first light guide layer 20a and the second light guide layer 20b has a prescribed thickness in the direction normal to the emitting surface 22e. In other words, the light guide plate 20 is formed from the first light guide layer 20a having therein a plurality of reflecting films 25 for reflecting the light entering the light guide plate 20 through the first side surface 22a toward the emitting surface 22e, and the second light guide layer 20b having no reflecting film.

As described above, the light guide plate 20 in the illuminating device 100 of the present invention has the plurality of reflecting films 25 therein for reflecting the light entering the light guide plate 20 through the first side surface 22a toward the emitting surface 22e. As a result, the light entering the light guide plate 20 through the first side surface 22a is emitted from the emitting surface 22e for illumination. This eliminates the need for a surface of the light guide plate 20 (e.g., the opposing surface 22f) to have a structure (such as concaves and convexes) for emitting the light. Accordingly, the illumination light is prevented from being adversely affected by damages to this structure and adhesion of foreign matters thereto. The illuminating device 100 of the present invention is thus a reliable illumination device providing uniform illumination light. Using the illuminating device 100 of the present invention in a display device enables high-quality display to be implemented. As described below, by appropriately arranging the reflecting films 25, the illuminating device 100 of the present invention provides illumination light having desired characteristics. This eliminates the need to provide an auxiliary means for controlling the traveling direction of the emitted light and the like, thereby preventing display quality of the display device from being degraded by such an auxiliary means. Moreover, no protection plate need be provided on the viewer side of the light guide plate 20, enabling reduction in thickness of the device.

Hereinafter, preferred arrangement of the reflecting films 25 in the illuminating device 100 of the present invention will be described.

Figure 3A:
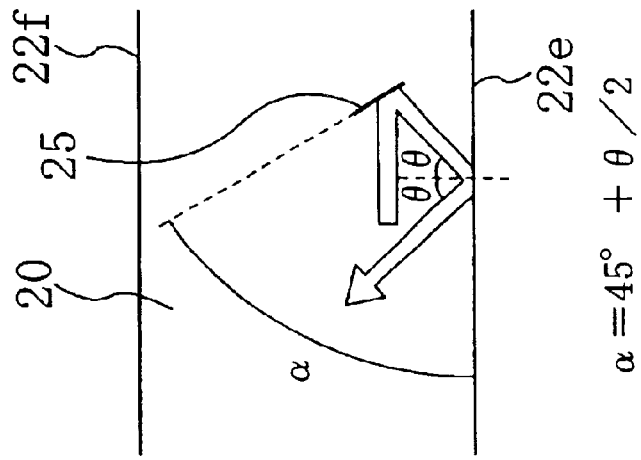
FIGS. 3A, 3B and 3C illustrate preferred arrangement of reflecting films 25 included in a light guide plate 20 of the illuminating device 100 according to an embodiment of the present invention.

First, preferred arrangement of the reflecting films 25 which allows the light emitted from the light source 10 into the light guide plate 20 through the first side surface 22a to be emitted efficiently from the emitting surface 22e will be described with reference to FIGS. 3A to 3C. In the illuminating device 100, light emitted from the light source 10 into the light guide plate 20 and traveling approximately in parallel with the emitting surface 22e of the light guide plate 20 contributes to illumination (such light is sometimes referred to as principal ray). Note that, in FIGS. 3A to 3C, the left side of the figure refers to the side of the light source 10 (the first side surface 22a) and the right side of the figure refers to the side of the second side surface 22b. The light emitted from the light source 10 into the light guide plate 20 is propagated from left to right in the figure.

For example, the reflecting films 25 in the light guide plate 20 may have a planar shape and be tilted with respect to the emitting surface 22a of the light guide plate 20, as shown in FIG. 1. It is now assumed that an angle between the tangent line of the reflecting film 25 and the emitting surface 22e is $\alpha$ (when the reflecting films 25 have a planar shape as shown in FIG. 1, this angle is a tilt angle of the surface of the reflecting film 25 with respect to the emitting surface 22e). When each reflecting film 25 is formed at $\alpha=45°$ as shown in FIG. 3A, the principal ray reflected by the reflecting film 25 is incident on the emitting surface 22e at an incident angle of 0°. Accordingly, most of the principal ray is emitted from the emitting surface 22e.

Figure 3B:
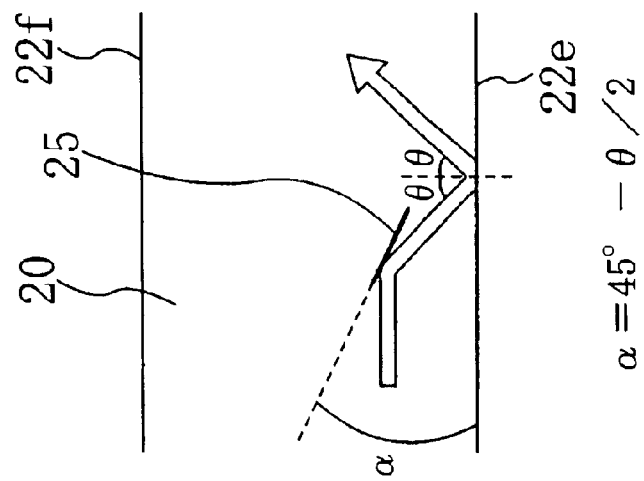
Figure 3C:
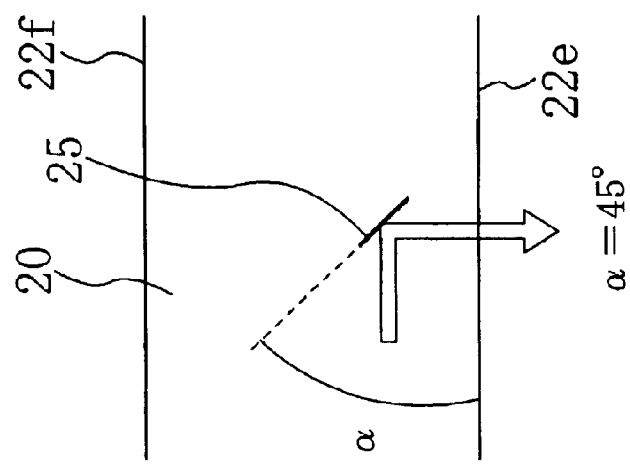

On the other hand, provided that a critical angle of the light guide plate 20 is $\theta$ and each reflecting film 25 is formed at $\alpha=45°-\theta/2$ as shown in FIG. 3B, the principal ray reflected by the reflecting film 25 is incident on the emitting surface 22e at an incident angle $\theta$. Accordingly, most of the principal ray is totally reflected by the emitting surface 22e and will not be emitted therefrom. When each reflecting film 25 is formed at $\alpha=45°+\theta/2$ as shown in FIG. 3C, the principal ray reflected by the reflecting film 25 is incident on the emitting surface 22e at an incident angle $\theta$. Accordingly, most of the principal ray is totally reflected by the emitting surface 22e and will not be emitted therefrom.

When the reflecting films 25 are formed so that the angle $\alpha$ between the tangent line of the reflecting film 25 and the emitting surface 22e and the critical angle $\theta$ of the light guide plate 20 satisfy the following expression (1), the principal ray is efficiently emitted from the emitting surface 22e, implementing illumination with high light utilization efficiency:

$$45°-\theta/2 < \alpha < 45°+\theta/2 \qquad (1)$$

Note that the shape of the reflecting films 25 is not limited to the planar shape.

The reflecting films 25 may have various shapes such as curved shape as long as the angle $\alpha$ between the tangent line of the reflecting film 25 and the emitting surface 22e and the critical angle $\theta$ of the light guide plate 20 satisfy the above expression (1). When the reflecting films 25 have a curved shape, each reflecting film 25 may have a plurality of tangent lines. In this case, forming the reflecting films 25 so that the respective angles between the plurality of tangent lines and the emitting surface 22e satisfy the above expression (1) enables display with high light utilization efficiency to be implemented.

When the illuminating device 100 of the present invention is used as a frontlight of a reflection-type LCD, the light guide plate 20 of the illuminating device 100 is provided on the viewer side of a reflection-type LCD panel. The reflection-type LCD utilizes not only light emitted from the light source 10 of the illuminating device 100 but also light entering the light guide plate 20 from the viewer side for display. If the light entering the light guide plate 20 from the viewer side (from the opposing surface 22f) is reflected by the reflecting films 25 back toward the viewer, display quality of the reflection-type LCD would be degraded.

However, such degradation in display quality is prevented by optimizing the arrangement of the reflecting films 25 based on the knowledge described below. Hereinafter, preferred arrangement of the reflecting films 25 which prevents degradation in display quality caused by reflection of the light entering from the viewer side by the reflecting films 25 will be described with reference to FIGS. 4A to 4C.

In the illuminating device 100 of the present invention, the emitting surface 22e and the opposing surface 22f typically extend approximately in parallel with each other. In this case, the light entering the light guide plate 20 from the viewer side (from the opposing surface 22f) is refracted at a refraction angle equal to or smaller than the critical angle θ of the light guide plate 20 when it enters the light guide plate 20 from the opposing surface 22f.

It is now assumed that L1 is light entering the light guide plate 20 from the opposing surface 22f and traveling therein in the direction in parallel with the direction normal to the emitting surface 22e, L2 is light entering the light guide plate 20 from the opposing surface 22f and traveling therein at a tilt angle +θ with respect to the direction normal to the emitting surface 22e, and L3 is light entering the light guide plate 20 from the opposing surface 22f and traveling therein at a tilt angle −θ with respect to the direction normal to the emitting surface 22e. In this case, the above degradation in display quality is prevented by forming the reflecting films 25 so that the lights L1, L2, L3 will not be emitted from the opposing surface 22f after being reflected by the reflecting films 25. Note that the tilt angle +θ refers to a tilt angle of light having a traveling vector of the light L1 rotated by θ in the clockwise direction, and the tilt angle −θ refers to a tilt angle of light having a traveling vector of the light L1 rotated by θ in the counterclockwise direction.

Figure 4A:
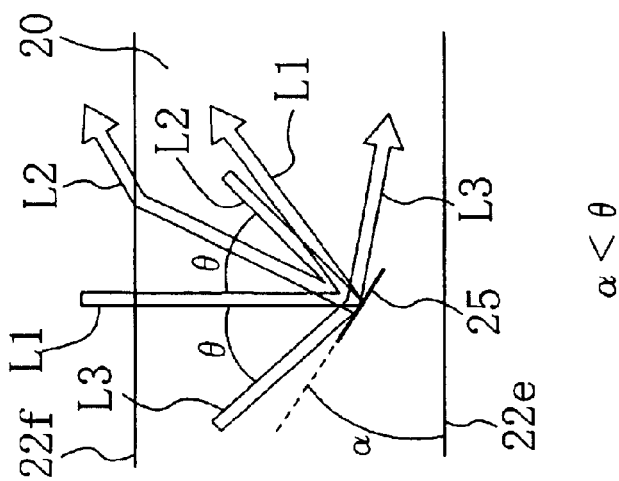
FIGS. 4A, 4B and 4C illustrate preferred arrangement of the reflecting films 25 included in the light guide plate 20 of the illuminating device 100 according to an embodiment of the present invention.

For example, when each reflecting film 25 is formed at α=θ as shown in FIG. 4A, the lights L1, L2, L3 entering the light guide plate 20 from the viewer side (from the opposing surface 22f) are reflected by the reflecting film 25 and reach the opposing surface 22f or the emitting surface 22e at an angle that satisfies the conditions for total reflection. The lights L1, L2, L3 will not reach the opposing surface 22f at an angle smaller than the critical angle θ. Accordingly, the lights L1, L2, L3 will not be emitted from the opposing surface 22f.

Figure 4B:
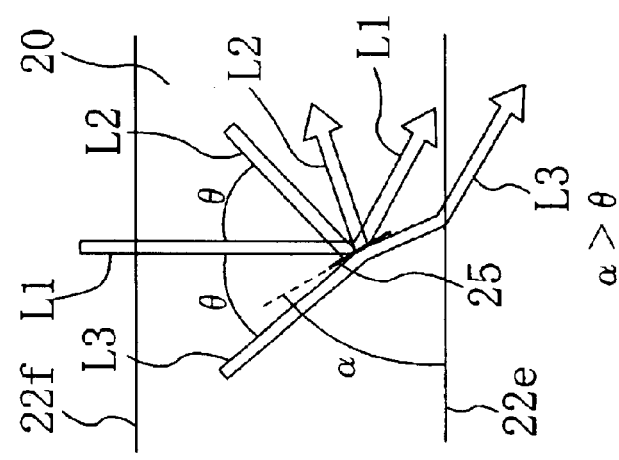

When each reflecting film 25 is formed at α>θ as shown in FIG. 4B, the lights L1, L2 of the lights L1, L2, L3 entering the light guide plate 20 from the viewer side are reflected by the reflecting film 25 and reach the opposing surface 22f or the emitting surface 22e at an angle that satisfies the conditions for total reflection. The lights L1, L2 will not reach the opposing surface 22f at an angle smaller than the critical angle θ. However, the light L3 is reflected by the reflecting film 25 and reaches the emitting surface 22e at an angle smaller than the critical angle θ. The light L3 is therefore emitted from the emitting surface 22e and used for display. Accordingly, the lights L1, L2, L3 will not be emitted from the opposing surface 22f.

Figure 4C:
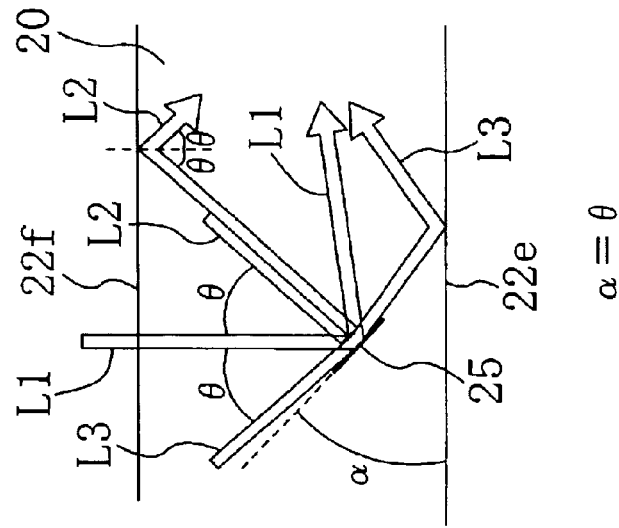

When each reflecting film 25 is formed at α<θ as shown in FIG. 4C, the lights L1, L3 of the lights L1, L2, L3 entering the light guide plate 20 from the viewer side are reflected by the reflecting film 25 and reach the opposing surface 22f or the emitting surface 22e at an angle that satisfies the conditions for total reflection. The lights L1, L3 will not reach the opposing surface 22f at an angle smaller than the critical angle θ. However, the light L2 is reflected by the reflecting film 25 and reaches the opposing surface 22e at an angle smaller than the critical angle θ. The light L2 is therefore emitted from the opposing surface 22e, degrading display quality of the reflection-type LCD.

Accordingly, when the reflecting films 25 are formed so that the angle α between the tangent line of the reflecting film 25 and the emitting surface 22e is equal to or larger than the critical angle θ of the light guide plate 20 ($\alpha \geq \theta$), the light entering the light guide plate 20 from the viewer side will not be emitted from the opposing surface 22f after being reflected by the reflecting films 25. Accordingly, degradation in display quality caused by the light emitted from the opposing surface 22f can be prevented.

In view of the expression (1) and the above knowledge, when the reflecting film 25 are formed so that the angle α between the tangent line of the reflecting film 25 and the emitting surface 22e and the critical angle θ of the light guide plate 20 satisfy the following expression (2), the light utilization efficiency is improved, and display quality will not be degraded even when the illuminating device is used as a frontlight of the reflection-type LCD:

$$0 \leq \alpha < +\theta/2 \qquad (2).$$

When the illuminating device 100 of the present invention is used as a frontlight of the reflection-type LCD, light entering the light guide plate 20 from the viewer side may be partially reflected by the reflecting films 25 without being emitted from the emitting surface 22e. This may reduce the amount of light entering the reflection-type LCD.

Figure 40A:
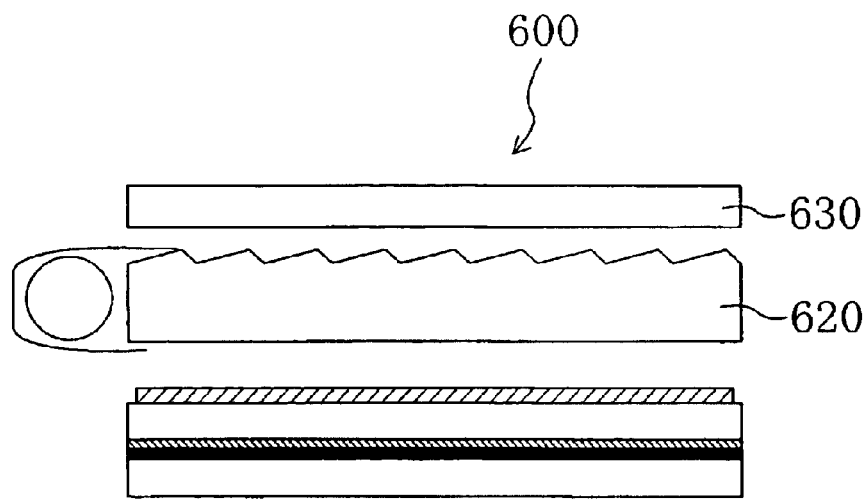
FIG. 40A is a schematic cross-sectional view of a conventional illuminating device 600 having a protection plate 630.

As shown in FIG. 40A, however, even when a protection plate is provided on the front of the conventional illuminating device that includes the light guide plate having concaves and convexes at the opposing surface, reflection by the surface of the protection plate reduces the amount of light entering the reflection-type LCD panel, thereby reducing brightness of the reflection-type LCD.

Therefore, when the reflecting films 25 are formed so that the level of reduction in brightness caused by the presence of the reflecting films 25 is equal to or smaller than that caused by the presence of the protection plate, the resultant display has brightness equal to or greater than that of the conventional illuminating device having the protection plate. Moreover, the illuminating device 100 of the present invention does not require a protection plate, enabling reduction in thickness of the display device.

A light guide element commonly used in a conventional illuminating device and a transparent flat plate used as a protection plate are both formed from polymethyl methacrylate having a refractive index of about 1.49 or polycarbonate having a refractive index of about 1.59, and the surface reflectance thereof is about 4%. Therefore, each of the light guide element and the protection plate has a reflectance of about 8% and a transmittance of about 92%. Accordingly, a lamination of the light guide element and the protection plate would have a reflectance of about 15% and a transmittance of about 85%. The light guide plate 20 of the illuminating device 100 of the present invention also has a surface reflectance of about 4%. Therefore, when the reflectance of the plurality of reflecting films 25 in the light guide plate 20 (hereinafter, sometimes simply referred to as reflectance of the plurality of reflecting films 25) is about 8% or less, the light transmittance of the light guide plate 20 is about 85% or more. In this case, the resultant display has brightness equal to or greater than that of the conventional illuminating device having a protection plate.

As shown in FIG. 5, the light transmittance of the light guide plate 20 is obtained by directing approximately parallel light to the opposing surface 22f of the light guide plate 20 in the direction perpendicular to the opposing surface 22f and then measuring the amount of light emitted from the emitting surface 22e of the light guide plate 20 by using a light receiving device provided at the emitting surface 22e. It should be appreciated that the light transmittance may alternatively be obtained by directing approximately parallel light to the emitting surface 22e of the light guide plate 20 in the direction perpendicular to the emitting surface 22e and measuring the amount of light emitted from the opposing surface 22f of the light guide plate 20 by using a light receiving device provided at the opposing surface 22f.

Provided that I is the amount of light incident on the opposing surface 22f and $I_T$ is the amount of light emitted from the emitting surface 22e, the light transmittance T of the light guide plate 20 is defined by $I_T/I$. When the light transmittance T of the light guide plate 20 is about 85% or more, the resultant display has brightness equal to or greater than that of the conventional illuminating device having a protection plate.

The reflectance R of the plurality of reflecting films 25 is also defined by the reflectance r of the reflecting film 25 (the reflectance of each reflecting film 25), the area $\Delta s$ of the reflecting film 25 projected on the emitting surface 22e and the area S of the emitting surface 22e. Provided that $\Sigma \Delta s$ is the sum of the respective areas $\Delta s$ of the plurality of reflecting films 25 projected on the emitting surface 22e, $R=(\Sigma \Delta s/S) \cdot r$. Accordingly, when the sum $\Sigma \Delta s$ of the areas $\Delta s$, the reflectance r of the reflecting film 25 and the area S of the emitting surface 22e satisfies the following expression (3), the resultant display has brightness equal to or greater than that of the conventional illuminating device having a protection plate:

$$0<(\Sigma \Delta s/S) \cdot r \leq 0.08 \quad (3).$$

Figure 6A:
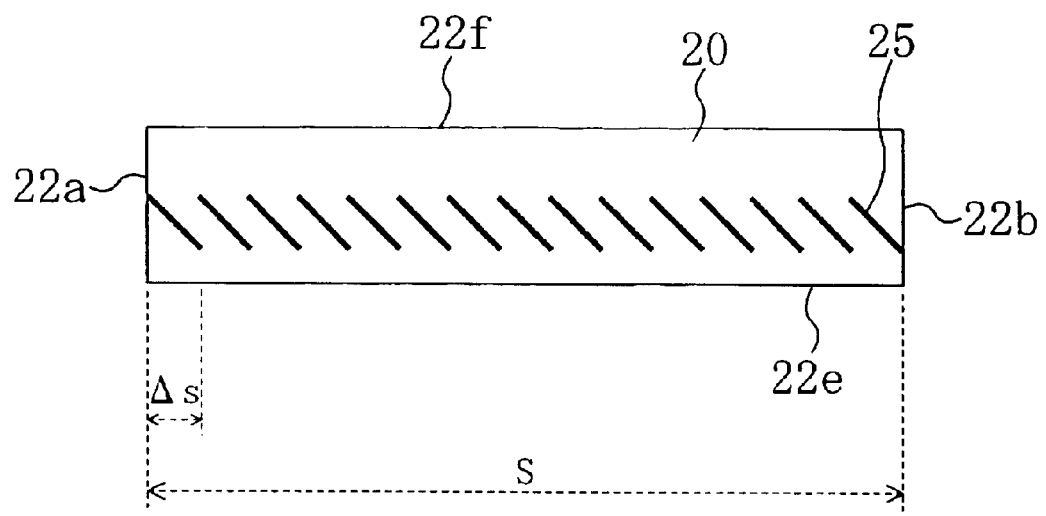
FIGS. 6A and 6B illustrate preferred arrangement of the reflecting films 25 included in the light guide plate 20 of the illuminating device 100 according to an embodiment of the present invention.
Figure 6B:
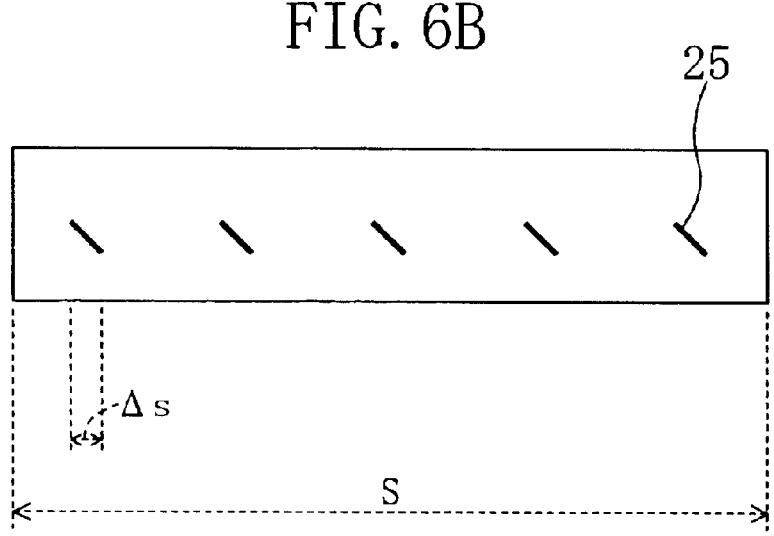
Figure 7:
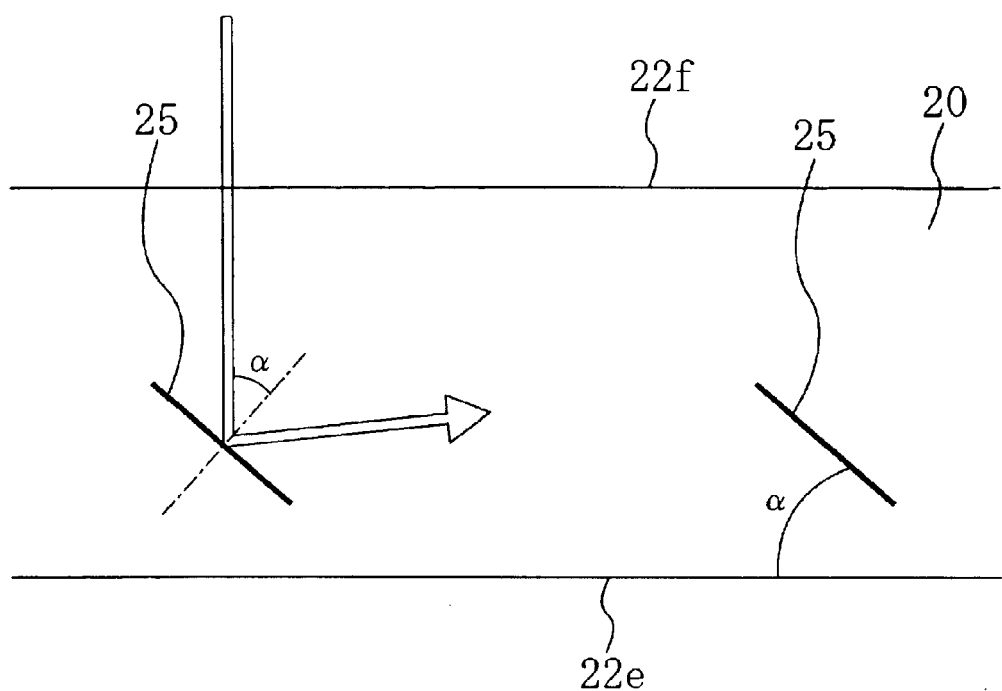
FIG. 7 illustrates definition of the reflectance r of the reflecting film 25 included in the light guide plate 20 of the illuminating device 100 according to an embodiment of the present invention.

For example, when $\Sigma \Delta s=S$ as shown in FIG. 6A, the reflectance r of the reflecting film 25 is set to about 8% or less. If the reflectance r of the reflecting film 25 is about 100%, $\Sigma \Delta s/S$ is set to about 8% or less as shown in FIG. 6B. The reflectance r is herein defined as a reflectance of light incident on the reflecting film 25 at an incident angle α as shown in FIG. 7.

For $\Sigma \Delta s/S<1$, the reflecting film 25 may have any shape (when viewed from the direction normal to the emitting surface 22e). For example, the reflecting film 25 may have a line shape (band shape) as shown in FIG. 2 or an island shape (dot shape) as shown in FIG. 8.

Figure 8:
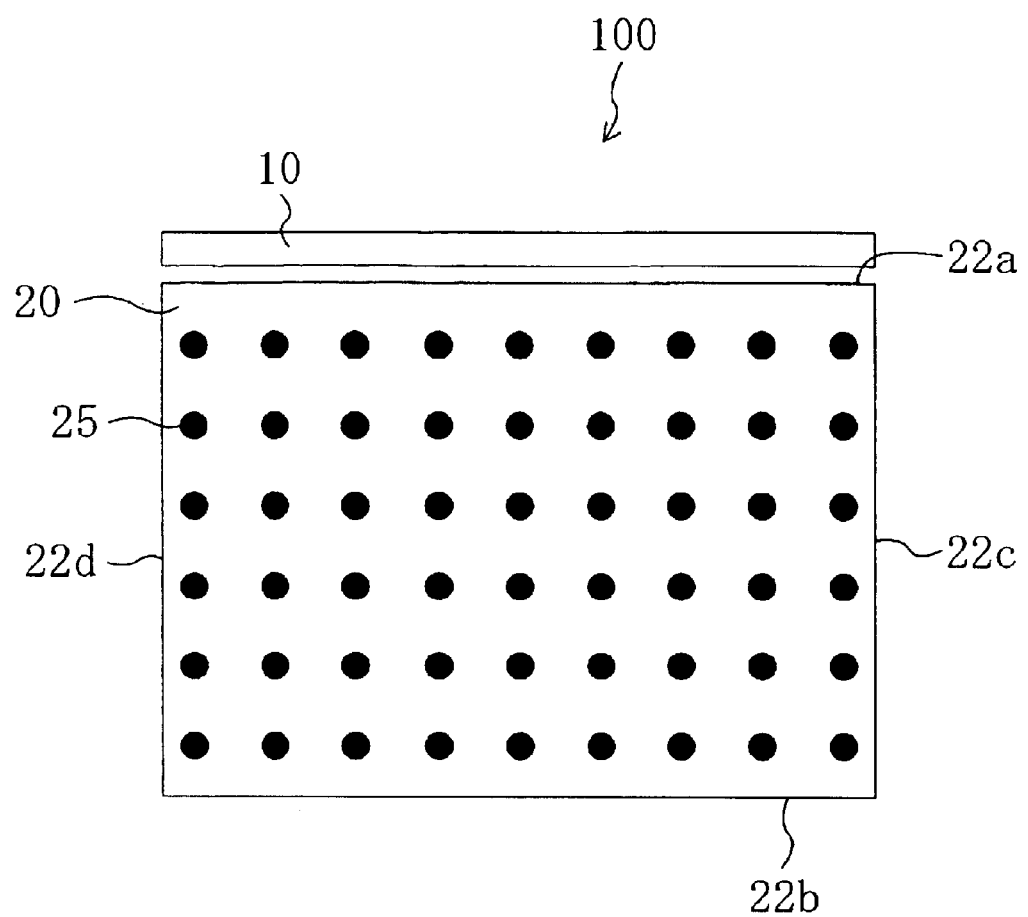
FIG. 8 is a schematic top view showing another shape of the reflecting films 25 included in the light guide plate 20 of the illuminating device 100 according to an embodiment of the present invention.
Figure 9A:
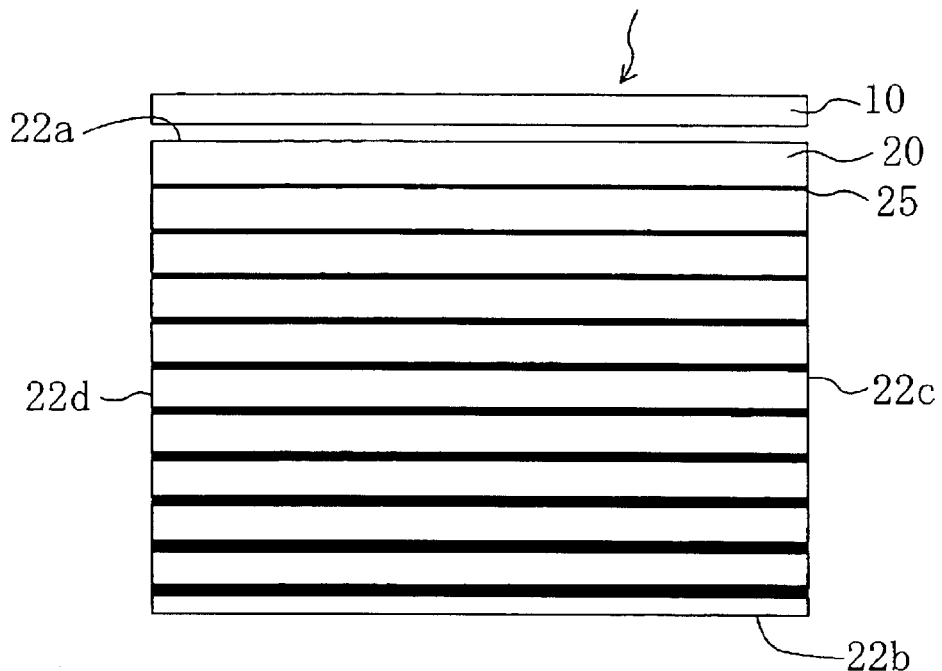
FIGS. 9A and 9B are schematic top views showing other arrangements of the reflecting films 25 included in the light guide plate 20 of the illuminating device 100 according to an embodiment of the present invention.
Figure 9B:
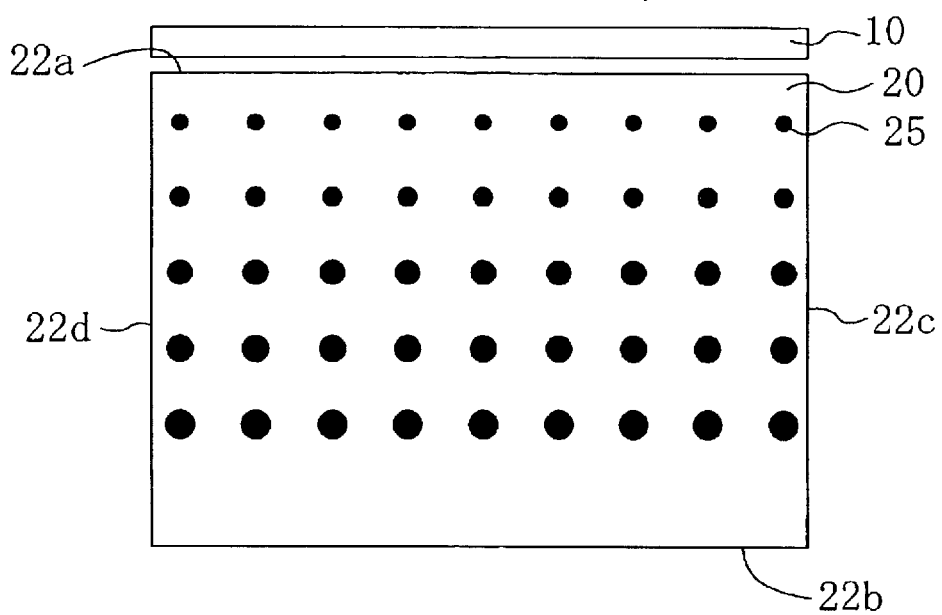

The ratio of the area of the reflecting film 25 projected on the emitting surface 22e of the light guide plate 20 to the area of the emitting surface 22e may be the same within the emitting surface 22e as shown in FIGS. 2 and 8, or may be increased as the distance from the light source 10 is increased as shown in FIGS. 9A and 9B. Increasing the ratio of the area of the reflecting film 25 as the distance from the light source 10 is increased as shown in FIG. 9A and 9B enables the light emitted from the emitting surface 22e to have a uniform intensity distribution. In this case, the area of the reflecting films 25 formed at a fixed repetition pitch may be increased as the distance from the light source 10 is increased, as shown in FIGS. 9A and 9B. Alternatively, the repetition pitch of the reflecting films 25 having approximately the same area may be increased as the distance from the light source 10 is increased.

When the reflecting films 25 are periodically arranged, the repetition direction of the reflecting films 25 may be tilted with respect to the repetition direction of a pixel pattern formed in the LCD panel in order to prevent generation of moiré fringes. The moiré fringes are generated by the interference of the periodically arranged reflecting films 25 and the periodic pixel pattern of the LCD panel. In order to prevent generation of the moiré fringes, the reflecting films may be arranged irregularly. From the standpoint of preventing generation of the moiré fringes, it is preferable that the reflecting films 25 have an island shape as shown in FIG. 8 rather than a line shape as shown in FIG. 2.

Hereinafter, the structure of the light guide plate 20 preferably used in the illuminating device 100 of the present invention and a manufacturing method thereof will be described. FIGS. 10A to 10D are schematic cross-sectional views illustrating a manufacturing process of a light guide plate 20A preferably used as the light guide plate 20 of the illuminating device 100.

As shown in FIG. 10D, the light guide plate 20A is a lamination of a first light guide element 26 and a second light guide element 27 with an adhesive layer 28 interposed therebetween. More specifically, the first light guide element 26, the adhesive layer 28 and the second light guide element 27 are laminated each other in the direction normal to the emitting surface 22e.

A surface 26a of the first light guide element 26 which faces the adhesive layer 28 has a plurality of tilted regions 26a1 that are tilted with respect to the emitting surface 22e. The reflecting films 25 are formed on the tilted regions 26a1 of the surface 26a.

The surface 26a of the first light guide plate 26 further has a plurality of vertical regions 26a2 that extend approximately perpendicularly to the emitting surface 22e. The tilted regions 26a1 and the vertical regions 26a2 are alternately arranged in a prescribed direction.

For example, the light guide plate 20A having the above structure is manufactured as follows:

First, as shown in FIG. 10A, a first light guide element 26 is prepared which has a surface 26a having alternate arrangement of tilted regions 26a1 and vertical regions 26a2.

The first light guide element 26 may be formed from any of various transparent materials (e.g., a transparent resin such as polymethyl methacrylate and polycarbonate, or glass) by using an injection molding method, extrusion molding method, hot press molding method or the like.

As shown in FIG. 10B, a material of the reflecting films 25 is then vapor-deposited on the tilted regions 26a1 of the surface 26a of the first light guide element 26 through a mask 40. It should be appreciated that the material of the reflecting films 25 may be formed by oblique deposition or printing. Examples of the material of the reflecting films 25 include metals such as aluminum, nickel and silver, and white pigments such as titanium oxide, white lead and tin oxide. The reflecting films 25 may either be dielectric films (or dielectric multi-layer films) that selectively reflect light having a prescribed wavelength range or dielectric films (or dielectric multi-layer films) that selectively reflect specific polarized light. Using the dielectric films (or dielectric multi-layer films) that selectively reflect specific polarized light as the reflecting films 25 enables light absorption by a polarizing plate to be reduced when a reflection-type or transmission-type LCD panel having the polarizing plate is illuminated. As a result, luminance of the LCD is improved.

As shown in FIG. 10C, a material of the adhesive layer 28 is applied to the surface 26a of the first light guide element 26 and a second light guide element 27 is then laminated thereto, whereby the light guide plate 20A of FIG. 10D is formed. Examples of the material of the adhesive layer 28 include energy curable resins such as ultraviolet curable resin, thermosetting resin and electron-beam curable resin, and an adhesive. The second light guide element 27 may be formed from any of various transparent materials (e.g., a transparent resin such as polymethyl methacrylate and polycarbonate, or glass) by using an injection molding method, extrusion molding method, hot press molding method and the like.

Preferably, the first light guide element 26 and the adhesive layer 28 have approximately the same refractive index. If the first light guide element 26 and the adhesive layer 28 have a large difference in refractive index, illumination light may be adversely affected by refraction, moiré fringes, diffraction and the like. Typically, the interface between the adhesive layer 28 and the second light guide element 27 is approximately flat. Therefore, illumination light will not be adversely affected by refraction and the like even if the second light guide element 27 and the adhesive layer 28 have a difference in refractive index.

More preferably, the first light guide element 26, the adhesive layer 28 and the second light guide element 27 have approximately the same refractive index. In this case, the first light guide element 26, the adhesive layer 28 and the second light guide element 27 are optically integral. Therefore, the optical phenomena that adversely affect the illumination light will not occur at each interface.

The first light guide element 26 used in the light guide plate 20A of FIG. 10D have a plurality of vertical regions 26a2 at the surface 26a facing the adhesive layer 28. The vertical regions 26a2 extend approximately perpendicularly to the emitting surface 22e, and are arranged alternately with the tilted regions 26a1. Such alternate arrangement of the tilted regions 26a1 and the vertical regions 26a2 eliminates the need to align the mask 40 with the first light guide element 26 in the step of vapor-deposing the material of the reflecting films 25 through the mask 40.

Figure 11:
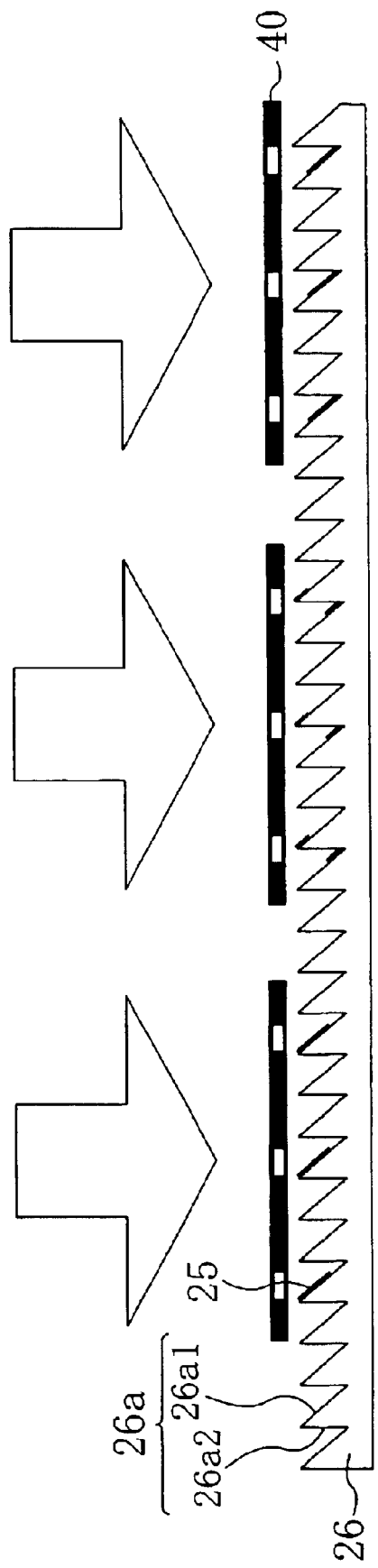
FIG. 11 shows examples of how a mask 40 is disposed over a first light guide element 26 to form the reflecting films 25.

More specifically, as shown in the right, central and left parts of FIG. 11, the mask 40 can be arbitrarily aligned with the first light guide element 26. The reflecting films 25 can be formed on the tilted regions 26a1 regardless of the positional relation between the boundary between the tilted region 26a1 and the vertical region 26a2 and a hole portion in the mask 40. In this way, the light guide plate 20A having such a first light guide element 26 can be efficiently manufactured.

Preferably, the width a of the reflecting film 25 (the width of the reflecting film 25 in the repetition direction of the tilted regions 26a1) and the width A of the tilted region 26a1 of the surface 26a (the width of the tilted region 26a1 in the repetition direction of the tilted regions 26a1) satisfy 0<a≦A. The reason for this will now be described with reference to FIG. 12.

Figure 12:
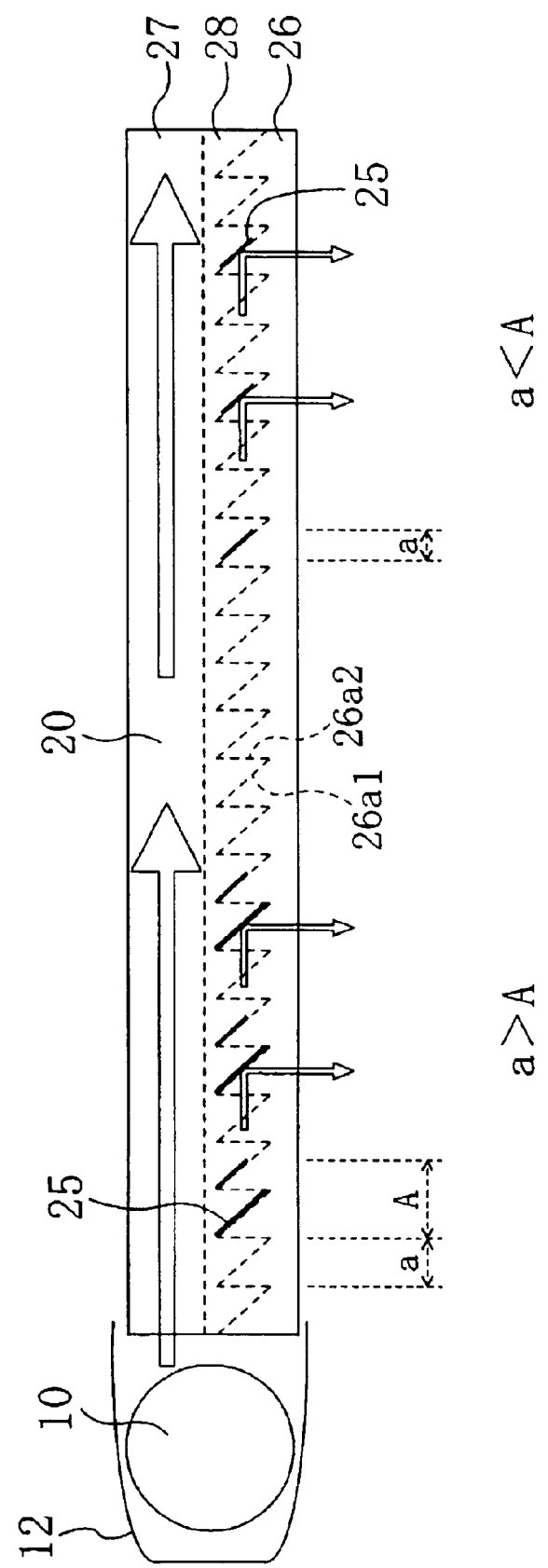
FIG. 12 schematically shows the reflecting films 25 formed on the tilted regions 26*a*1 in the case where the width a of the reflecting film 25 is larger than the width A of the tilted region 26*a*1 and where the width a of the reflecting film 25 is equal to or smaller than the width A of the tilted region 26*a*1.

When the width a of the reflecting film 25 is larger than the width A of the tilted region 26a1 (i.e., a>A), the reflecting film 25 is formed over a plurality of tilted regions 26a1 as shown in the left part of FIG. 12. Accordingly, when the reflecting film 25 has a relatively high reflectance, the principal ray propagated within the light guide plate 20 hardly reach a portion of the reflecting film 25 (for example, when the reflecting film 25 is formed over two tilted regions 26a1 as shown in the left part of FIG. 12, a portion of the reflecting film 25 which is formed in the tilted region 26a1 located farther from the first side surface 22a). This portion therefore does not function to direct the principal ray toward the emitting surface 22e. This portion which does not contribute to reflection of light from the light source 10 reflects light incident from the viewer side, thereby unnecessarily reducing the light transmittance of the light guide plate 20.

On the other hand, when the width a of the reflecting film 25 is equal to or smaller than the width A of the tilted region 26a1 (i.e., a≦A), the reflecting film 25 can be formed in a single tilted region 26a1 as shown in the right part of FIG. 12. The whole reflecting film 25 therefore functions to direct the principal ray propagated within the light guide plate 20 toward the emitting surface 22e. Since the whole reflecting film 25 functions effectively, unnecessary reduction in light transmittance of the light guide plate 20 can be prevented. As a result, brighter display is implemented.

Note that the light guide plate 20 shown in FIG. 12 has the first light guide element 26 at the emitting surface and the second light guide element 27 at the opposing surface. However, it should be understood that the light guide plate 20 may have the first light guide element 26 at the opposing surface and the second light guide element 27 at the emitting surface.

Moreover, although each reflecting film 25 is formed in part of a corresponding tilted region 26a1 in the above example, the present invention is not limited to this. Each reflecting film 25 may be formed over the whole surface of a corresponding tilted region 26a1 as described below. FIGS. 13A to 13D are schematic cross-sectional views illustrating a manufacturing process of a light guide plate 20A' having reflecting films 26 formed over the whole surface of the respective tilted regions 26a1 of the surface 26a of the first light guide element 26.

First, as shown in FIG. 13A, a first light guide element 26 is prepared which has a surface 26a having alternate arrangement of tilted regions 26a1 and vertical regions 26a2.

As shown in FIG. 13B, a material of the reflecting films 25 is then vapor-deposited on the whole surface of the tilted regions 26a1 of the surface 26a of the first light guide element 26 to form the reflecting films 25.

As shown in FIG. 13C, a material of the adhesive layer 28 is applied to the surface 26a of the first light guide plate 26 and a second light guide plate 27 is then laminated thereto, whereby the light guide plate 20A' of FIG. 13D is formed.

As described above, in the manufacturing process of the light guide plate 20A' having the reflecting films 25 formed over the whole surface of the respective tilted regions 26a1, no mask is required to form the reflecting films 25. Accordingly, the light guide plate 20A' having the above structure can be manufactured by a simple process.

In the above description, the light guide plate 20A has the first light guide element 26 having vertical regions 26a2 at the surface 26a facing the adhesive layer 28. However, the present invention is not limited to this, and the light guide plate need not necessarily have the vertical regions at the surface facing the adhesive layer. A light guide plate that includes a first light guide element having no vertical region can be manufactured as described below. FIGS. 14A to 14D are schematic cross-sectional views illustrating a manufacturing process of a light guide plate 20B that includes a first light guide element 26 having no vertical region at the surface 26a facing the adhesive layer 28. Note that components of the light guide plate 20B in FIGS. 14A to 14D have substantially the same functions as those of the light guide plate 20A. Therefore, the components of the light guide plate 20B are denoted with the same reference numerals as those of the light guide plate 20A, and description thereof will be omitted.

First, as shown in FIG. 14A, a first light guide element 26 is prepared which has tilted regions at its surface. The tilted surfaces are tilted with respect to the emitting surface. As shown in FIG. 14B, reflecting films 25 are then formed on the tilted regions of the surface of the first light guide element 26. As shown in FIG. 14C, a material of the adhesive layer 28 is applied to the surface of the first light guide element 26 and a second light guide element 27 is then laminated thereto, whereby the light guide plate 20B of FIG. 14D is formed.

The second light guide element of the light guide plate 20 may additionally function as a transparent input device (touch panel). A light guide plate having such a second light guide element may be manufactured as described below. FIGS. 15A to 15D are schematic cross-sectional views illustrating a manufacturing process of a light guide plate 20C having a second light guide element 27 integrated with a transparent input device. Note that, in FIGS. 15A to 15D, the components of the light guide plate 20B having substantially the same functions as those of the light guide plate 20A are denoted with the same reference numerals and characters as those of the light guide plate 20A, and description thereof will be omitted.

Figure 15A:
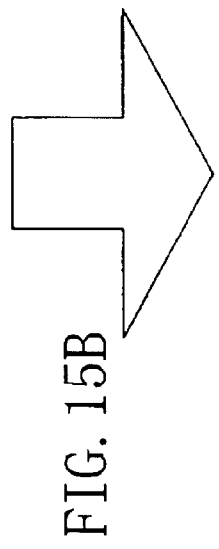

First, as shown in FIG. 15A, a first light guide element 26 is prepared. The first light guide element 26 may either be a first light guide element having a surface 26a having alternate arrangement of tilted regions 26a1 and vertical regions 26a2 as shown in FIG. 15A, or a first light guide element having no vertical regions at its surface as shown in FIG. 14A.

Figure 15B:
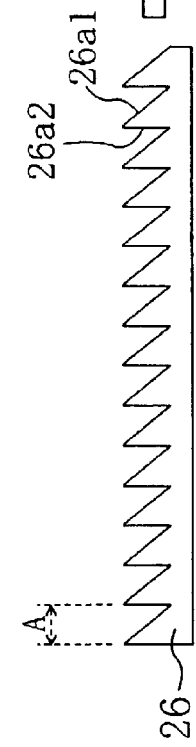
Figure 15C:
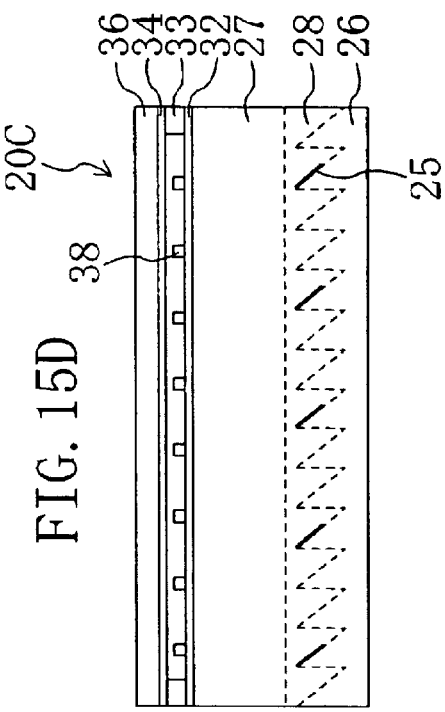
Figure 15D:
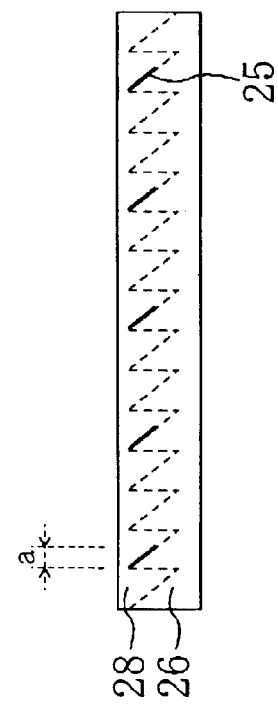

As shown in FIG. 15B, reflecting films 25 are then formed on the tilted regions 26a1 of the surface 26a of the first light guide element 26. As shown in FIG. 15C, a material of the adhesive layer 28 is applied to the surface of the first light guide element 26 and a second light guide element 27 integrated with a transparent input device (touch panel) is laminated thereto, whereby the light guide plate 20C of FIG. 15D is formed.

The second light guide element 27 has a lower electrode 32 and a spacer 38 on its surface. The lower electrode 32 is formed from a transparent conductive film (e.g., an ITO (indium tin oxide) layer). An upper electrode film 36 is laminated to the second light guide element 27 with a prescribed gap therebetween. This gap is retained by an adhesive portion 33. The upper electrode film 36 has an upper electrode 34 on its surface facing the second light guide plate 27. The upper electrode 34 is formed from a transparent conductive film (e.g., an ITO layer). When information is input to such a transparent input device, the upper electrode film 36 is pressed, and the upper electrode 34 and the lower electrode 32 are electrically connected to each other according to deformation of the pressed upper electrode film 36.

Figure 40B:
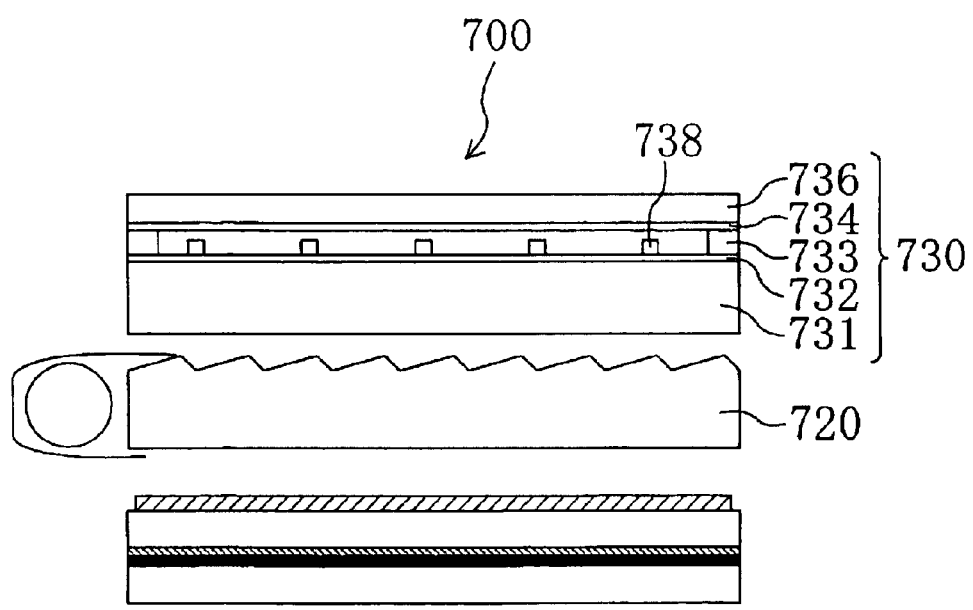
FIG. 40B is a schematic cross-sectional view of a conventional illuminating device 700 having a touch panel 730.

Using the second light guide element 27 integrated with the transparent input device (touch panel) eliminates the need to provide a lower electrode substrate that is required when a separate touch panel is provided on the front of the illuminating device as shown in FIG. 40B. This enables reduction in thickness and weight of the device. Moreover, since the interface between the lower electrode substrate and the light guide plate is eliminated, degradation in display quality caused by surface reflection by the interface is prevented.

The above effects obtained by integrating the light guide plate with the transparent input device can also be obtained by integrating the conventional light guide plate having concaves and convexes at the surface on the viewer side with the transparent input device. However, when the light guide plate having concaves and convexes is used as a lower electrode substrate, such concaves and convexes may be damaged by, e.g., pressing for inputting information. Such damages may possibly degrade display quality of the display device. In the light guide plate 20 of the illuminating device 100 of the present invention, however, no special structure need be provided at its surface, whereby the surface of the second light guide element on the viewer side can be made approximately flat. This improves reliability over the case where the conventional light guide plate having concaves and convexes at the surface on the viewer side is integrated with the transparent input device.

FIGS. 16A to 16D schematically illustrate a manufacturing process of another light guide plate 20D preferably used as the light guide plate 20 of the illuminating device 100.

As shown in FIG. 16D, the light guide plate 20D is a lamination of a first light guide element 26 and a second light guide element 27 with an adhesive layer 28 interposed therebetween. More specifically, the first light guide element 26, the adhesive layer 28 and the second light guide element 27 are laminated each other in the direction normal to the emitting surface 22e.

A surface 26a of the first light guide element 26 which faces the adhesive layer 28 has a plurality of tilted regions 26a1 tilted with respect to the emitting surface 22e, a plurality of vertical regions 26a2 extending approximately perpendicularly to the emitting surface 22e, and a plurality of parallel regions 26a3 extending approximately in parallel with the emitting surface 22e. The tilted regions 26a1, the vertical regions 26a2 and the parallel regions 26a3 are arranged in prescribed order along a prescribed direction in a cyclic manner. The reflecting films 25 on the surface 26a of the first light guide element 26 include reflecting films 25a formed on the tilted regions 26a1 and reflecting films 25 formed on the parallel regions 26a3.

For example, the light guide plate 20D having the above structure is manufactured as follows:

First, as shown in FIG. 16A, a first light guide element 26 is prepared which has a surface 26a having tilted regions 26a1, vertical regions 26a2 and parallel regions 26a3. The first light guide element 26 may be formed from any of various transparent materials by using a known molding method.

As shown in FIG. 16B, a material of the reflecting films 25 is then vapor-deposited on the tilted regions 26a1 and parallel regions 26a3 of the surface 26a of the first light guide element 26 in order to form the reflecting films 25a, 25b on the tilted regions 26a1 and the parallel regions 26a3, respectively.

As shown in FIG. 16C, a material of the adhesive layer 28 is applied to the surface 26a of the first light guide element 26 and a second light guide element 27 is then laminated thereto, whereby the light guide plate 20D of FIG. 16D is formed.

Figure 17:
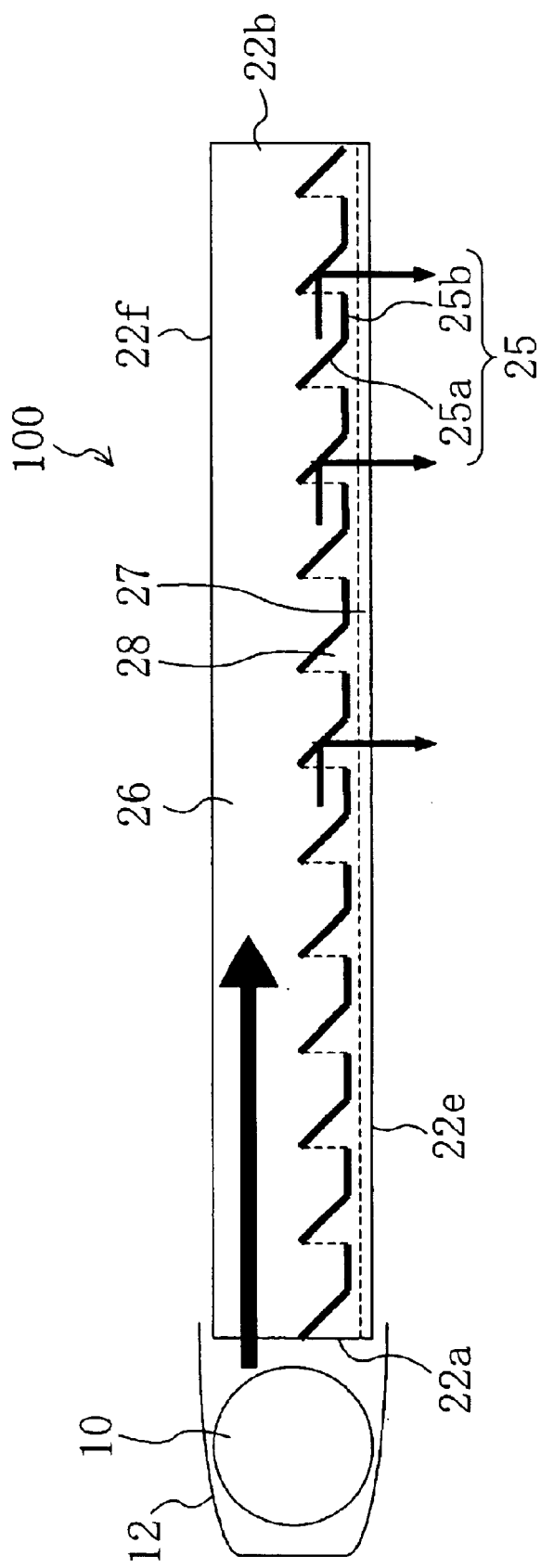
FIG. 17 is a schematic cross-sectional view of the illuminating device 100 having the light guide plate 20D.

As shown in FIG. 17, in the illuminating device 100 having the light guide plate 20D, light emitted from the light source 10 into the light guide plate 20D through the first side surface 22a is mainly reflected toward the emitting surface 22e by the reflecting films 25a formed on the tilted regions 26a1. In other words, of the reflecting films 25 formed on the tilted regions 26a1 and the parallel regions 26a3 of the surface 26a of the first light guide element 26, the reflecting films 25a formed on the tilted regions 26a1 function to reflect the light from the light source 10 toward the emitting surface 22e.

Arrangement of the reflecting films 25a contributing reflection toward the emitting surface 22e depends on arrangement of the tilted regions 26a1 in the surface 26a of the first light guide element 26. Therefore, arrangement of the reflecting films 25a can be changed by changing arrangement of the tilted regions 26a1. For example, when the tilted regions 26a1 are formed at a constant rate (e.g., with a constant width or at a constant pitch) in the surface 26a of the first light guide plate 26, the reflecting films 25a are also formed at a constant rate. When the rate of the tilted regions 26a1 is increased as the distance from the light source 10 is increased, the rate of the reflecting films 25a is also increased as the distance from the light source 10 is increased. As a result, uniform light can be emitted from the emitting surface 22e.

In the manufacturing process of the light guide plate 20A in FIG. 10D, arrangement of the reflecting films 25 is controlled by using a mask. In the manufacturing process of the light guide plate 20D in FIG. 16D, however, arrangement of the reflecting films 25 can be controlled by appropriately selecting arrangement of the tilted regions 26a1, thereby simplifying the manufacturing process.

Figure 18:
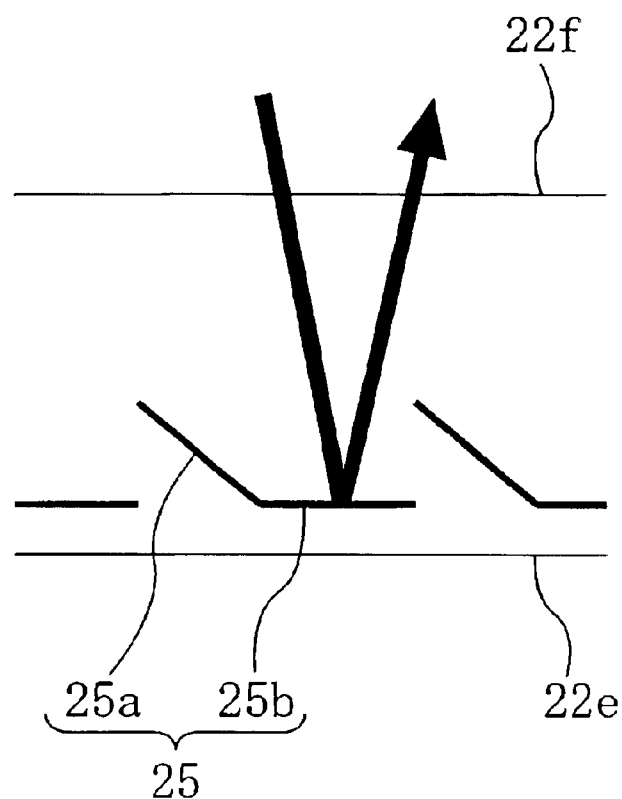
FIG. 18 schematically shows how the light incident from the viewer side is reflected by reflecting surface 25b in the illuminating device 100 having the light guide plate 20D.

Note that, as shown in FIG. 18, when the illuminating device 100 having the light guide plate 20D is used as a frontlight of a reflection-type LCD, light entering the light guide plate 20D from the viewer side (from the opposing surface 22f) may be partially reflected by the reflecting films 25b formed on the parallel regions 26a3 of the surface 26a of the first light guide element 26 and emitted toward the viewer. This may possibly degrade display quality of the reflection-type LCD.

Such degradation in display quality can be suppressed by setting the reflectance of the plurality of reflecting films 25 on the surface 26a of the first light guide element 26a to about 8% or less and the light transmittance of the light guide plate 20D to about 85% or more. The reflectance R of the plurality of reflecting films 25 is defined by the following parameters: the reflectance r of the reflecting film 25a formed on the tilted region 26a1 (the reflectance of each reflecting film 25a); the area $\Delta s$ of the reflecting film 25a projected on the emitting surface 22e; the reflectance r' of the reflecting film 25b formed on the parallel region 26a3 (the reflectance of each reflecting film 25b); the area $\Delta s'$ of the reflecting film 26b projected on the emitting surface 22e; and the area S of the emitting surface 22e. Provided that $\Sigma\Delta s$ is the sum of the respective areas $\Delta s$ of the plurality of reflecting films 25a projected on the emitting surface 22e and $\Sigma\Delta s'$ is the sum of the respective areas $\Delta s'$ of the plurality of reflecting films 25b projected on the emitting surface 22e, $R=(\Sigma\Delta s/S)\cdot r+(\Sigma\Delta s'/S)\cdot r'$. Accordingly, when the reflecting films 25 are formed so as to satisfy the following expression (3'), the resultant display has excellent display quality:

$$0<(\Sigma\Delta s/S)\cdot r+(\Sigma\Delta s'/S)\cdot r'\leq 0.08 \qquad (3').$$

When the surface 26a of the first light guide element 26 which faces the adhesive layer 28 (the surface on which the reflecting films 25 are formed) is located near the emitting surface 22e of the light guide plate 20D, it is preferable that the parallel regions 26a3 are located closer to the emitting surface 22e than are the tilted regions 26a1, as shown in FIG. 19A. In other words, it is preferable that the tilted region 26a1, the parallel region 26a3 and the vertical region 26a2 are sequentially formed in this order along the direction from the first side surface 22a toward the second side surface 22b of the light guide plate 20D.

The reason for this is as follows: when the tilted regions 26a1 are located closer to the emitting surface 22e than are the parallel regions 26a3 as shown in FIG. 19B, the light emitted from the light source 10 into the light guide plate 20D through the first side surface 22a is partially reflected by the reflecting films 25b formed on the parallel regions 26a3. As a result, the light is less likely to reach the reflecting films 25a formed on the tilted regions 26a1 and thus is less likely to be emitted from the emitting surface 22e.

In contrast, when the tilted regions 26a1 are located closer to the emitting surface 22e than are the parallel regions 26a3 as shown in FIG. 19A, the light emitted from the light source 10 into the light guide plate 20D efficiently reaches the reflecting films 25a on the tilted regions 26a1 and is reflected thereby. Accordingly, the light is efficiently emitted from the emitting surface 22e.

When the surface 26a of the first light guide element 26 which faces the adhesive layer 28 is located close to the opposing surface 22f of the light guide plate 20D, it is preferable that the parallel regions 26a3 are located closer to the opposing surface 22f than are the tilted regions 26a1, as shown in FIG. 20A. In other words, it is preferable that the tilted region 26a1, the vertical region 26a2 and the parallel region 26a3 are sequentially formed in this order in the direction from the first side surface 22a toward the second side surface 22b of the light guide plate 20D.

The reason for this is as follows: when the tilted regions 26a1 are located closer to the opposing surface 22f than are the parallel regions 26a3 as shown in FIG. 20B, the light emitted from the light source 10 into the light guide plate 20D through the first side surface 22a is partially reflected by the reflecting films 25b formed on the parallel regions 26a3. Therefore, the light is less likely to reach the reflecting films 25a formed on the tilted regions 26a1 and thus is less likely to be emitted from the emitting surface 22e.

In contrast, when the parallel regions 26a3 are located closer to the opposing surface 22f than are the tilted regions 26a1 as shown in FIG. 20A, the light emitted from the light source 10 into the light guide plate 20D efficiently reaches the reflecting films 25a of the tilted regions 26a1 and is reflected thereby. Accordingly, the light is efficiently emitted from the emitting surface 22e.

Note that the light guide plate described above is formed from the first light guide element, the second light guide element and the adhesive layer interposed therebetween. However, the present invention is not limited to this, and the light guide plate may be formed from a light guide element having at its surface tilted regions on which the reflecting films are formed, and a resin layer for flattening the surface of the light guide element (i.e., the surface having the reflecting films formed thereon).

Hereinafter, embodiments of a display device according to the present invention will be described with reference to the accompanying drawings. Note that the embodiments of the present invention will be described in terms of a reflection-type LCD and a frontlight used therein. However, the present invention is not limited to this. The illuminating device of the present invention may be used as a backlight of a transmission-type LCD. Moreover, an object to be illuminated by the illuminating device of the present invention is not limited to an LCD panel. For example, the illuminating device of the present invention may be used as a front illuminating device for illuminating the front of a printed matter.

(First Embodiment)

Figure 21:
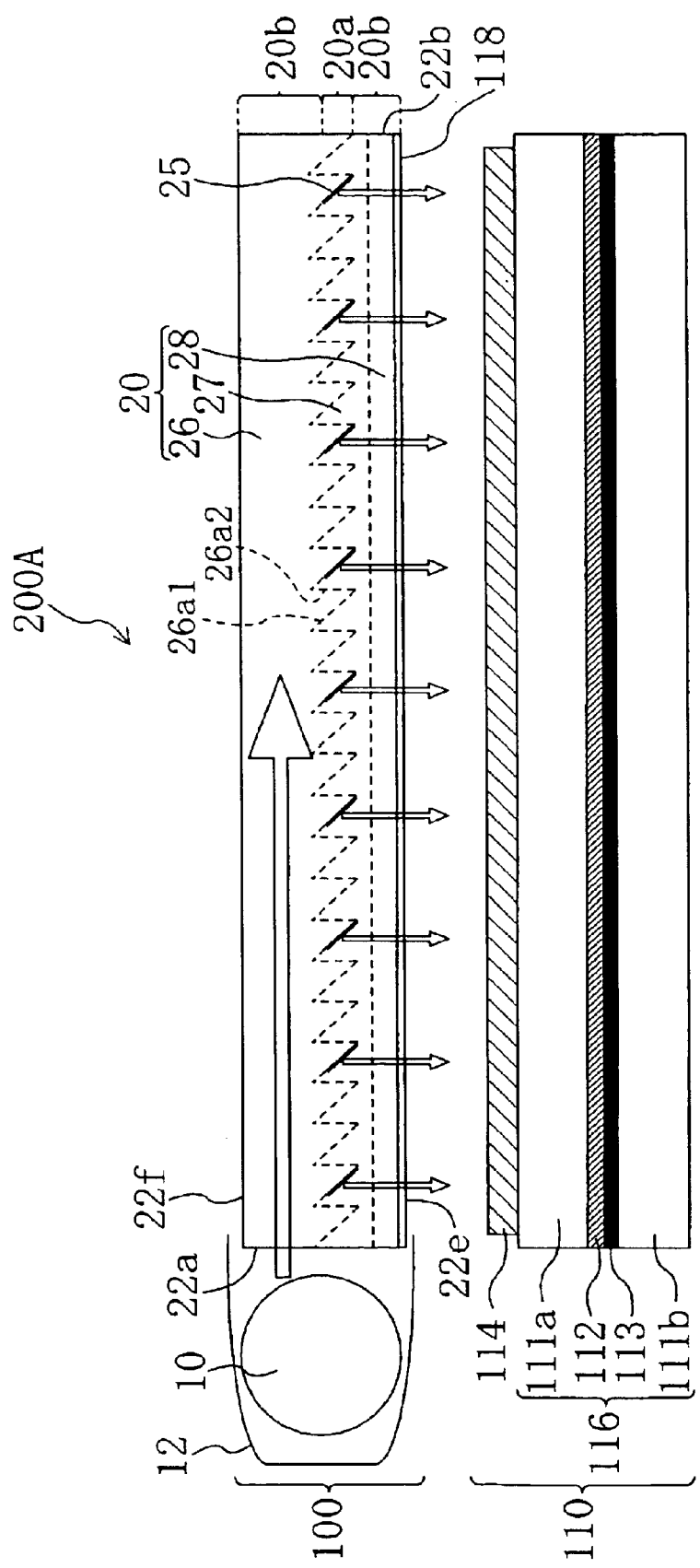
FIG. 21 is a schematic cross-sectional view of a reflection-type LCD 200A according to a first embodiment of the present invention.
Figure 22:
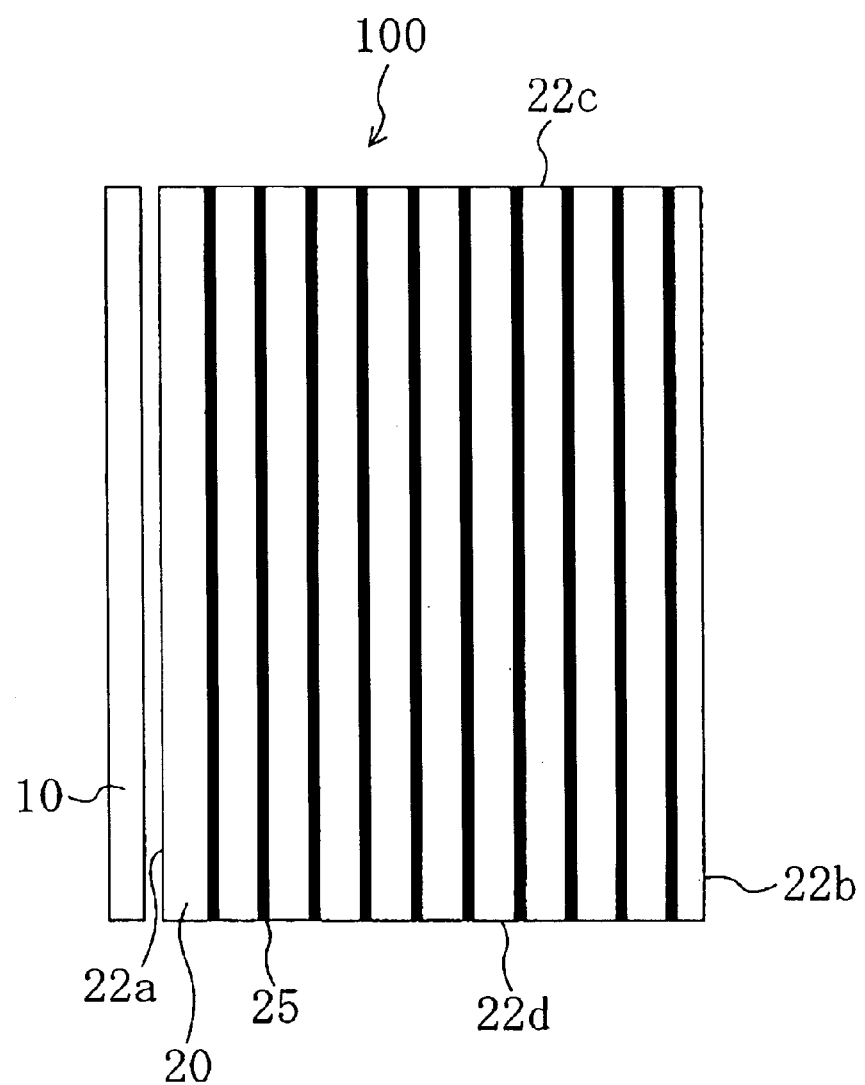
FIG. 22 is a schematic top view of an illuminating device 100 in the reflection-type LCD 200A according to the first embodiment of the present invention.
Figure 23:
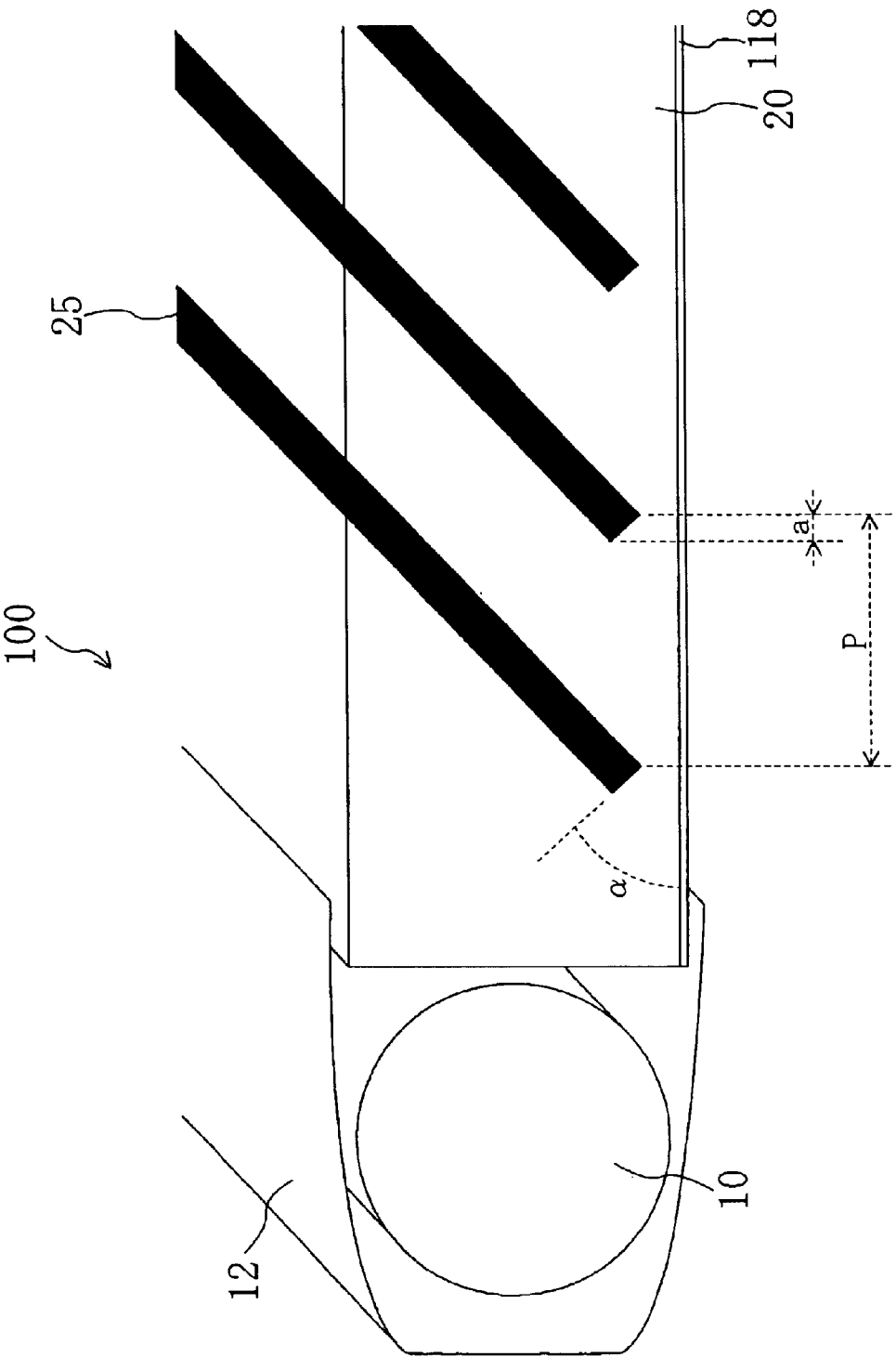
FIG. 23 is a schematic perspective view of the illuminating device 100 in the reflection-type LCD 200A according to the first embodiment of the present invention.

Hereinafter, a reflection-type LCD 200A according to the first embodiment of the present invention will be described with reference to FIGS. 21, 22 and 23. FIG. 21 is a schematic cross-sectional view of the reflection-type LCD 200A. FIG. 22 is a schematic top view of an illuminating device 100 of the reflection-type LCD 200A. FIG. 23 is a schematic perspective view of the illuminating device 100 of the reflection-type LCD 200A.

As shown in FIG. 21, the reflection-type LCD 200A has a reflection-type LCD panel 110 and an illuminating device (frontlight) 100.

The reflection-type LCD panel 110 is a known reflection-type LCD panel, and typically has a circularly polarizing plate 114 and a reflection-type liquid crystal display (LCD) cell 116. The reflection-type LCD cell 116 has a pair of glass substrates 111a, 111b and a liquid crystal layer 112 interposed therebetween in order to modulate the polarization state of light passing through the liquid crystal layer 112. The reflection-type LCD cell 116 further has a reflecting electrode 113 that faces the liquid crystal layer 112 on the side opposite to the frontlight 100, in order to reflect the light having passed through the liquid crystal layer 112 toward the frontlight 100. The circularly polarizing plate 114 is a lamination of a polarizing plate, a half-wave ($\lambda/2$) plate and a quarter-wave ($\lambda/4$) plate.

The illuminating device 100 has a light source 10 and a light guide plate 20. A fluorescent tube is herein used as the light source 10. It should be understood that the present invention is not limited to this and an LED (light-emitting diode) and an EL (electroluminescence) element may alternatively be used as the light source 10. A light reflecting sheet 12 surrounds the light source 10. The light reflecting sheet 12 allows the light emitted from the light source 10 to be efficiently incident on a first side surface 22a of the light guide plate 20. The light guide plate 20A of FIG. 10D is herein used as the light guide plate 20.

In the present embodiment, a light guide element formed by injection molding of polymethyl methacrylate and having a refractive index of about 1.49 is used as the first light guide element 26. Moreover, a light guide element formed by injection molding of polymethyl methacrylate and having a refractive index of about 1.49 is used as the second light guide element 27. An acrylic adhesive having a reflective index of about 1.49 is used as the adhesive layer 28.

In the reflection-type LCD 200A of the present embodiment, the first light guide element 26, the adhesive layer 28 and the second light guide element 27 have approximately the same refractive index and thus are optically integral. Therefore, optical phenomena that adversely affect the illumination light will not occur at each interface. As a result, high quality display is implemented. Note that the critical angle θ of the light guide plate 20 formed from the above materials is about 42°.

In the present embodiment, the tilted regions 26a1 of the surface 26a of the first light guide element 26 are tilted at about 45° with respect to the emitting surface 22e. Reflecting films 25 of aluminum are vapor-deposited on the tilted regions 26a1 through a mask. The angle α between the tangent line of the reflecting film 25 and the emitting surface 22e is about 45°, whereas the critical angle θ of the light guide plate 20 is about 42°. Accordingly, in the reflection-type LCD 200A of the present embodiment, the angle α between the tangent line of the reflecting film 25 and the emitting surface 22e and the critical angle θ of the light guide plate 20 satisfy the above expression (2). As a result, the principal ray is efficiently emitted from the emitting surface 22e, whereby the light utilization efficiency is improved. Moreover, the light from the viewer side is less likely to be reflected by the reflecting films 25 and emitted from the opposing surface 22f. As a result, degradation in display quality caused by such reflection is suppressed.

As shown in FIG. 22, the reflecting films 25 have a line shape when viewed from the direction normal to the emitting surface 22e. The reflecting films 25 are periodically arranged with a width a (width of the reflecting film 25 in the repetition direction of the tilted regions 26a1) of 0.1 mm and at a period P of 1.25 nm. Accordingly, the ratio of the sum $\Sigma \Delta s$ of the respective areas $\Delta s$ of the reflecting films 25 projected on the emitting surface 22e of the light guide plate 20 to the area S of the emitting surface 22e is 8% as defined by the following expression (4). Since the reflectance r of the aluminum reflecting film 25 (tilt angle α=45°) is about 90%, the reflectance R of the plurality of reflecting films 25 ($R=\Sigma \Delta s/S \cdot r$) is about 7.2%. Accordingly, the resultant display is brighter than that obtained by the conventional illuminating device having a protection plate.

$$\Sigma \Delta s/S = a/P = 0.08 \qquad (4)$$

The width A of the tilted region 26a1 of the surface 26a of the first light guide element 26 (the width of the tilted region 26a1 along the repetition direction of the tilted regions 26a1) is 0.11 mm, which is larger than the width a of the reflecting film 25 (=0.1 mm). This allows the whole reflecting film 25 to function to direct the principal ray propagated within the light guide plate 20 toward the emitting surface 22e. Therefore, unnecessary reduction in light transmittance of the light guide plate 20 is prevented, whereby brighter display is realized.

Note that, in the reflection-type LCD 200A of the present embodiment, the emitting surface 22e of the light guide plate 20 is subjected to an antireflection process 118 in order to suppress surface reflection by the emitting surface 22e which occurs when the light within the light guide plate 20 is emitted from the emitting surface 22e. For example, as the antireflection process, an antireflection layer of $MgF_2$, $SiO_2$ or the like may be formed with a thickness of about 0.1 $\mu m$ on the emitting surface 22e of the light guide plate 20 by using a vapor deposition or sputtering method.

(Second Embodiment)

Figure 24:
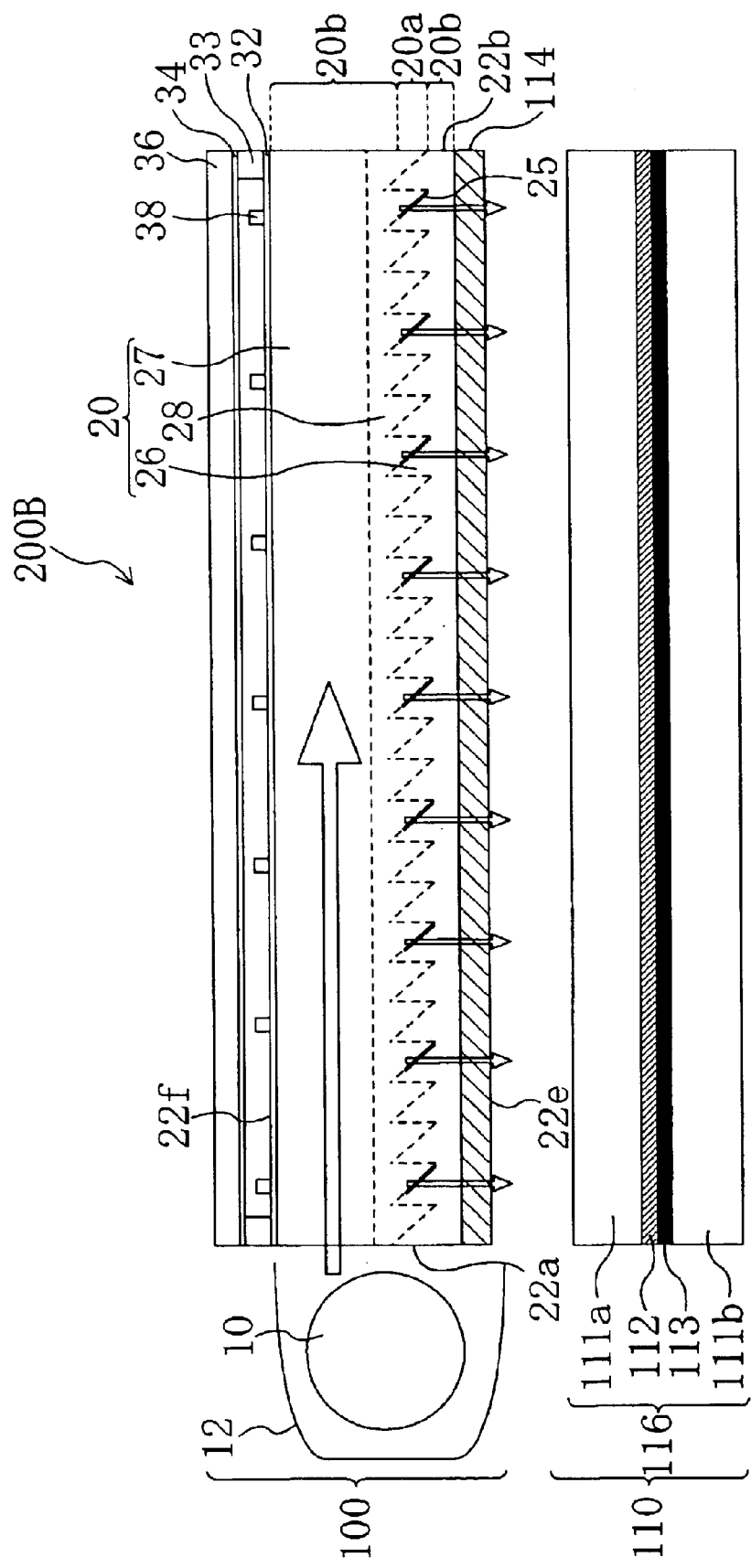
FIG. 24 is a schematic cross-sectional view of a reflection-type LCD 200B according to a second embodiment of the present invention.
Figure 25:
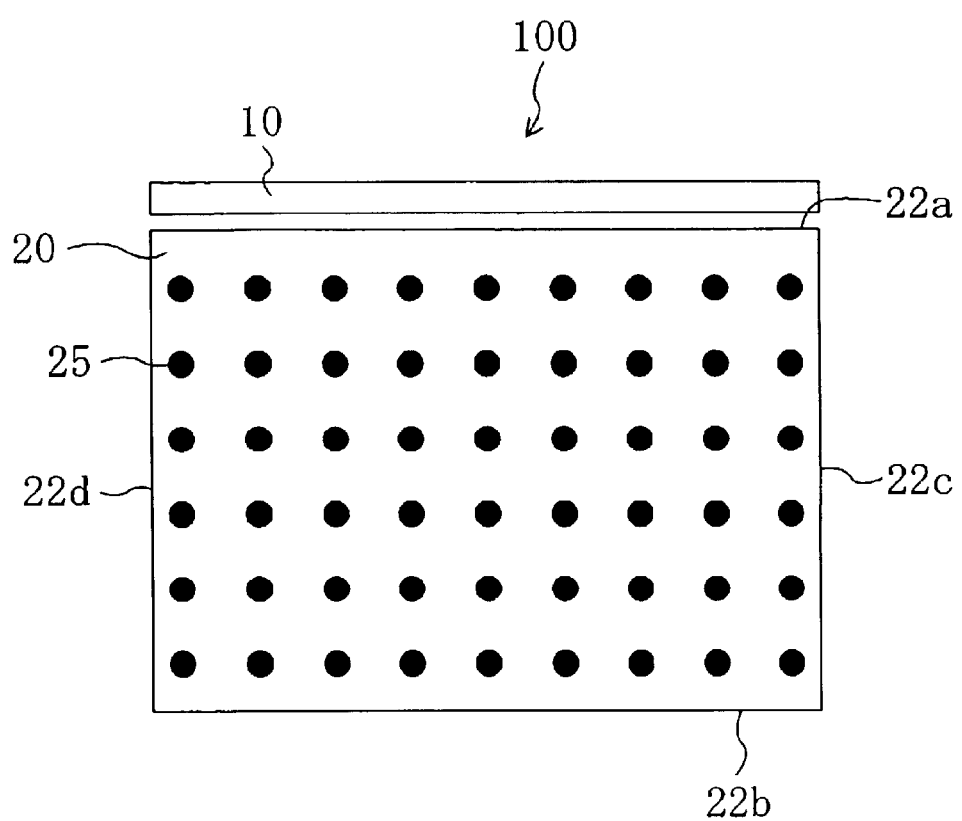
FIG. 25 is a schematic top view of an illuminating device 100 in the reflection-type LCD 200B according to the second embodiment of the present invention.
Figure 26:
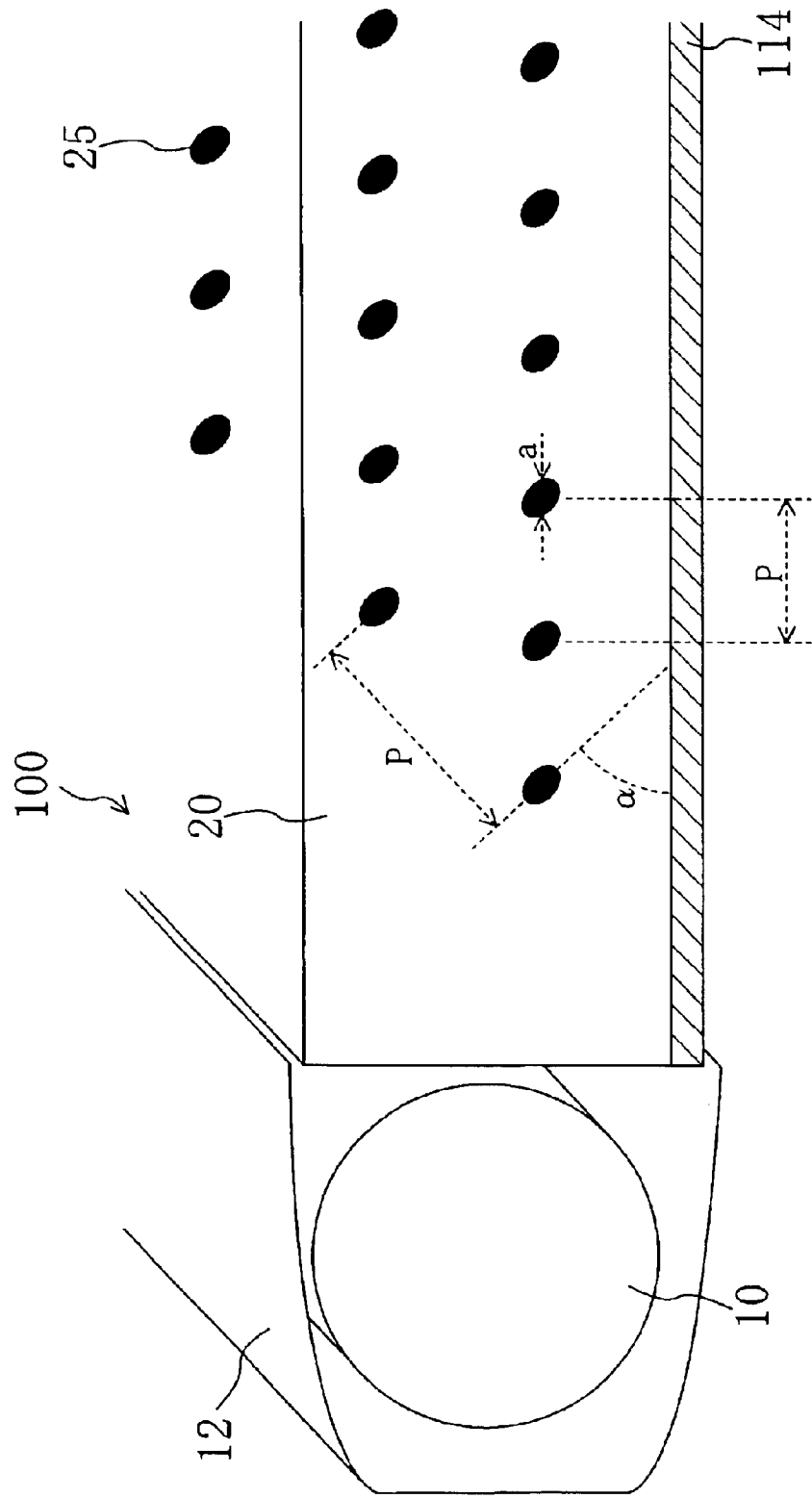
FIG. 26 is a schematic perspective view of the illuminating device 100 in the reflection-type LCD 200B according to the second embodiment of the present invention.

Hereinafter, a reflection-type LCD 200B according to the second embodiment of the present invention will be described with reference to FIGS. 24, 25 and 26. FIG. 24 is a schematic cross-sectional view of the reflection-type LCD 200B. FIG. 25 is a schematic top view of an illuminating device 100 in the reflection-type LCD 200B. FIG. 26 is a schematic perspective view of the illuminating device 100 in the reflection-type LCD 200B.

As shown in FIG. 24, the reflection-type LCD 200B has a reflection-type LCD panel 110 and an illuminating device (frontlight) 100.

The reflection-type LCD panel 110 is a known reflection-type LCD panel, and typically has a circularly polarizing plate 114 and a reflection-type LCD cell 116. The reflection-type LCD cell 116 has a pair of glass substrates 111a, 111b and a liquid crystal layer 112 interposed therebetween in order to modulate the polarization state of light passing through the liquid crystal layer 112. The reflection-type LCD cell 116 further has a reflecting electrode 113 that faces the liquid crystal layer 112 on the side opposite to the frontlight 100, in order to reflect the light having passed through the liquid crystal layer 112 toward the frontlight 100. The circularly polarizing plate 114 is a lamination of a polarizing plate, a $\lambda/2$ plate and a $\lambda/4$ plate. In the present embodiment, the circularly polarizing plate 114 is laminated to the emitting surface 22e of the light guide plate 20 in order to suppress surface reflection by the emitting surface 22e.

The illuminating device 100 has a light source 10 and a light guide plate 20. A fluorescent tube is herein used as the light source 10. It should be understood that the present invention is not limited to this and an LED (light-emitting diode) and an EL (electroluminescence) element may alternatively be used as the light source 10. A light reflecting sheet 12 surrounds the light source 10. The light reflecting sheet 12 allows the light emitted from the light source 10 to be efficiently incident on a first side surface 22a of the light guide plate 20. The light guide plate 20C of FIG. 15D is herein used as the light guide plate 20. The light guide plate 20C functions also as a transparent input device (touch panel). Information is input to the transparent input device according to deformation of the upper electrode film 36 caused by pressing.

In the present embodiment, a light guide element formed by extrusion molding of polycarbonate and having a refractive index of about 1.59 is used as the first light guide element 26. Moreover, a light guide element formed from glass and having a refractive index of about 1.53 is used as the second light guide element 27. An ultraviolet curable resin having a reflective index of about 1.59 is used as the adhesive layer 28. In the reflection-type LCD 200B of the present embodiment, the first light guide element 26 and the adhesive layer 28 have approximately the same refractive index. Therefore, the illumination light will not be adversely affected by refraction, moiré fringes, diffraction and the like. As a result, high quality display is implemented. Note that the critical angle θ of the light guide plate 20 formed from the above materials is about 40°.

In the present embodiment, the tilted regions 26a1 of the surface 26a of the first light guide element 26 are tilted at about 45° with respect to the emitting surface 22e. Reflecting films 25 of aluminum are vapor-deposited on the tilted regions 26a1 through a mask. The angle α between the tangent line of the reflecting film 25 and the emitting surface 22e is about 45°, whereas the critical angle θ of the light guide plate 20 is about 40°. Accordingly, in the reflection-type LCD 200B of the present embodiment, the angle α between the tangent line of the reflecting film 25 and the emitting surface 22e and the critical angle θ of the light guide plate 20 satisfy the above expression (2). As a result, the principal ray is efficiently emitted from the emitting surface 22e, whereby the light utilization efficiency is improved. Moreover, the light from the viewer side is less likely to be reflected by the reflecting films 25 and emitted from the opposing surface 22f. As a result, degradation in display quality caused by such reflection is suppressed.

As shown in FIG. 25, the reflecting films 25 have an island (dot) shape when viewed from the direction normal to the emitting surface 22e. The reflecting films 25 are periodically arranged with a width a (width of the reflecting film 25 in the repetition direction of the tilted regions 26a1) of 0.1 mm and at a period P of 0.45 nm. Accordingly, the ratio of the sum ΣΔs of the respective areas Δs of the reflecting films 25 projected on the emitting surface 22e of the light guide plate 20 to the area S of the emitting surface 22e is about 4% as defined by the following expression (5). Since the reflectance r of the aluminum reflecting film 25 (tilt angle α=45°) is about 90%, the reflectance R of the plurality of reflecting films 25 (R=ΣΔs/S·r) is about 3.6%. Accordingly, the resultant display is brighter than that obtained by the conventional illuminating device having a protection plate.

$$\Sigma\Delta s/S = \pi \cdot (a/2)^2/P^2 \approx 0.04 \quad (5)$$

The width A of the tilted region 26a1 of the surface 26a of the first light guide element 26 (the width of the tilted region 26a1 along the repetition direction of the tilted regions 26a1) is 0.11 mm, which is larger than the width a of the reflecting film 25 (=0.1 mm). This allows the whole reflecting film 25 to function to direct the principal ray propagated within the light guide plate 20 toward the emitting surface 22e. Therefore, unnecessary reduction in light transmittance of the light guide plate 20 is prevented, whereby brighter display is realized.

(Third Embodiment)

Figure 27:
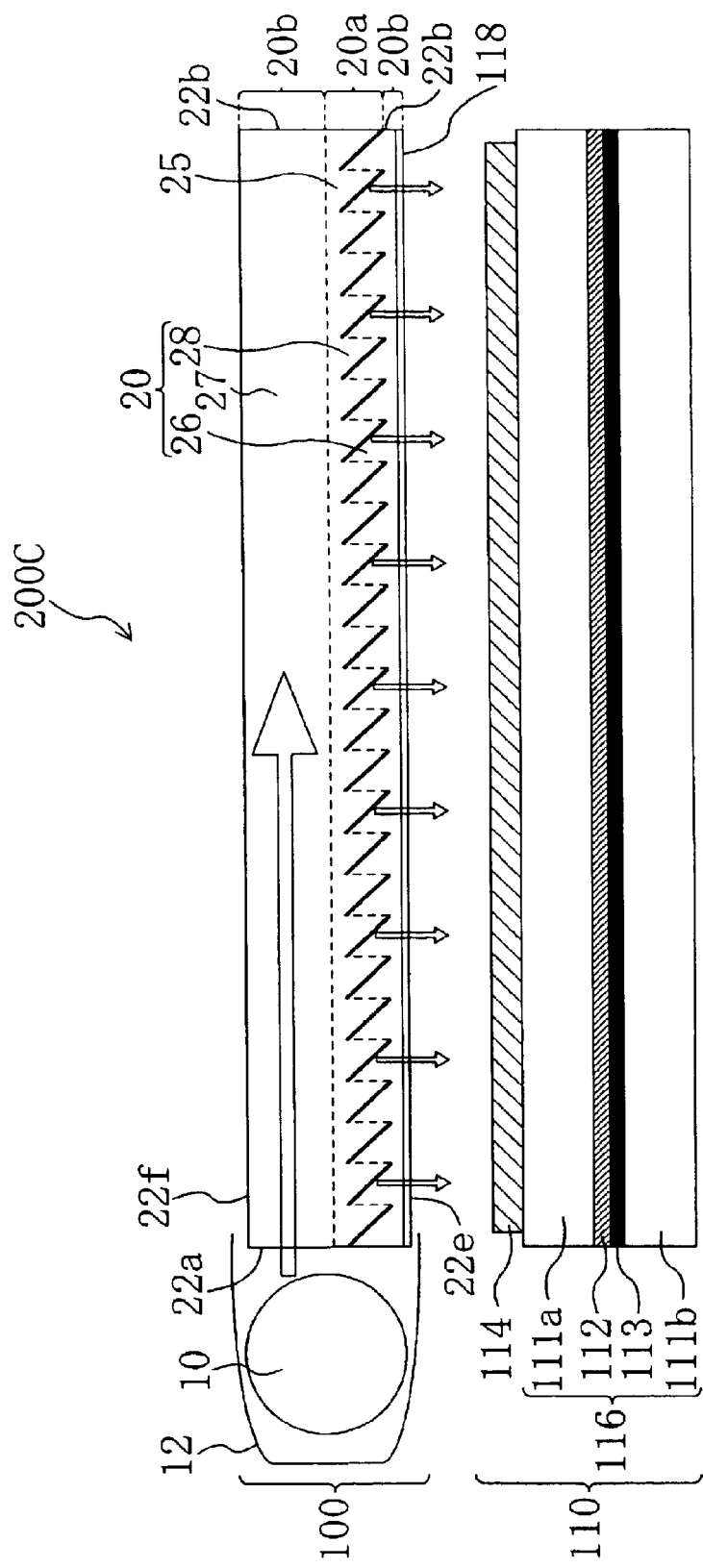
FIG. 27 is a schematic cross-sectional view of a reflection-type LCD 200C according to a third embodiment of the present invention.
Figure 28:
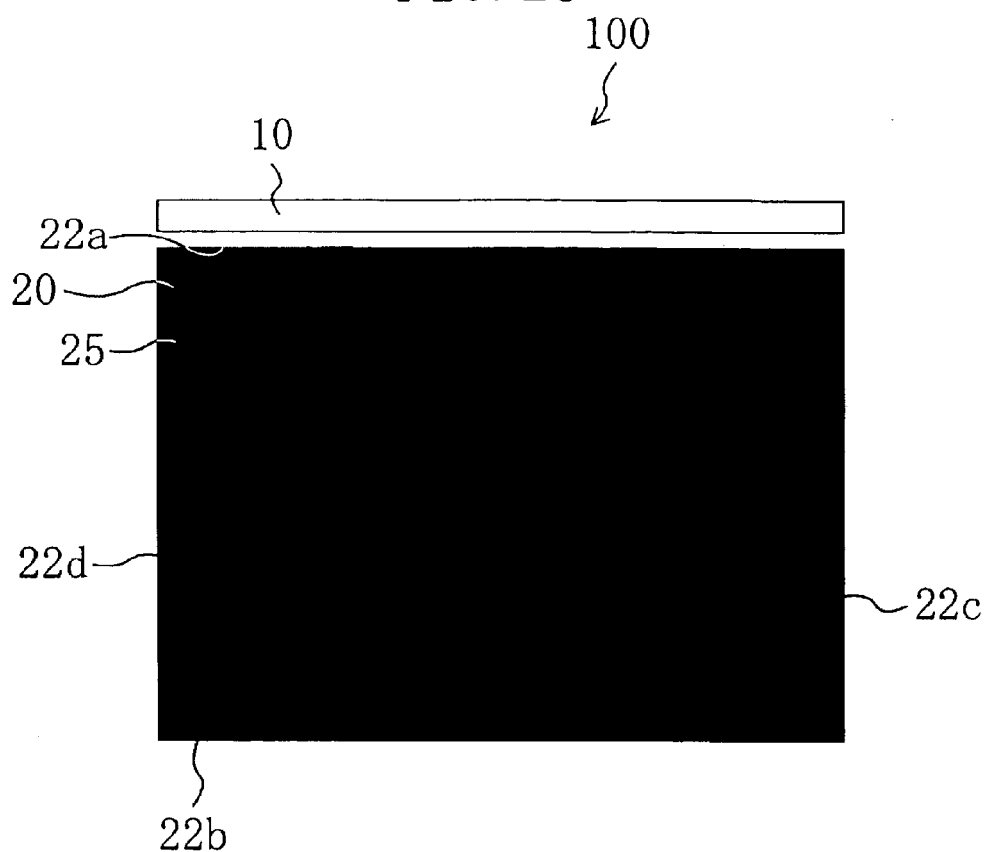
FIG. 28 is a schematic top view of an illuminating device 100 in the reflection-type LCD 200C according to the third embodiment of the present invention.
Figure 29:
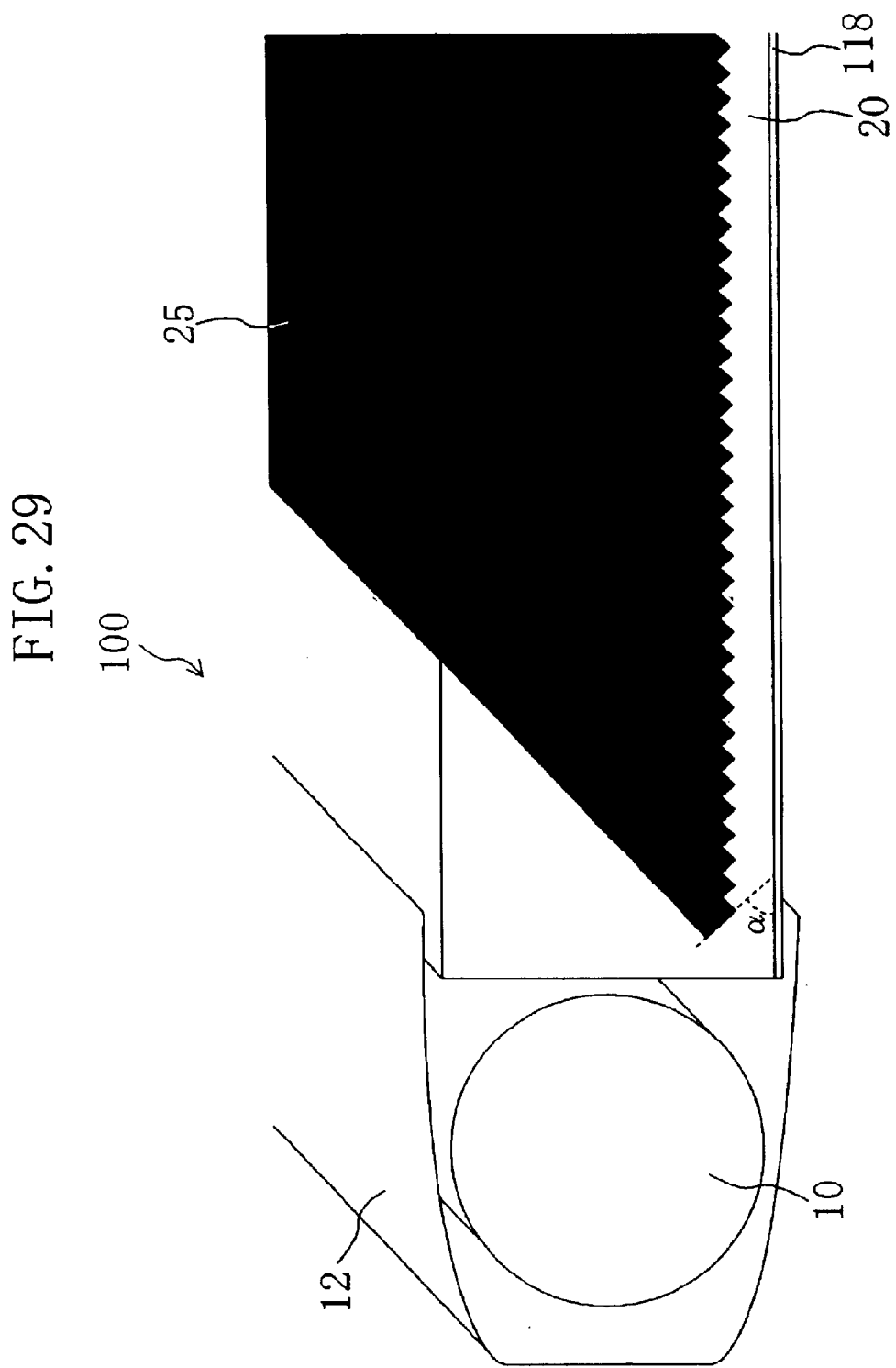
FIG. 29 is a schematic perspective view of the illuminating device 100 in the reflection-type LCD 200C according to the third embodiment of the present invention.

Hereinafter, a reflection-type LCD 200C according to the third embodiment of the present invention will be described with reference to FIGS. 27, 28 and 29. FIG. 27 is a schematic cross-sectional view of the reflection-type LCD 200C. FIG. 28 is a schematic top view of an illuminating device 100 in the reflection-type LCD 200C. FIG. 29 is a schematic perspective view of the illuminating device 100 in the reflection-type LCD 200C.

As shown in FIG. 27, the reflection-type LCD 200C has a reflection-type LCD panel 110 and an illuminating device (frontlight) 100.

The reflection-type LCD panel 110 is a known reflection-type LCD panel, and typically has a circularly polarizing plate 114 and a reflection-type LCD cell 116. The reflection-type LCD cell 116 has a pair of glass substrates 111a, 111b and a liquid crystal layer 112 interposed therebetween in order to modulate the polarization state of light passing through the liquid crystal layer 112. The reflection-type LCD cell 116 further has a reflecting electrode 113 that faces the liquid crystal layer 112 on the side opposite to the frontlight 100, in order to reflect the light having passed through the liquid crystal layer 112 toward the frontlight 100. The circularly polarizing plate 114 is a lamination of a polarizing plate, a λ/2 plate and a λ/4 plate.

The illuminating device 100 has a light source 10 and a light guide plate 20. A fluorescent tube is herein used as the light source 10. It should be understood that the present invention is not limited to this and an LED (light-emitting diode) and an EL (electroluminescence) element may alternatively be used as the light source 10. A light reflecting sheet 12 surrounds the light source 10. The light reflecting sheet 12 allows the light emitted from the light source 10 to be efficiently incident on a first side surface 22a of the light guide plate 20. The light guide plate 20A' of FIG. 13D is herein used as the light guide plate 20.

In the present embodiment, a light guide element formed by extrusion molding of polymethyl methacrylate and having a refractive index of about 1.49 is used as the first light guide element 26. Moreover, a light guide element formed by extrusion molding of polymethyl methacrylate and having a refractive index of about 1.49 is used as the second light guide element 27. An acrylic adhesive having a reflective index of about 1.49 is used as the adhesive layer 28. In the reflection-type LCD 200C of the present embodiment, the first light guide element 26, the adhesive layer 28 and the second light guide element 27 have approximately the same refractive index and thus are optically integral. Therefore, optical phenomena that adversely affect the illumination light will not occur at each interface. As a result, high quality display is implemented. Note that the critical angle θ of the light guide plate 20 formed from the above materials is about 42°.

In the present embodiment, the tilted regions 26a1 of the surface 26a of the first light guide element 26 are tilted at about 45° with respect to the emitting surface 22e. Dielectric films of $Al_2O_3$ are vapor-deposited on the tilted regions 26a1 as reflecting films 25. The $Al_2O_3$ dielectric films thus formed as the reflecting films 25 have a thickness of 110 nm. Of the light emitted from the light source 10 into the light guide plate 20, the reflecting films 25 selectively reflect S-polarized light. Accordingly, the illuminating device 100 hardly emits the light polarized in the direction parallel to the repetition direction of the reflecting films 25, but efficiently emits the light polarized in the direction perpendicular thereto. It should be understood that the material of the dielectric films is not limited to $Al_2O_3$, and another material such as $MgF_2$ or $SiO_2$ may alternatively be used. Moreover, the reflecting films 25 may be dielectric multi-layer films.

In the present embodiment, the angle α between the tangent line of the reflecting film 25 and the emitting surface 22e is about 45°, whereas the critical angle θ of the light guide plate 20 is about 42°. Accordingly, in the reflection-type LCD 200C of the present embodiment, the angle α between the tangent line of the reflecting film 25 and the emitting surface 22e and the critical angle θ of the light guide plate 20 satisfy the above expression (2). As a result, the principal ray is efficiently emitted from the emitting surface 22e, whereby the light utilization efficiency is improved. Moreover, the light from the viewer side is less likely to be reflected by the reflecting films 25 and emitted from the opposing surface 22f. As a result, degradation in display quality caused by such reflection is suppressed.

As shown in FIG. 29, the reflecting films 25 are formed on the whole surface of the tilted regions 26a1 of the surface 26a of the first light guide element 26. As shown in FIG. 28, the reflecting films 25 are therefore uniformly formed over the whole surface when viewed from the direction normal to the emitting surface 22e. Accordingly, the ratio of the sum ΣΔs of the respective areas Δs of the reflecting films 25 projected on the emitting surface 22e to the area S of the emitting surface 22e is 100%. Since the reflectance r of the reflecting film 25 ($Al_2O_3$ dielectric film) (tilt angle α=45°) is at most about 3% as described below, the reflectance R of the plurality of reflecting films 25 (R=ΣΔs/S·r) is about 3%. Accordingly, the resultant display is brighter than that obtained by the conventional illuminating device having a protection plate.

Note that, in the reflection-type LCD 200C of the present embodiment, the emitting surface 22e of the light guide plate 20 is subjected to an antireflection process 118 in order to suppress surface reflection by the emitting surface 22e which occurs when the light within the light guide plate 20 is emitted from the emitting surface 22e. For example, as the antireflection process, an antireflection layer of $MgF_2$, $SiO_2$ or the like may be formed with a thickness of about 0.1 μm on the emitting surface 22e of the light guide plate 20 by using a vapor deposition or sputtering method.

As described above, the illuminating device 100 in the reflection-type LCD 200C of the present embodiment mainly emits the light polarized in the direction perpendicular to the repetition direction of the reflecting films 25. Therefore, when the transmission axis of a polarizing plate used as the circular polarizing plate 114 of the reflection-type LCD panel 110 matches the direction perpendicular to the repetition direction of the reflecting films 25, or the light polarized in the direction perpendicular to the repetition direction of the reflecting films 25 is rotated by a phase plate so that the polarization direction of the light matches the transmission axis of the polarizing plate, light absorption by the polarizing plate is suppressed, enabling improvement in luminance.

Figure 41:
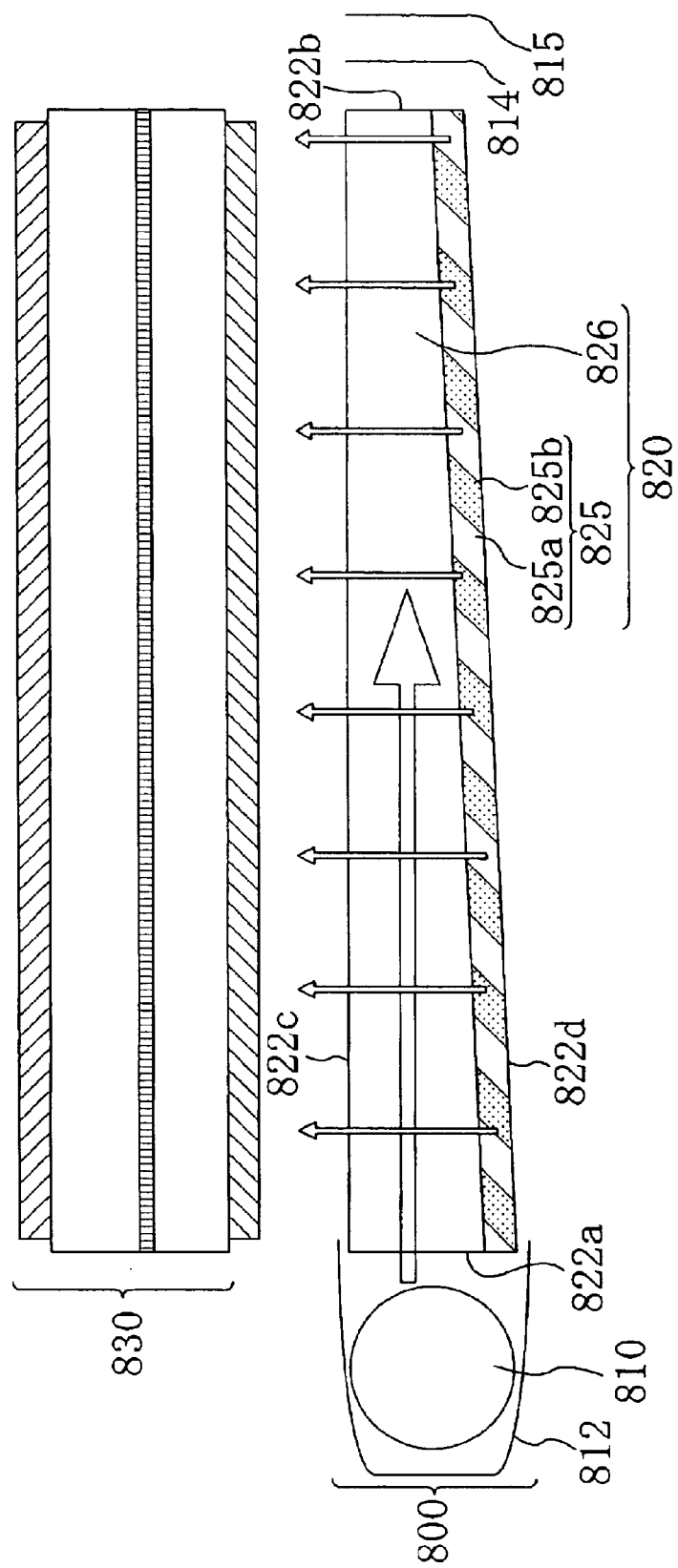
FIG. 41 is a schematic cross-sectional view of a transmission-type LCD 850 having a conventional illuminating device 800.

Note that Japanese Laid-Open Publication No. 9-5739 discloses a backlight for emitting illumination light with polarization control and a transmission-type LCD including the same. FIG. 41 is a schematic cross-sectional view of the transmission-type LCD 850 disclosed in this publication.

As shown in FIG. 41, the transmission-type LCD 850 has a transmission-type LCD panel 830 and a backlight 800 that faces the transmission-type LCD panel 830 on the side opposite to the viewer. The backlight 800 has a light source 810, a light guide plate 820, a λ/4 plate (quarter wave plate) 814 and a reflecting member 815. The λ/4 plate 814 and the reflecting member 815 face the light source 820 with the light guide plate 820 interposed therebetween.

The light guide plate 820 has a first side surface (incident side surface) 822a located at the light source 810, a second side surface (opposing side surface) 822b facing the first side surface 822a, an emitting surface 822c for emitting incident light from the light source 810, and an opposing surface 822d facing the emitting surface 822c. The light guide plate 820 is a lamination of a light guide sheet 825 and a light guide element 826. The light guide sheet 825 is an alternate lamination of amorphous layers 825a, 825b having different refractive indices. The amorphous layers 825a, 825b are alternately laminated at a prescribed angle.

Light emitted from the light source 810 into the light guide plate 820 through the incident side surface 822a is propagated toward the second side surface 822b while being repeatedly totally reflected by the opposing surface 822d and the emitting surface 822c. The light propagated within the light guide plate 820 is partially reflected by the interfaces between the amorphous layers 825a, 825b of the light guide sheet 825 and emitted from the emitting surface 822c, thereby illuminating the transmission-type LCD 830.

It is known in the art that the reflectance of the interface between the amorphous layers having different refractive indices varies depending on the polarization direction. When light is incident on the interface between the amorphous layers having different refractive indices at a specific incident angle called Brewster's angle, the reflectance of P-polarized light is zero, and only S-polarized light is reflected.

Accordingly, laminating the amorphous layers 825a, 825b of the light guide sheet 825 at an angle close to the Brewster's angle with respect to the emitting surface 822c of the light guide plate 820 would reduce the reflectance of the light polarized in the direction parallel to the repetition direction of the amorphous layers 825a, 825b and increase the reflectance of the light polarized in the direction perpendicular thereto. As a result, illumination light emitted from the light guide plate 820 can be provided with polarization characteristics.

The light emitted from the light source 812 into the light guide plate 820 partially reaches the second side surface 822b without being emitted from the emitting surface 822c of the light guide plate 820. The λ/4 plate 814 and the reflecting member 815 provided at the second side surface (opposing side surface) 822b of the light guide plate 820 rotate the polarization direction of the light reaching the second side surface 822b and direct the light back into the light guide plate 820. The λ/4 plate 814 and the reflecting member 815 are thus provided in order to improve the light utilization efficiency.

A transmission-type LCD panel having a polarizing plate is commonly used as the transmission-type LCD panel 830. In the transmission-type LCD 850, however, the illuminating device 800 emits the illumination light having its polarization (polarization direction) controlled, as described above. This suppresses light absorption by the polarizing plate, enabling improvement in luminance of the transmission-type LCD 850.

Figure 42:
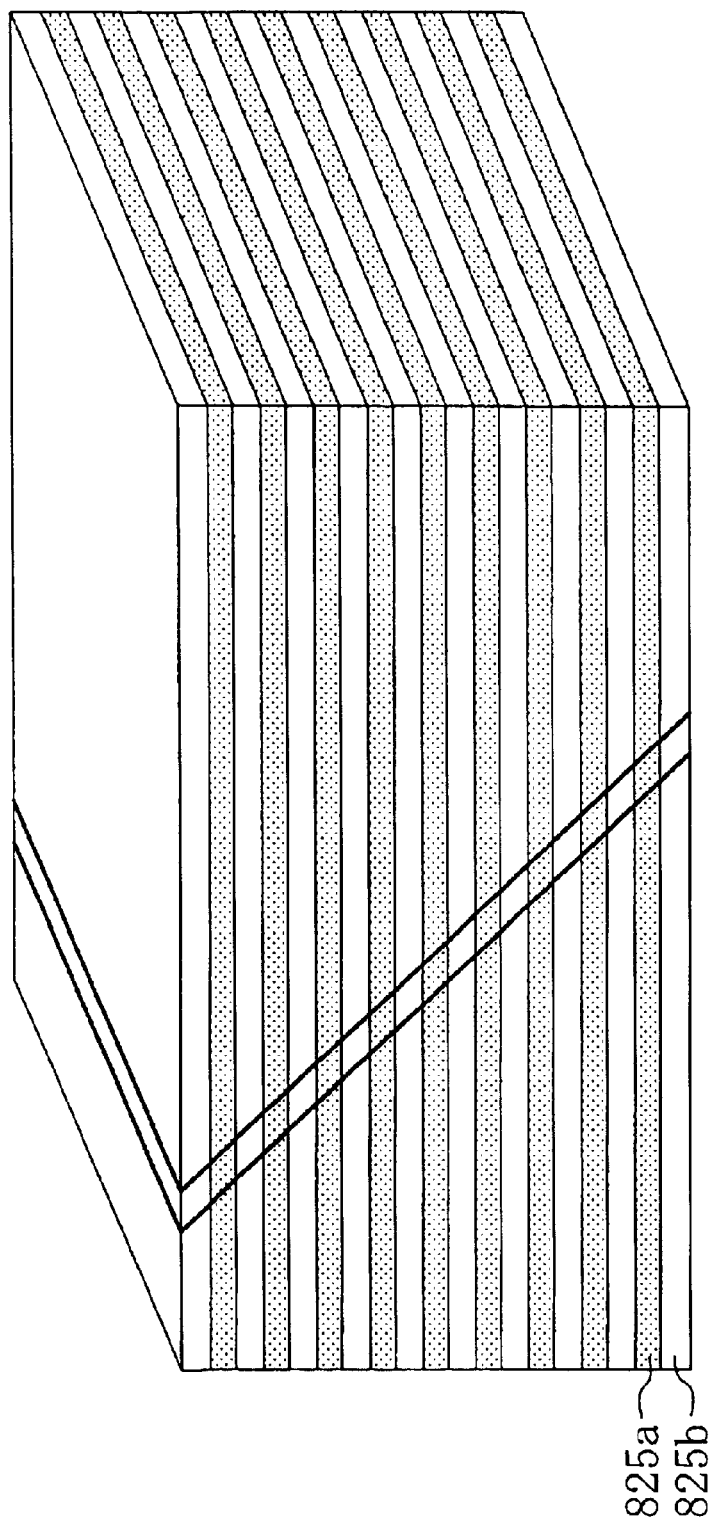
FIG. 42 is a schematic perspective view of a film lamination 825' used to manufacture a light guide sheet 825 of a light guide plate 820 included in the conventional illuminating device 800.

Note that the light guide sheet 825 is manufactured as follows: as shown in FIG. 42, a lamination 825' of a multiplicity of amorphous layers, that is, a lamination 825' of films having a prescribed thickness and a prescribed refractive index, is fabricated and cut in the oblique direction at a prescribed angle and with a prescribed thickness.

However, the backlight 800 and the transmission-type LCD 850 disclosed in the aforementioned Japanese Laid-Open Publication No. 9-5739 have the following problems:

In the backlight 800 disclosed in the above publication, illumination light is emitted as a result of reflection by the interfaces between the amorphous layers 825a, 825b laminated in the light guide sheet 825. However, since the reflectance obtained by the difference in refractive index between the amorphous layers is extremely low, the light propagated within the light guide plate 820 cannot efficiently be emitted as illumination light. Moreover, since the difference in reflectance between P-polarized light and S-polarized light at the interface between the amorphous layers is not so large, the difference in light amount according to the polarization direction of the illumination light to be emitted cannot be increased.

Moreover, the manufacturing process of the film lamination 825' for manufacturing the light guide sheet 825 requires the steps of laminating several hundreds to several thousands of films and obliquely cutting the resultant lamination at a prescribed angle. This significantly complicates the manufacturing process. Moreover, since the film lamination 825' is cut obliquely, it is impossible to utilize the entire film lamination 825'. As a result, the film lamination 825' is wasted.

In contrast, the illuminating device 100 in the reflection-type LCD 200C of the third embodiment uses transparent dielectric films as reflecting films 25. This illuminating device 100 thus emits illumination light by reflection at the interfaces between the first light guide element 26 (or adhesive layer 28) and the dielectric films. This increases the difference in reflectance between P-polarized light and S-polarized light, whereby the illumination light can be efficiently emitted. Moreover, the light guide plate 20 in the illuminating device 100 of the reflection-type LCD 200C can be manufactured by a simple manufacturing process as shown in, e.g., FIGS. 13A to 13D.

Hereinafter, a preferred thickness range of the reflecting film 25 (transparent dielectric film or transparent dielectric multi-layer film) will be described.

It is known in the art that a polarized beam splitter utilizing polarization dependence of the reflectance of the dielectric multi-layer film and light interference can be designed to have a high reflectance of S-polarized light while having a low reflectance of P-polarized light by alternately laminating dielectric films having different refractive indices with a thickness satisfying the λ/4 conditions for a specific light wavelength λ (e.g., "Kougaku Hakumaku (Optical Thin Film)", KYORITSU SHUPPAN CO., LTD., pp. 126–129). Moreover, various materials such as $MgF_2$, $SiO_2$ and $Al_2O_3$ are known as a dielectric film material (e.g., "Ouyo Butsuri Kougaku Sensho 3, Hakumaku (Applied Physics Engineering Selection 3, Thin Film)", BAIFUKAN CO., LTD., p. 203).

Figure 30:
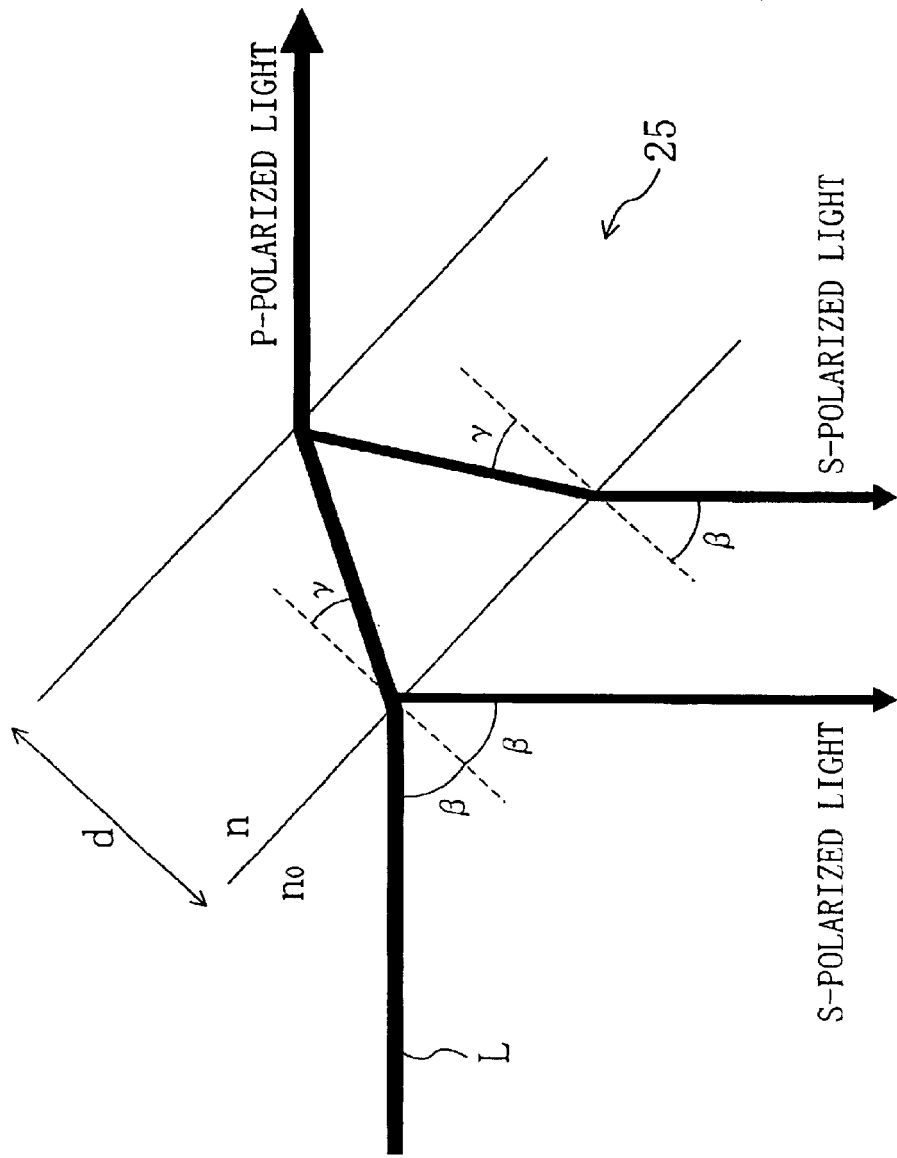
FIG. 30 schematically shows how the light is propagated after entering a light guide plate 20 of the illuminating device 100 in the reflection-type LCD 200C.

Similarly, a low reflectance of P-polarized light and a high reflectance of S-polarized light can be designed by forming dielectric films or dielectric multi-layer films with a thickness satisfying the λ/4 conditions as the reflecting films 25 within the first light guide layer 20a. More specifically, provided that the principal ray L of the light entering the light guide plate 20 through the first side surface 22a is incident on the dielectric film 25 (or dielectric multi-layer film) at an incident angle β as shown in FIG. 30, the refraction angle γ of the principal ray in the dielectric film 25, the thickness d of the dielectric film 25, the refractive index n of the dielectric film 25 and the refractive index $n_0$ of the first light guide layer 20a (herein, refractive index of the first light guide element 26 and the adhesive layer 28) need only satisfy the following expressions (6) and (7):

$$d=\lambda/(4n \cdot \cos \beta) \tag{6};$$

and $$n_0 \cdot \sin \beta = n \cdot \sin \gamma \tag{7}.$$

In view of the fact that the visible light has a wavelength range of about 380 nm to about 780 nm, the thickness d of the dielectric film 25 (or dielectric multi-layer film) need only satisfy the following expression (6'):

$$380/(4n \cdot \cos \gamma) \leq d \leq 780/(4n \cdot \cos \gamma) \tag{6'}.$$

Figure 31:
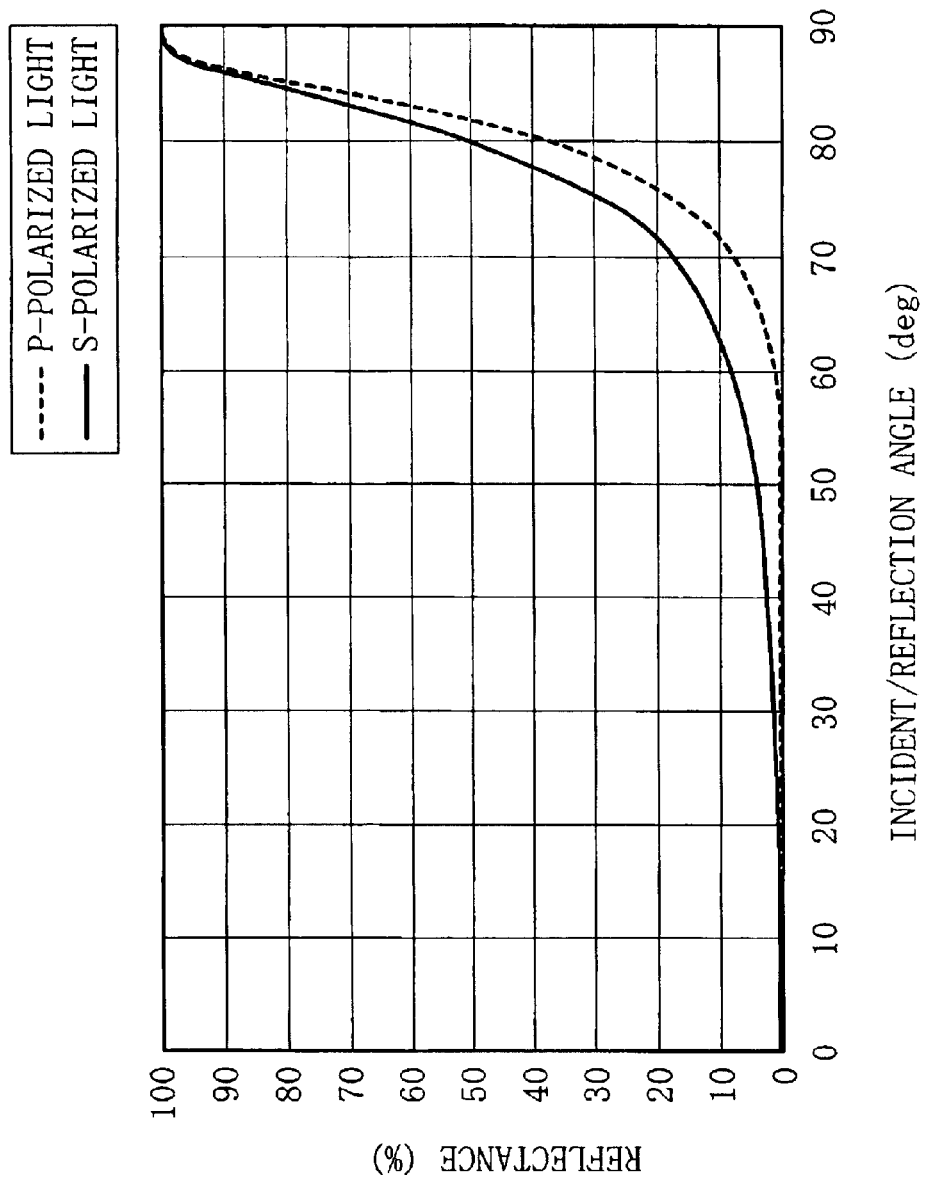
FIG. 31 is a graph showing polarization dependence of the reflectance of light having a wavelength of 550 nm in the case where $Al_2O_3$ films having a refractive index of 1.63 and a thickness of 110 nm are formed as reflecting films 25 within a first light guide layer 20a having a refractive index of 1.49.
Figure 32:
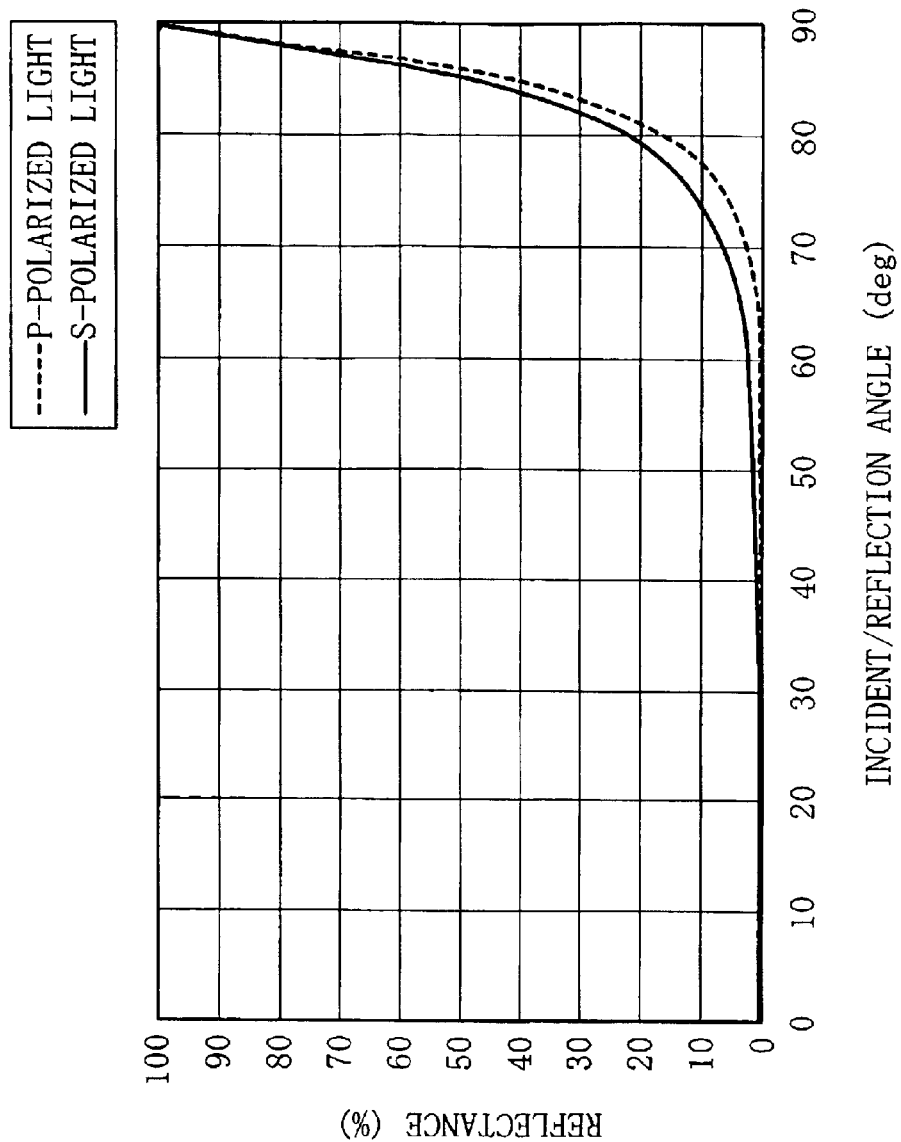
FIG. 32 is a graph showing polarization dependence of the reflectance of light (wavelength: 550 nm) in the case where light is incident on a medium having a refractive index of 1.63 from a medium having a refractive index of 1.49 (in this graph, light interference is not considered)
Figure 33:
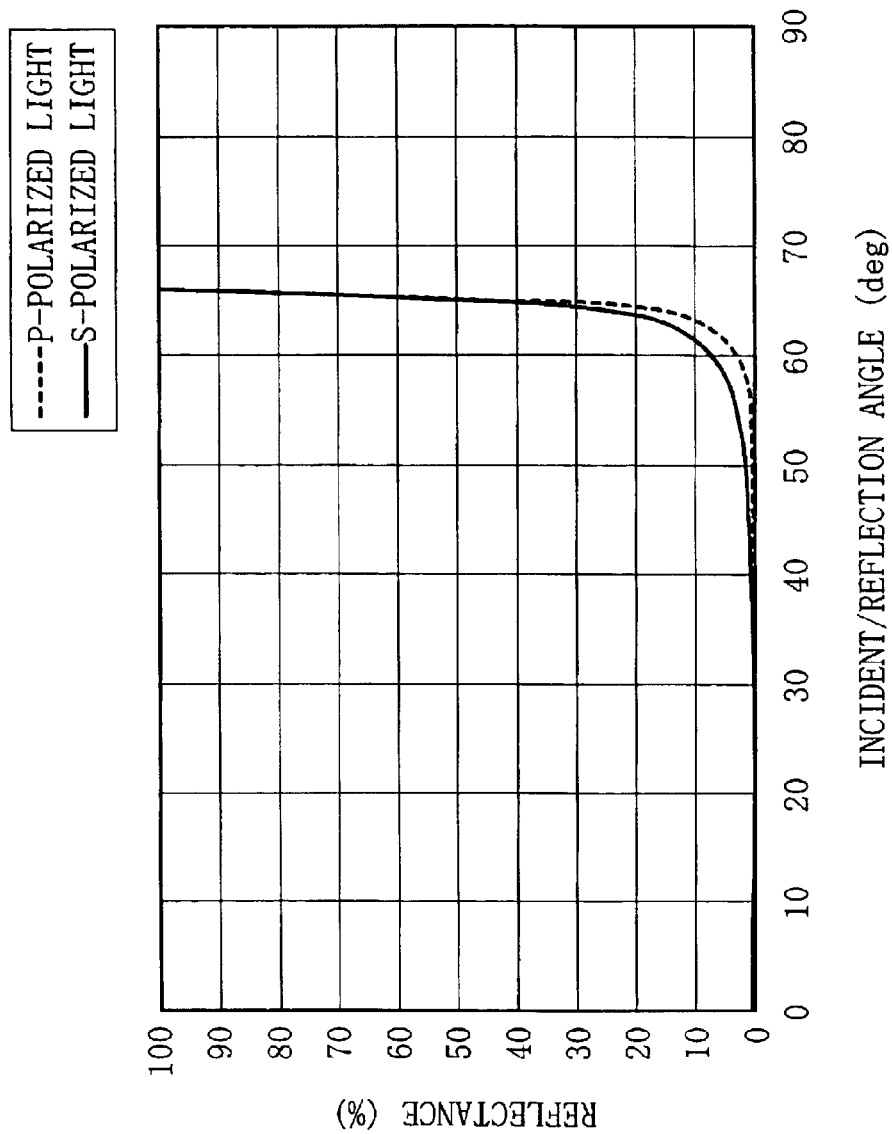
FIG. 33 is a graph showing polarization dependence of the reflectance of light (wavelength: 550 nm) in the case where light is incident on a medium having a refractive index of 1.49 from a medium having a refractive index of 1.63 (in this graph, light interference is not considered)

FIG. 31 shows polarization dependence of the reflectance of light having a wavelength of 550 nm. In FIG. 31, $Al_2O_3$ films having a refractive index of 1.63 and a thickness of 110 nm are formed as reflecting films 25 within the first light guide layer 20a having a refractive index of 1.49 (the first light guide layer 20a is formed from the first light guide element 26 of an acrylic resin and the adhesive layer 28 of an acrylic adhesive). FIG. 31 is a graph showing the relation between reflectance (%) and incident/reflection angle (deg) of P-polarized light and S-polarized light. For comparison, FIGS. 32 and 33 show polarization dependence of the reflectance without considering light interference. FIG. 32 shows the case where light is incident on a medium having a refractive index of 1.63 from a medium having a refractive index of 1.49. FIG. 33 shows the case where light is incident on a medium having a refractive index of 1.49 from a medium having a refractive index of 1.63. Without considering light interference, the reflectance corresponds to the reflectance at the interface between the amorphous layers in the light guide sheet 825 of the backlight 800 disclosed in the aforementioned Japanese Laid-Open Publication No. 9-5739.

As shown in FIGS. 31, 32 and 33, near the incident angle at which the reflectance of P-polarized light is zero, that is, near the Brewster's angle, the reflectance of S-polarized light is higher at the dielectric film than at the interface between the amorphous layers, and the difference in reflectance between P-polarized light and S-polarized light is larger. The illuminating device 100 of the present embodiment uses dielectric films (or dielectric multi-layer films) for selectively reflecting S-polarized light as reflecting films 25. Therefore, the illuminating device 100 of the present embodiment is capable of emitting illumination light with improved efficiency over the backlight 800 disclosed in the aforementioned Japanese Laid-Open Publication No. 9-5739. As a result, the difference in light amount according to the polarization direction of the illumination light can be increased.

Note that when an LCD panel having a polarizing plate is illuminated with the illuminating device 100 of the present invention that provides illumination light with polarization characteristics as described above, the relation between the polarization direction of the illumination light and the polarization axis (transmission axis) of the polarizing plate must be considered. More specifically, since the illuminating device 100 mainly emits the light polarized in the direction perpendicular to the repetition direction of the reflecting films 25. Therefore, it is preferable to match the direction perpendicular to the repetition direction of the reflecting films 25 with the transmission axis of the polarizing plate. Alternatively, it is preferable to rotate the light polarized in the direction perpendicular to the repetition direction of the reflecting films 25 by a phase plate so that the polarization direction of the light matches the transmission axis of the polarizing plate.

(Fourth Embodiment)

Figure 34:
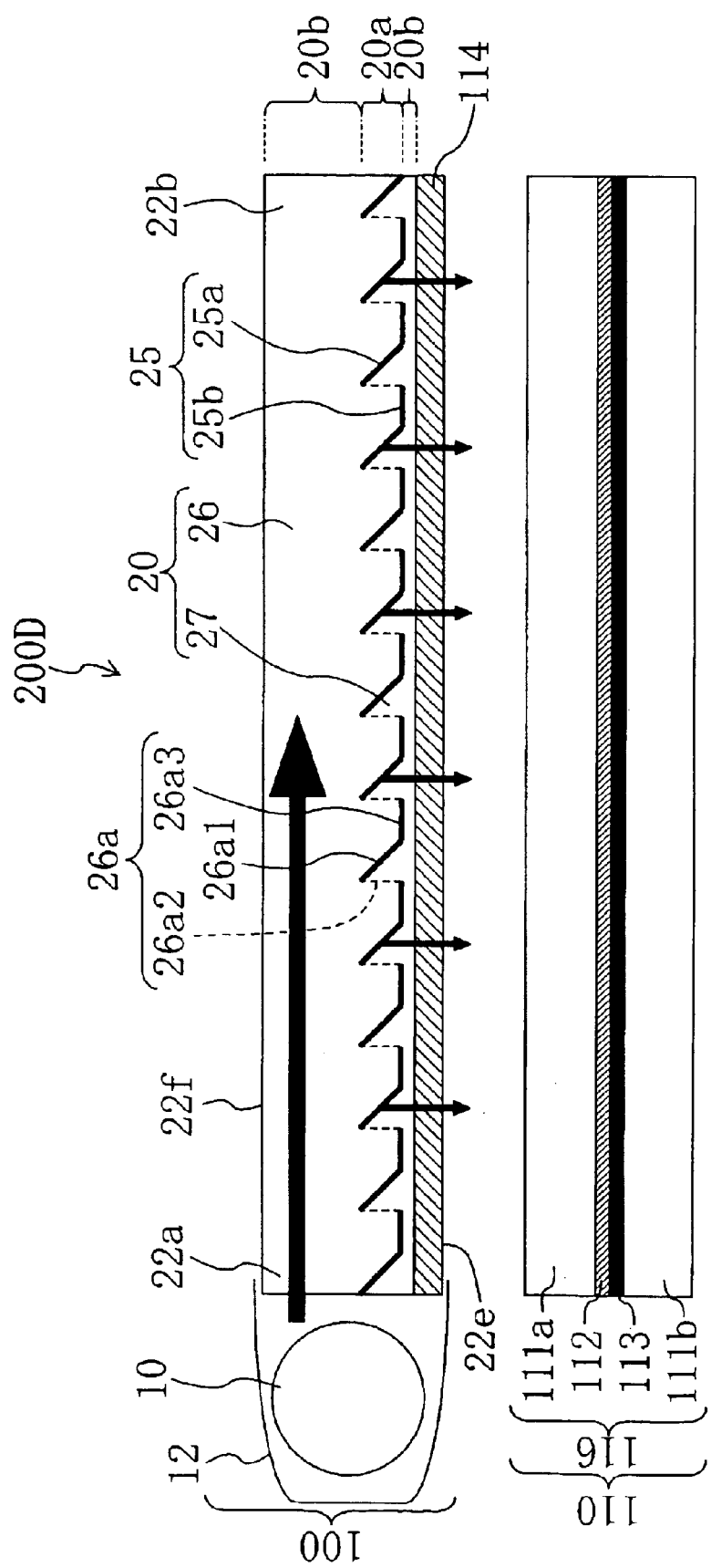
FIG. 34 is a schematic cross-sectional view of a reflection-type LCD 200D according to a fourth embodiment of the present invention.
Figure 35:
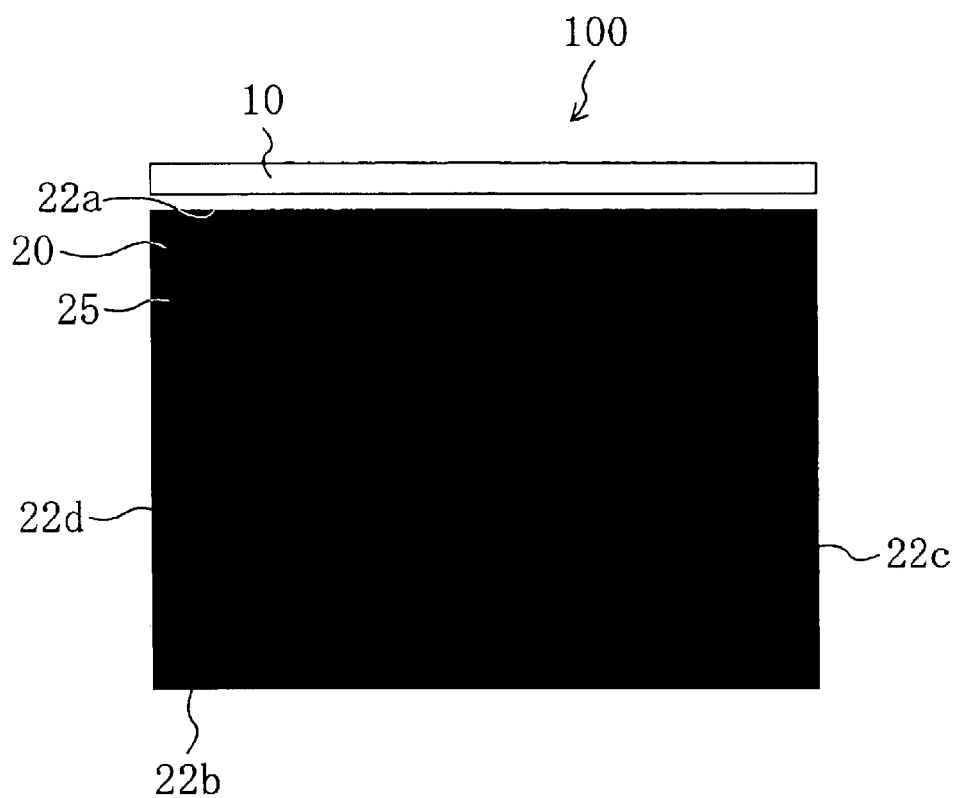
FIG. 35 is a schematic top view of an illuminating device 100 in the reflection-type LCD 200D according to the fourth embodiment of the present invention.
Figure 36:
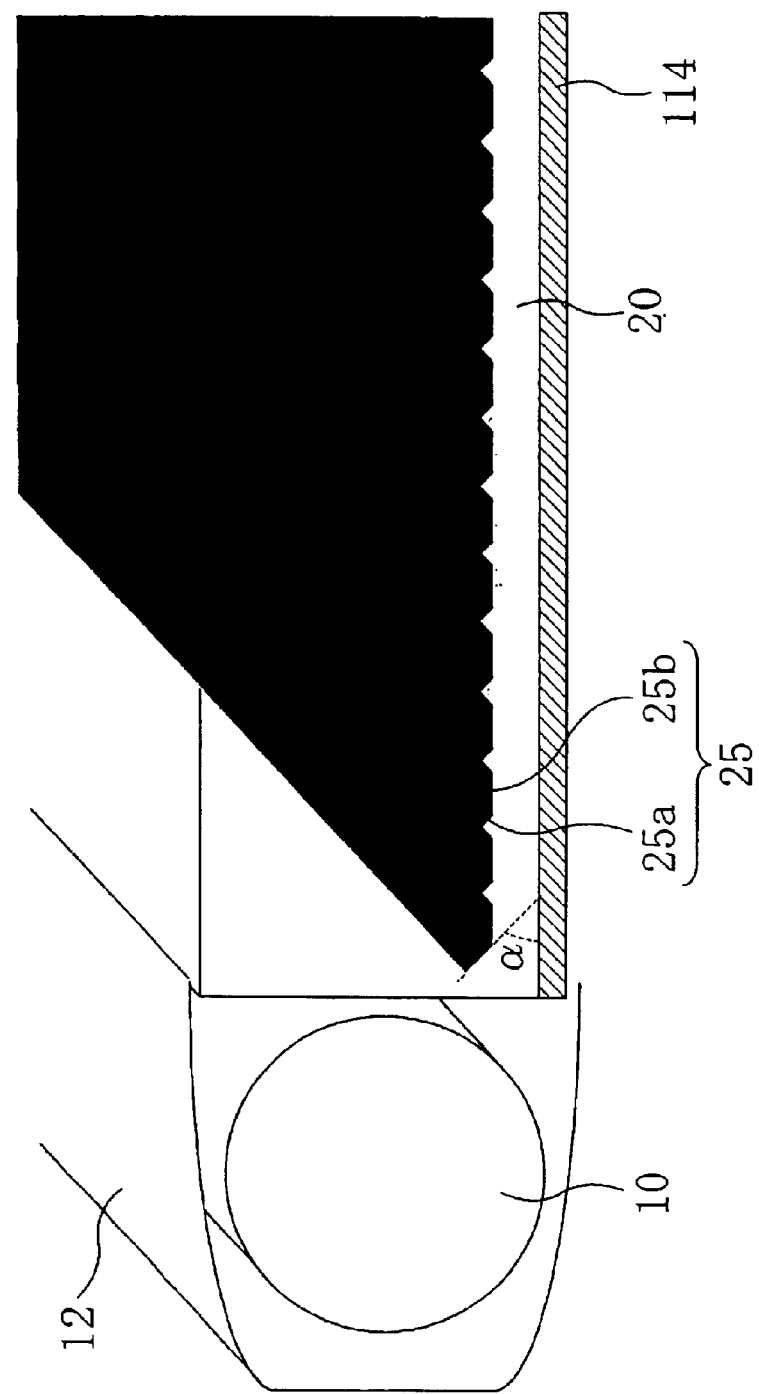
FIG. 36 is a schematic perspective view of the illuminating device 100 in the reflection-type LCD 200D according to the fourth embodiment of the present invention.

Hereinafter, a reflection-type LCD 200D according to the fourth embodiment of the present invention will be described with reference to FIGS. 34, 35 and 36. FIG. 34 is a schematic cross-sectional view of the reflection-type LCD 200D. FIG. 35 is a schematic top view of an illuminating device 100 of the reflection-type LCD 200D. FIG. 36 is a schematic perspective view of the illuminating device 100 of the reflection-type LCD 200D.

As shown in FIG. 34, the reflection-type LCD 200D has a reflection-type LCD panel 110 and an illuminating device (frontlight) 100.

The reflection-type LCD panel 110 is a known reflection-type LCD panel, and typically has a circularly polarizing plate 114 and a reflection-type LCD cell 116. The reflection-type LCD cell 116 has a pair of glass substrates 111a, 111b and a liquid crystal layer 112 interposed therebetween in order to modulate the polarization state of light passing through the liquid crystal layer 112. The reflection-type LCD cell 116 further has a reflecting electrode 113 that faces the liquid crystal layer 112 on the side opposite to the frontlight 100, in order to reflect the light having passed through the liquid crystal layer 112 toward the frontlight 100. The circularly polarizing plate 114 is a lamination of a polarizing plate, a λ/2 plate and a λ/4 plate. In the present embodiment, the circularly polarizing plate 114 is laminated to the emitting surface 22e of the light guide plate 20 in order to suppress surface reflection by the emitting surface 22e.

The illuminating device 100 has a light source 10 and a light guide plate 20. A fluorescent tube is herein used as the light source 10. It should be understood that the present invention is not limited to this and an LED (light-emitting diode) and an EL (electroluminescence) element may alternatively be used as the light source 10. A light reflecting sheet 12 surrounds the light source 10. The light reflecting sheet 12 allows the light emitted from the light source 10 to be efficiently incident on a first side surface 22a of the light guide plate 20. The light guide plate 20D of FIG. 16D is herein used as the light guide plate 20.

In the present embodiment, a light guide element formed by injection molding of ARTON (transparent resin made by JSR Corporation) and having a refractive index of about 1.51 is used as the first light guide element 26. Moreover, a light guide element formed by curing an ultraviolet curable resin applied to the surface 26a of the first light guide plate 26 and having a refractive index of about 1.51 is used as the second light guide element 27. Accordingly, the adhesive layer between the first light guide element 26 and the second light guide element 27 is eliminated in the present embodiment.

In the reflection-type LCD 200D of the present embodiment, the first light guide element 26 and the second light guide element 27 have approximately the same refractive index and thus are optically integral. Therefore, optical phenomena that adversely affect the illumination light will not occur at the interface. As a result, high quality display is implemented. Note that the critical angle θ of the light guide plate 20D formed from the above materials is about 41°.

In the present embodiment, the tilted regions 26a1 of the surface 26a of the first light guide element 26 are tilted at about 45° with respect to the emitting surface 22e. The tilted regions 26a1 and the parallel regions 26a3 are formed at 1:1 This means that the width of the tilted region 26a1 to that of the parallel region 26a3 is 1:1 along the repetition direction of the tilted regions 26a1 (or when viewed from the direction normal to the emitting surface 22e).

Dielectric films of MgO are vapor-deposited on the tilted regions 26a1 and the parallel regions 26a3 as reflecting films 25. The MgO reflecting films 25 have a thickness of 100 nm and a refractive index of 1.75.

Figure 37:
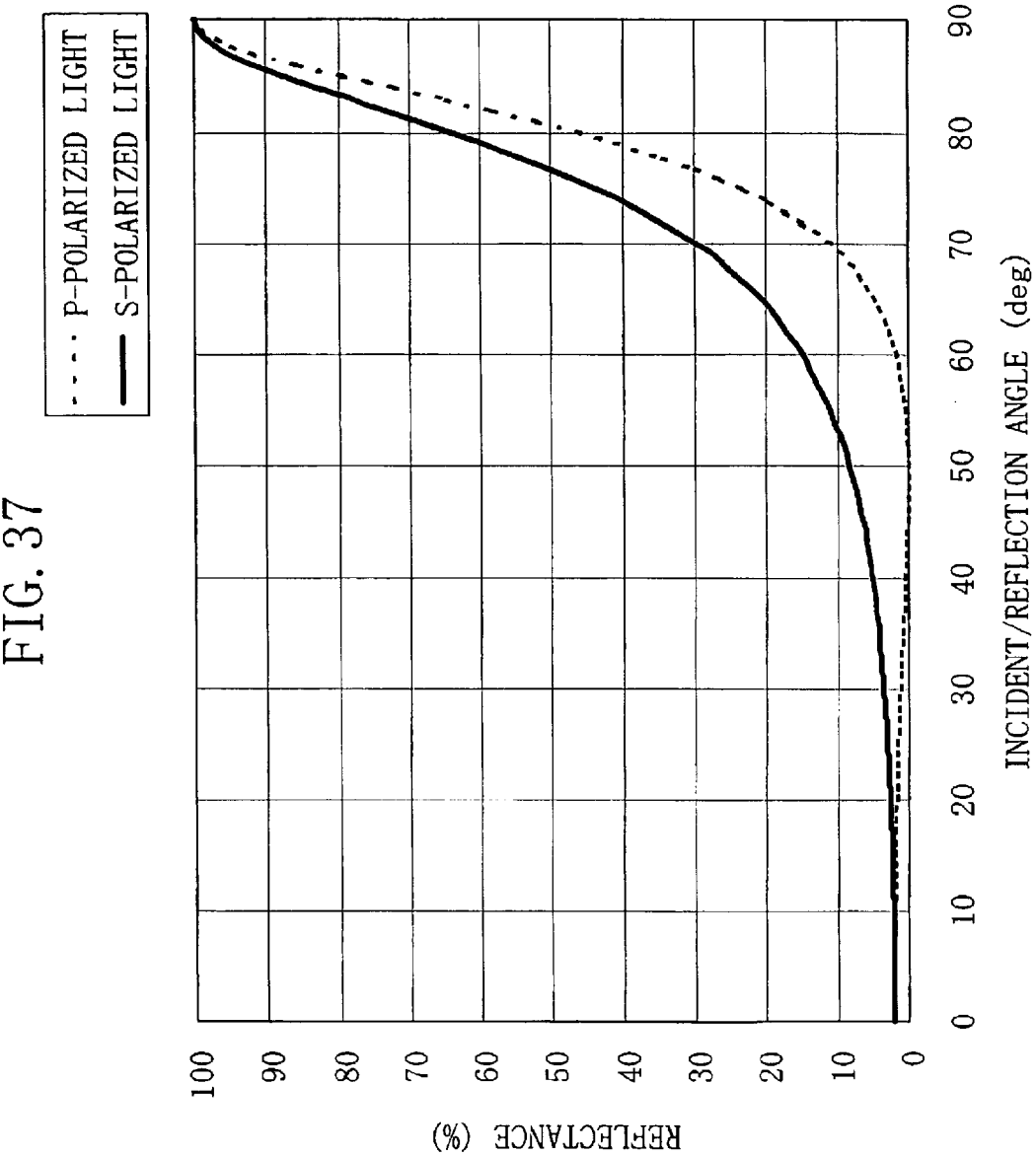
FIG. 37 is a graph showing polarization dependence of the reflectance of light having a wavelength of 550 nm in the case where MgO films having a refractive index of 1.75 and a thickness of 100 nm are formed as reflecting films 25 within a first light guide layer 20a having a refractive index of 1.51.
Figure 38:
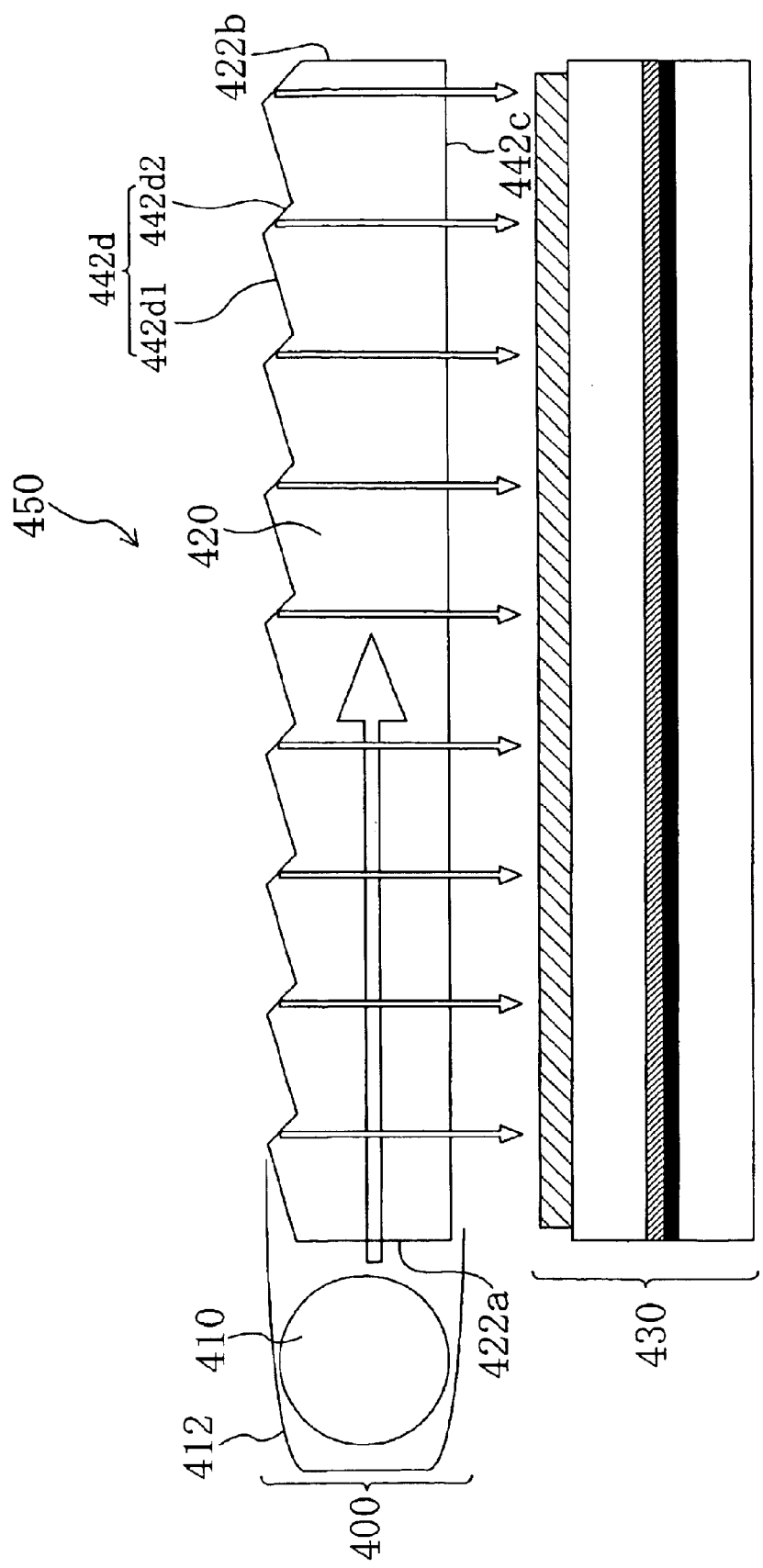
FIG. 38 is a schematic cross-sectional view of a reflection-type LCD 450 having a conventional illuminating device 400.
Figure 39A:
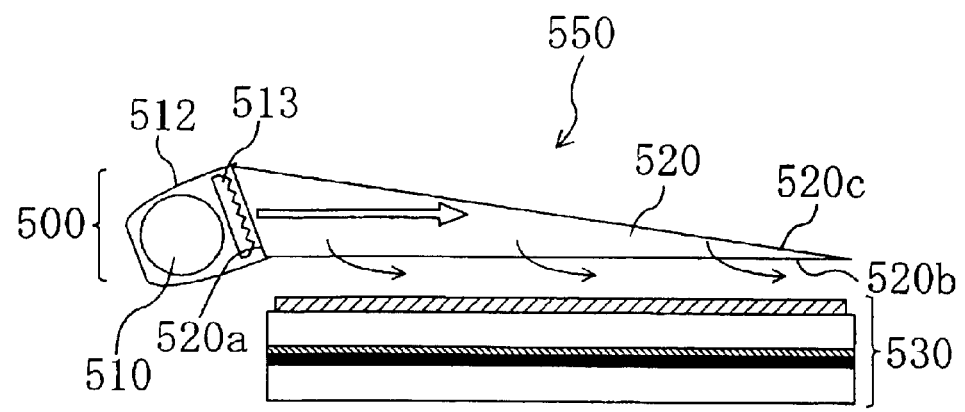
FIG. 39A is a schematic cross-sectional view of a reflection-type LCD 550 having a conventional illuminating device 500.
Figure 39B:
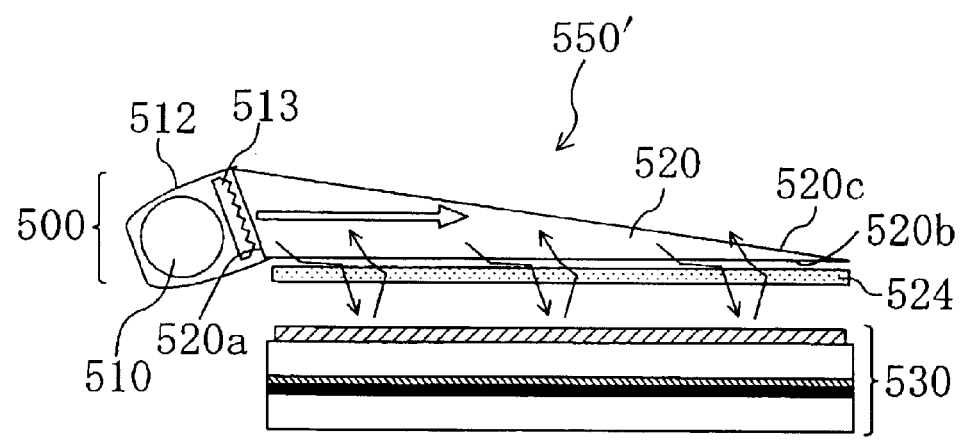
FIG. 39B is a schematic cross-sectional view of a reflection-type LCD 550' having a conventional illuminating device 500'.

FIG. 37 shows polarization dependence of the reflectance of light having a wavelength of 550 nm. In FIG. 37, MgO films having a refractive index of 1.75 and a thickness of 100 nm are formed as reflecting films 25 within the first light guide layer 20a having a refractive index of 1.51 (the first light guide layer 20a is formed from the first light guide element 26 of ARTON and the second light guide element 27 of ultraviolet curable resin). FIG. 37 is a graph showing the relation between reflectance (%) and incident/reflection angle (deg) of P-polarized light and S-polarized light.

As shown in FIG. 37, the reflectance of the reflecting films 25 has such polarization dependence that causes selective reflection of S-polarized light. Therefore, of the light emitted from the light source 10 into the light guide plate 20, almost only the S-polarized light is reflected by the reflecting films 25a of the tilted regions 26a1 and emitted from the emitting surface 22e. Accordingly, the illuminating device 100 hardly emits the light polarized in the direction parallel to the repetition direction of the reflecting films 25, but efficiently emits the light polarized in the direction perpendicular thereto. It should be understood that SiO, $ZrO_2$ or the like may be used as a material of the dielectric films and the reflecting films 25 may be dielectric multi-layer films.

In the present embodiment, the angle α between the tangent line of the reflecting film 25a formed on the tilted region 26a1 of the first light guide element 26 and the emitting surface 22e is about 45°, whereas the critical angle θ of the light guide plate 20D is about 41°. Accordingly, in the reflection-type LCD 200D of the present embodiment, the angle α between the tangent line of the reflecting film 25a and the emitting surface 22e and the critical angle θ of the light guide plate 20 satisfy the above expression (2). As a result, the principal ray is efficiently emitted from the emitting surface 22e, whereby the light utilization efficiency is improved. Moreover, the light from the viewer side is less likely to be reflected by the reflecting films 25a and emitted from the opposing surface 22f. As a result, degradation in display quality caused by such reflection is suppressed.

As shown in FIG. 35, the reflecting films 25 are uniformly formed over the whole surface when viewed from the direction normal to the emitting surface 22e. Moreover, as shown in FIG. 36, the reflecting films 25 are formed over the whole surface of the tilted regions 26a1 and the parallel regions 26a3 of the surface 26a of the first light guide element 26. As can be seen from FIG. 37, the reflectance r of the reflecting film 25a formed on the tilted region 26a1 tilted by about 45° with respect to the emitting surface 22e is at most about 7%. The reflectance r' of the reflecting film 25b formed on the parallel region 26a3 extending approximately in parallel with the emitting surface 22e corresponds to the reflectance at an incident/reflection angle of 0°. Therefore, the reflectance r' of the reflecting film 25b is about 2%. The tilted regions 26a1 and the parallel regions 26a3 are formed at 1:1 when viewed from the direction normal to the emitting surface 22e. Therefore, the ratio of the sum ΣΔs of the respective areas Δs of the reflecting films 25a projected on the emitting surface 22e to the area S of the emitting surface 22e is 50%. The ratio of the sum ΣΔs' of the respective areas $\Delta s'$ of the reflecting films 25b projected on the emitting surface 22e to the area S of the emitting surface 22e is also 50%. Accordingly, the reflectance R of the plurality of reflecting films 25 ($R=\Sigma\Delta s/S\cdot r+\Sigma\Delta s'/S\cdot r'$) is about 4.5%. Therefore, the resultant display is brighter than that obtained by the conventional illuminating device having a protection plate.

Note that when an LCD panel having a polarizing plate is illuminated with the illuminating device 100 of the present invention that provides illumination light with polarization characteristics as described above, the relation between the polarization direction of the illumination light and the polarization axis (transmission axis) of the polarizing plate must be considered. More specifically, since the illuminating device 100 mainly emits the light polarized in the direction perpendicular to the repetition direction of the reflecting films 25. Therefore, it is preferable to match the direction perpendicular to the repetition direction of the reflecting films 25 with the transmission axis of the polarizing plate. Alternatively, it is preferable to rotate the light polarized in the direction perpendicular to the repetition direction of the reflecting films 25 by a phase plate so that the polarization direction of the light matches the transmission axis of the polarizing plate.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An illuminating device, comprising:
   a light source; and
   a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:
   the light guide plate is formed from a first light guide layer and a second light guide layer each having a prescribed thickness in a direction normal to the emitting surface,
   the first light guide layer has a plurality of reflecting films therein for reflecting light entering the light guide plate through the first side surface toward the emitting surface, wherein the reflecting films are formed within the light guide plate so that the reflecting films are not provided at a surface of the light guide plate, and
   the second light guide layer has no reflecting film.

2. An illuminating device, comprising:
   a light source; and
   a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:
   the light guide plate is formed from a first light guide layer and a second light guide layer each having a prescribed thickness in a direction normal to the emitting surface,
   the first light guide layer has a plurality of reflecting films therein for reflecting light entering the light guide plate through the first side surface toward the emitting surface,
   the second light guide layer has no reflecting film, and
   an angle $\alpha$ between a tangent line of the reflecting film and the emitting surface and a critical angle $\theta$ of the light guide plate satisfy the following relation:

$$45°-\theta/2<\alpha<45°+\theta/2.$$

3. An illuminating device, comprising:
   a light source; and
   a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:
   the light guide plate is formed from a first light guide layer and a second light guide layer each having a prescribed thickness in a direction normal to the emitting surface,
   the first light guide layer has a plurality of reflecting films therein for reflecting light entering the light guide plate through the first side surface toward the emitting surface,
   the second light guide layer has no reflecting film, and
   an angle $\alpha$ between a tangent line of the reflecting film and the emitting surface and a critical angle $\theta$ of the light guide plate satisfy the following relation:

$$\theta<\alpha<45°+\theta/2.$$

4. The illuminating device according to claim 1, wherein a light transmittance of the light guide plate is at least 85%.

5. An illuminating device, comprising:
   a light source; and
   a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:
   the light guide plate is formed from a first light guide layer and a second light guide layer each having a prescribed thickness in a direction normal to the emitting surface,
   the first light guide layer has a plurality of reflecting films therein for reflecting light entering the light guide plate through the first side surface toward the emitting surface,
   the second light guide layer has no reflecting film, and
   a sum $\Sigma\Delta s$ of respective areas $\Delta s$ of the reflecting films projected on the emitting surface, a reflectance r of the reflecting film, and an area S of the emitting surface of the light guide satisfy the following relation:

$$0 < (\Sigma \Delta s/S) \cdot r \leq 0.08.$$

6. The illuminating device according to claim 1, wherein the reflecting films have a line shape when viewed from the direction normal to the emitting surface.

7. The illuminating device according to claim 1, wherein the reflecting films have an island shape when viewed from the direction normal to the emitting surface.

8. The illuminating device according to claim 1, wherein the reflecting films are transparent dielectric films or dielectric multi-layer films.

9. An illuminating device, comprising:

a light source; and a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:

the light guide plate is formed from a first light guide layer and a second light guide layer each having a prescribed thickness in a direction normal to the emitting surface, the first light guide layer has a plurality of reflecting films therein for reflecting light entering the light guide plate through the first side surface toward the emitting surface, the second light guide layer has no reflecting film, the reflecting films are transparent dielectric films or dielectric multi-layer films, and provided that a principal ray of the light entering the light guide plate through the first side surface is incident on the dielectric films or the dielectric multi-layer films at an incident angle β, a refraction angle γ of the principal ray in the dielectric film or the dielectric multi-layer film, a thickness d of the dielectric film or the dielectric multi-layer film, a refractive index n of the dielectric film or the dielectric multi-layer film, and a refractive index $n_0$ of the first light guide layer satisfy the following relation:

$$380/(4n \cdot \cos \gamma) \leq d \leq 780/(4n \cdot \cos \gamma),$$

and $$n_0 \cdot \sin \beta = n \cdot \sin \gamma.$$

10. The illuminating device according to claim 1, wherein the light guide plate is a lamination of a first light guide element and a second light guide element with an adhesive layer interposed therebetween, the first light guide element, the adhesive layer and the second light guide element being laminated in the direction normal to the emitting surface, a surface of the first light guide element which faces the adhesive layer has a plurality of tilted regions that are tilted with respect to the emitting surface, and the reflecting films are formed on the tilted regions of the surface.

11. The illuminating device according to claim 10, wherein the surface of the first light guide element which faces the adhesive layer further has a plurality of vertical regions that extend approximately perpendicularly to the emitting surface, and the tilted regions and the vertical regions are alternately arranged in a prescribed direction.

12. An illuminating device, comprising:

a light source; and a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:

the light guide plate is formed from a first light guide layer and a second light guide layer each having a prescribed thickness in a direction normal to the emitting surface, the first light guide layer has a plurality of reflecting films therein for reflecting light entering the light guide plate through the first side surface toward the emitting surface, the second light guide layer has no reflecting film, the light guide plate is a lamination of a first light guide element and a second light guide element with an adhesive layer interposed therebetween, the first light guide element, the adhesive layer and the second light guide element being laminated in the direction normal to the emitting surface, a surface of the first light guide element which faces the adhesive layer has a plurality of tilted regions that are tilted with respect to the emitting surface, and the reflecting films are formed on the tilted regions of the surface, the surface of the first light guide element which faces the adhesive layer further has a plurality of vertical regions that extend approximately perpendicularly to the emitting surface, and the tilted regions and the vertical regions are alternately arranged in a prescribed direction, wherein a width A of the tilted region of the surface in the prescribed direction and a width a of the reflecting film in the prescribed direction satisfy the following relation:

$$0 < a \leq A.$$

13. The illuminating device according to claim 11, wherein the reflecting films are formed over a whole surface of the tilted regions of the surface.

14. The illuminating device according to claim 10, wherein the surface of the first light guide element which faces the adhesive layer further has a plurality of vertical regions that extend approximately perpendicularly to the emitting surface and a plurality of parallel regions that extend approximately in parallel with the emitting surface.

15. The illuminating device according to claim 14, wherein the surface of the first light guide element which faces the adhesive layer is located near the emitting surface of the light guide plate, and the parallel regions are located closer to the emitting surface than are the tilted regions.

16. The illuminating device according to claim 14, wherein the surface of the first light guide element which faces the adhesive layer is located near the opposing surface of the light guide plate, and the parallel regions are located closer to the opposing surface than are the tilted regions.

17. The illuminating device according to claim 10, wherein the first light guide element and the adhesive layer have approximately the same refractive index.

18. The illuminating device according to claim 1, wherein
the light guide plate is a lamination of a first light guide element and a second light guide element, the first light guide element and the second light guide element being laminated in the direction normal to the emitting surface,
a surface of the first light guide element which faces the second light guide element has a plurality of tilted regions that are tilted with respect to the emitting surface, and the reflecting films are formed on the tilted regions of the surface.

19. The illuminating device according to claim 10, wherein the second light guide element is located on a viewer side of the first light guide element and functions also as a transparent input device.

20. A display device, comprising:
an illuminating device including
a light source, and
a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein
the light guide plate is formed from a first light guide layer and a second light guide layer each having a prescribed thickness in a direction normal to the emitting surface,
the first light guide layer has a plurality of reflecting films therein for reflecting light entering the light guide plate through the first side surface toward the emitting surface, wherein the reflecting films are formed within the light guide plate so that the reflecting films are not provided at a surface of the light guide plate, and
the second light guide layer has no reflecting film,
the display device further comprising:
a reflection-type display panel facing the light guide plate of the illuminating device on a side opposite to a viewer.

21. A light guide plate having a first side surface receiving light emitted from a light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein
the light guide plate is formed from a first light guide layer and a second light guide layer each having a prescribed thickness in a direction normal to the emitting surface,
the first light guide layer has a plurality of reflecting films therein for reflecting light entering the light guide plate through the first side surface toward the emitting surface, wherein the reflecting films are formed within the light guide plate so that the reflecting films are not provided at a surface of the light guide plate, and
the second light guide layer has no reflecting film.

22. The device of claim 1, wherein the reflecting films are embedded within the light guide plate.

23. The device of claim 20, wherein the reflecting films are embedded within the light guide plate.

24. The light guide plate of claim 21, wherein the reflecting films are embedded within the light guide plate.

25. The device of claim 1, wherein the emitting and opposing surfaces of the light guide plate are parallel to one another.

26. The device of claim 20, wherein the emitting and opposing surfaces of the light guide plate are parallel to one another.

27. The light guide plate of claim 21, wherein the emitting and opposing surfaces of the light guide plate are parallel to one another.

28. An illuminating device, comprising:
a light source; and
a light guide plate having a first side surface receiving light emitted from the light source, a second side surface facing the first side surface, a third side surface, a fourth side surface, an emitting surface and an opposing surface, the third and fourth side surfaces being located between the first and second side surfaces so as to face each other, and the emitting surface and the opposing surface facing each other with the first, second, third and fourth side surfaces interposed therebetween, wherein:
the emitting and opposing surfaces of the light guide plate are parallel to one another,
the light guide plate is formed from a first light guide layer and a second light guide layer each having a prescribed thickness in a direction normal to the emitting surface,
the first light guide layer has a plurality of reflecting films therein for reflecting light entering the light guide plate through the first side surface toward the emitting surface, and
the second light guide layer has no reflecting film.

* * * * *